US007062416B1

(12) United States Patent
Arita et al.

(10) Patent No.: US 7,062,416 B1
(45) Date of Patent: Jun. 13, 2006

(54) DEVICE AND METHOD FOR DISPLAYING BODY SECTION AND MEDIUM FOR STORING A PROGRAM REGARDING THE SAME

(75) Inventors: Yuichi Arita, Hachioji (JP); Tatsuro Shima, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/513,855

(22) Filed: Feb. 25, 2000

(30) Foreign Application Priority Data

Mar. 1, 1999 (JP) ................................ 11-052211

(51) Int. Cl.
*G06F 17/10* (2006.01)
(52) U.S. Cl. .................. 703/2; 345/419; 345/420; 345/757; 345/701; 345/702; 345/725; 345/790
(58) Field of Classification Search ............... 703/13, 703/2; 345/418, 419, 424, 42, 44, 420, 700, 345/757, 701, 702, 725, 790
See application file for complete search history.

(56) References Cited

U.S. PATENT DOCUMENTS

| 5,596,504 A * | 1/1997 | Tata et al. ................... 700/120 |
| 5,701,403 A * | 12/1997 | Watanabe et al. ........... 345/419 |
| 5,751,927 A * | 5/1998 | Wason ......................... 345/419 |
| 5,771,044 A * | 6/1998 | Cragun et al. .............. 345/420 |
| 5,803,914 A * | 9/1998 | Ryals et al. ................. 600/407 |
| 6,792,398 B1* | 9/2004 | Handley et al. ............... 703/2 |
| 2004/0153296 A1* | 8/2004 | Landers et al. ................ 703/2 |

FOREIGN PATENT DOCUMENTS

JP 10003552 A 1/1998
JP 10187774 A 7/1998

OTHER PUBLICATIONS

Autodesk, Dec. 5, 1997, Rev.14.*
AutoVAD 14, User's GUide, Dec. 5th, 1997.*
AutoCAD (AutoCAD User's Guide, AutoDesk Dec. 5th, 1997).*
Original Office Action issued from the Japanese Patent Office. English translation of the Office Action.
"Catch Up Try & Check" Viewer [3D View V3.0] Low Cost and Full Functions, NIKKEI Digital Engineering, Feb., 1999, pp. 20-21. Partial English translation.
"Catch Up Try & Check" Viewer [CALSVIEW V3.0J] "Easy finding of cross-sectional form or angle distance", NIKKEI Digital Engineering, Jul., 1998, pp. 38-39. Partial English translation.

* cited by examiner

*Primary Examiner*—Anthony Knight
*Assistant Examiner*—Sunray Chang
(74) *Attorney, Agent, or Firm*—Staas & Halsey LLP

(57) ABSTRACT

The present invention relates to a device displaying a body section, a method displaying the body section, and a medium storing a program for realizing the device, which are able to observe effectively the complex body section. The device comprises a management unit managing attribute information of parts and arranging information of a set displaying plane for making a body section defined based on a plane of one of the parts, an implementing unit for generating a three-dimensional section of the body cut by the set displaying plane according to the management data of the management unit, and for displaying the three-dimensional section with the set displaying plane on the display screen, and an up-date unit for up-dating the arranged information managed by the management unit by corresponding to the transfer or rotation of the set displaying plane.

46 Claims, 60 Drawing Sheets

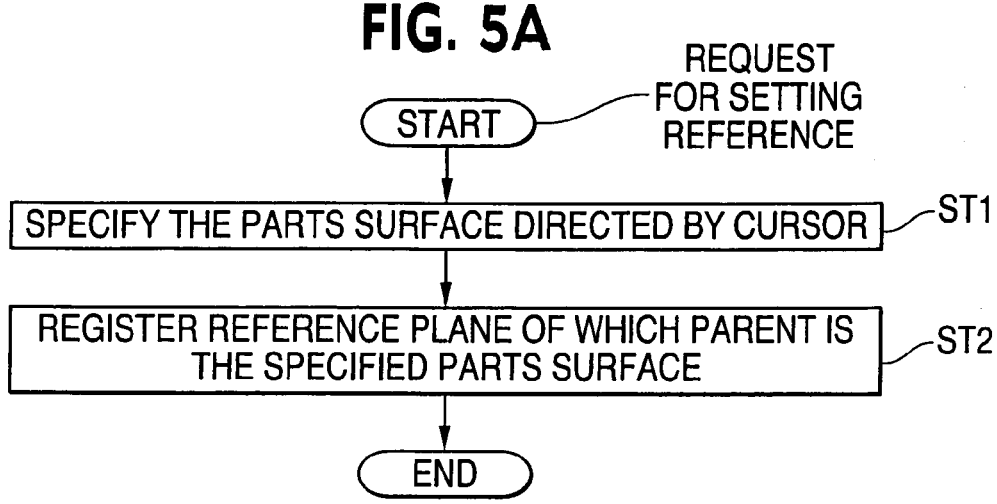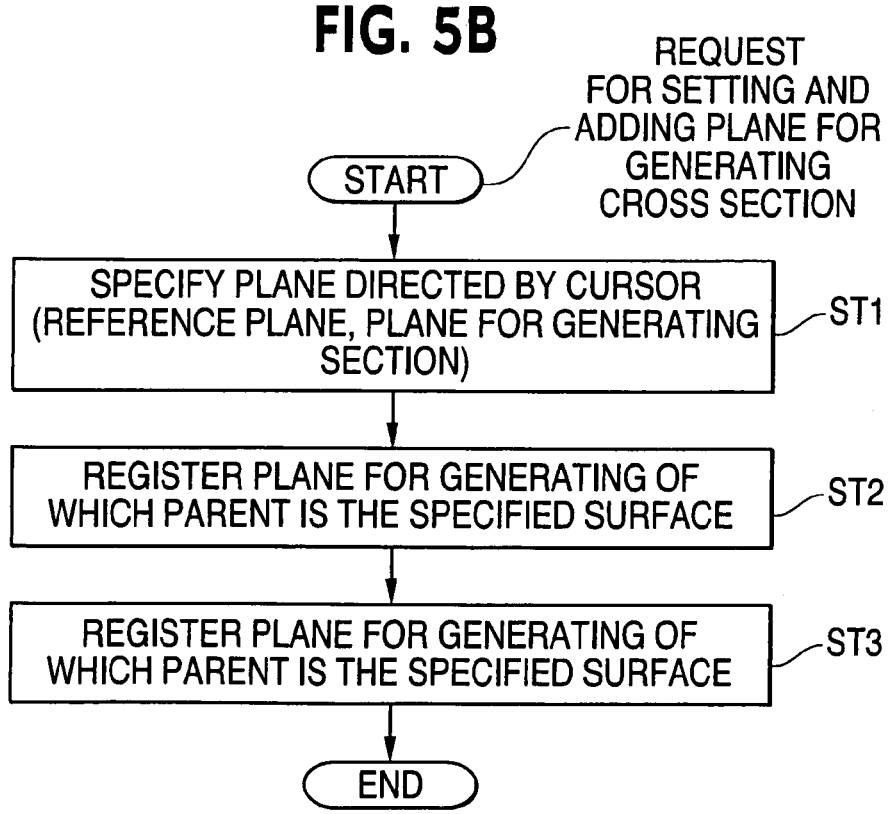

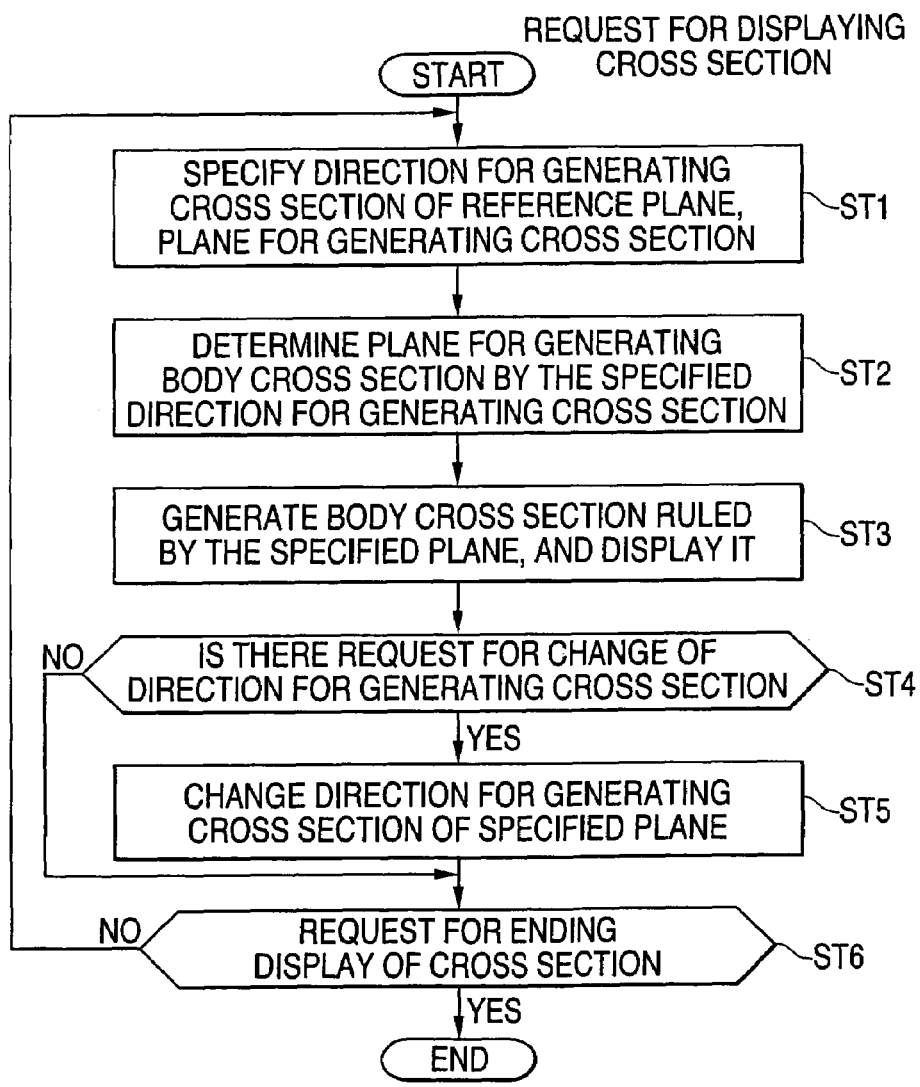

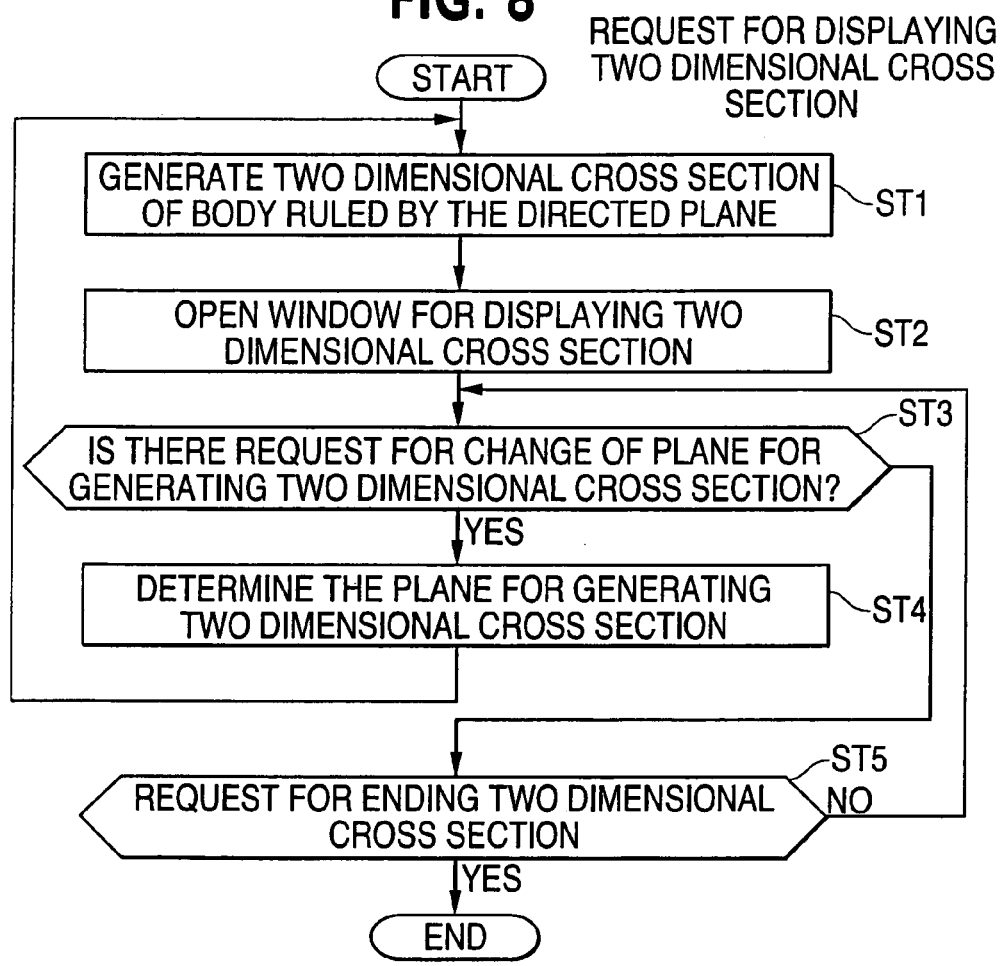

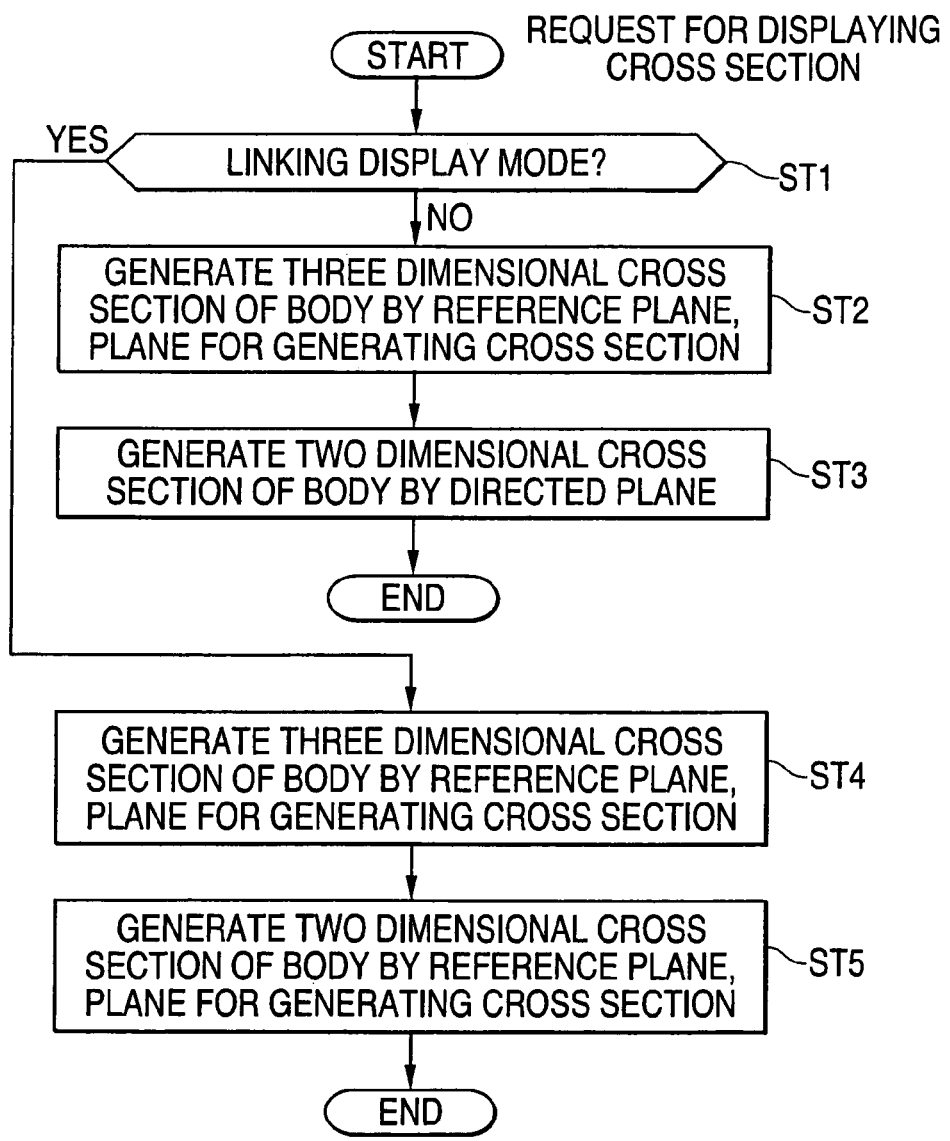

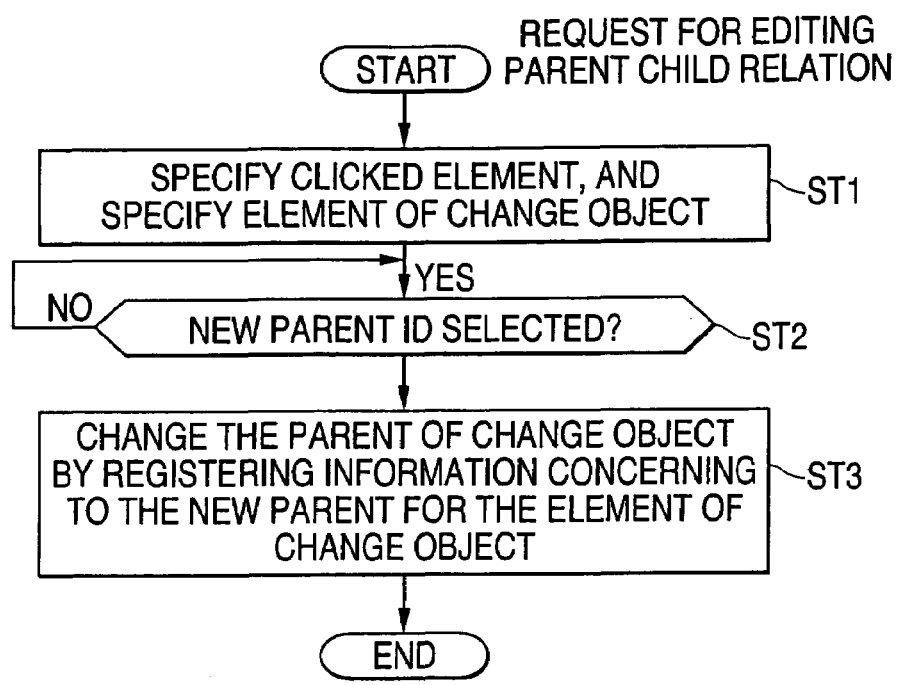

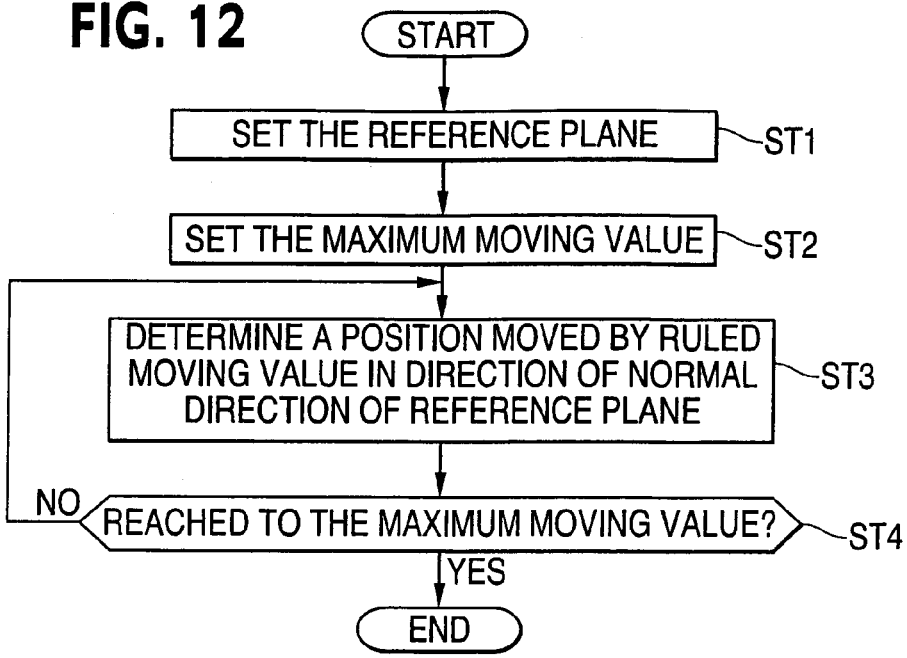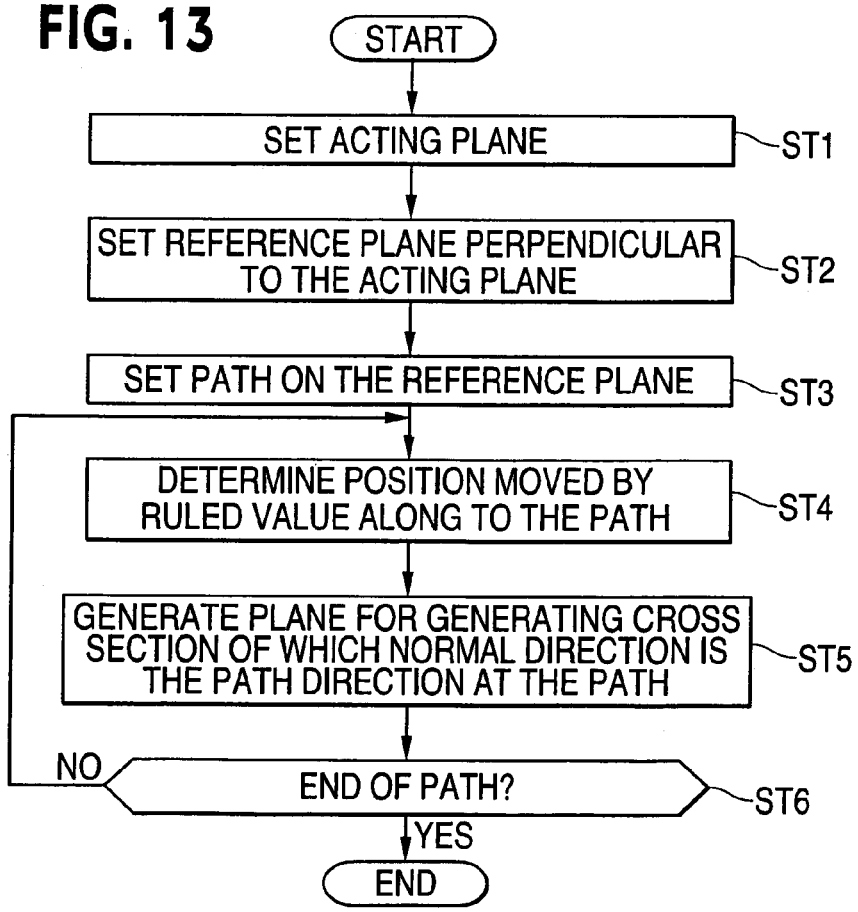

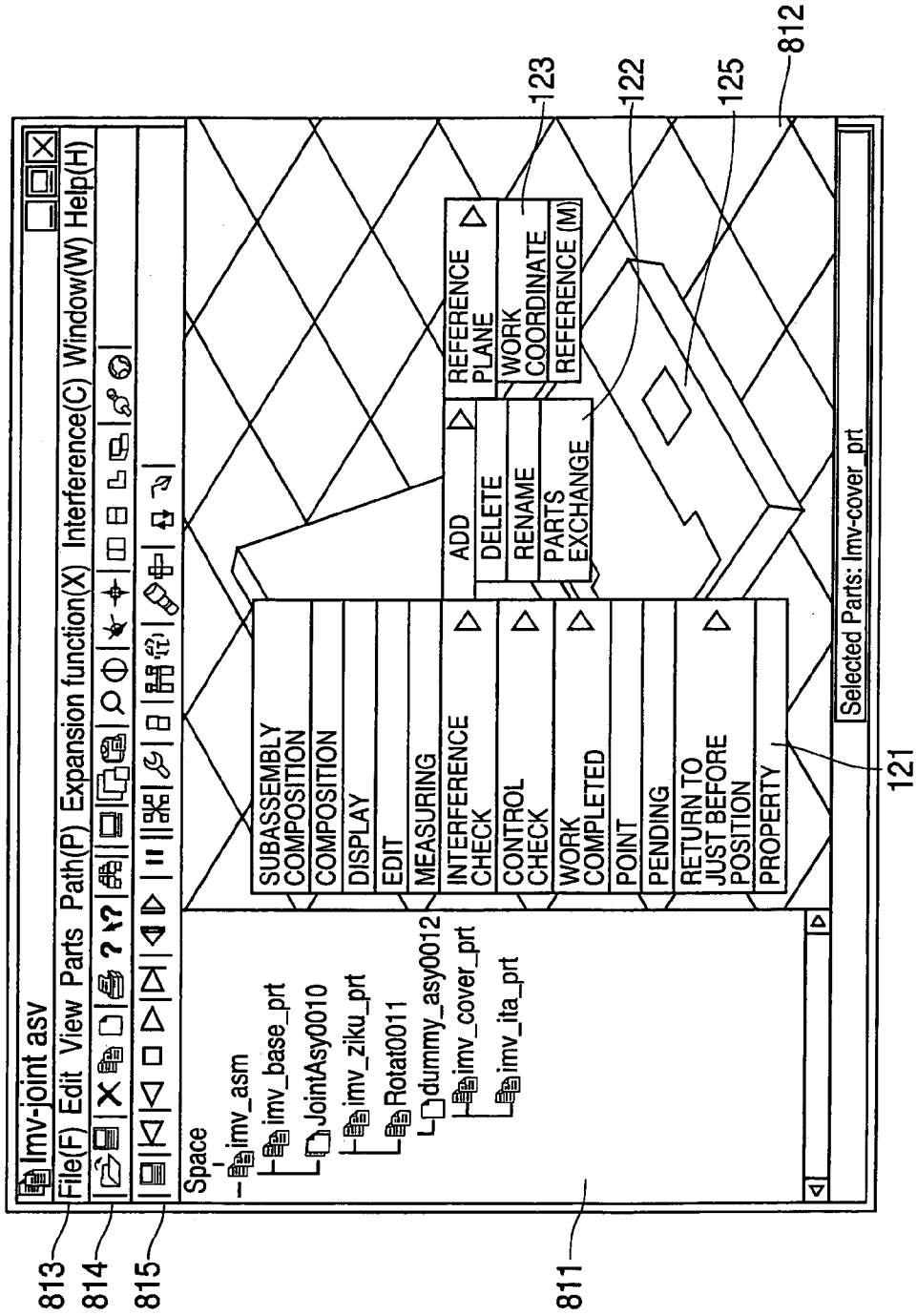

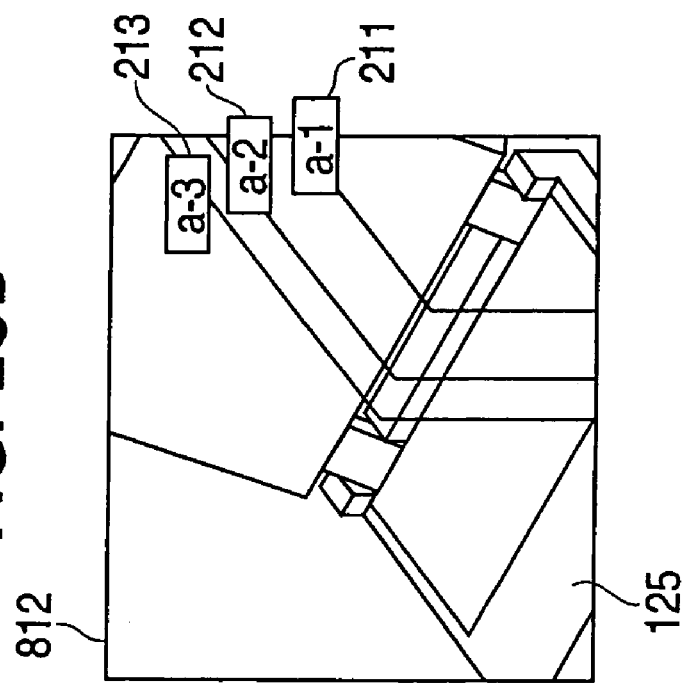
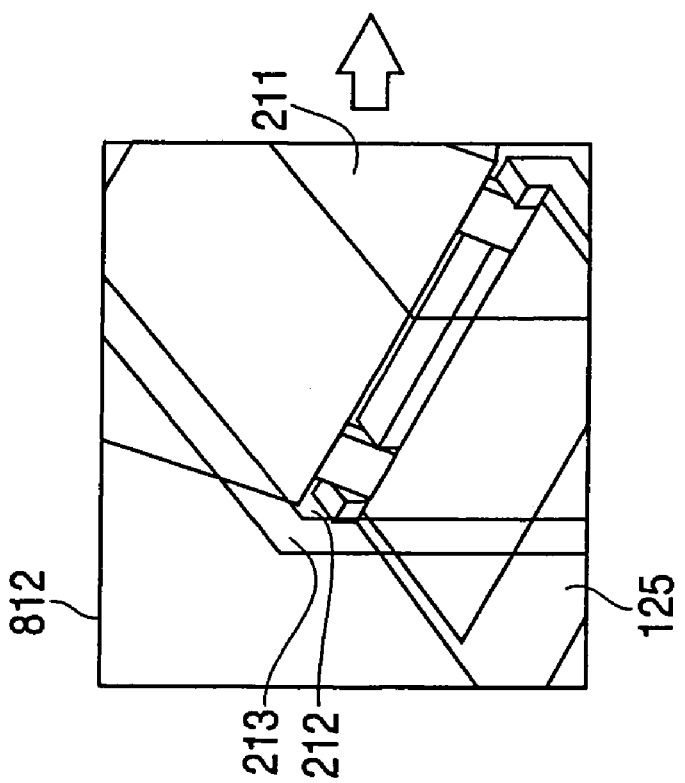

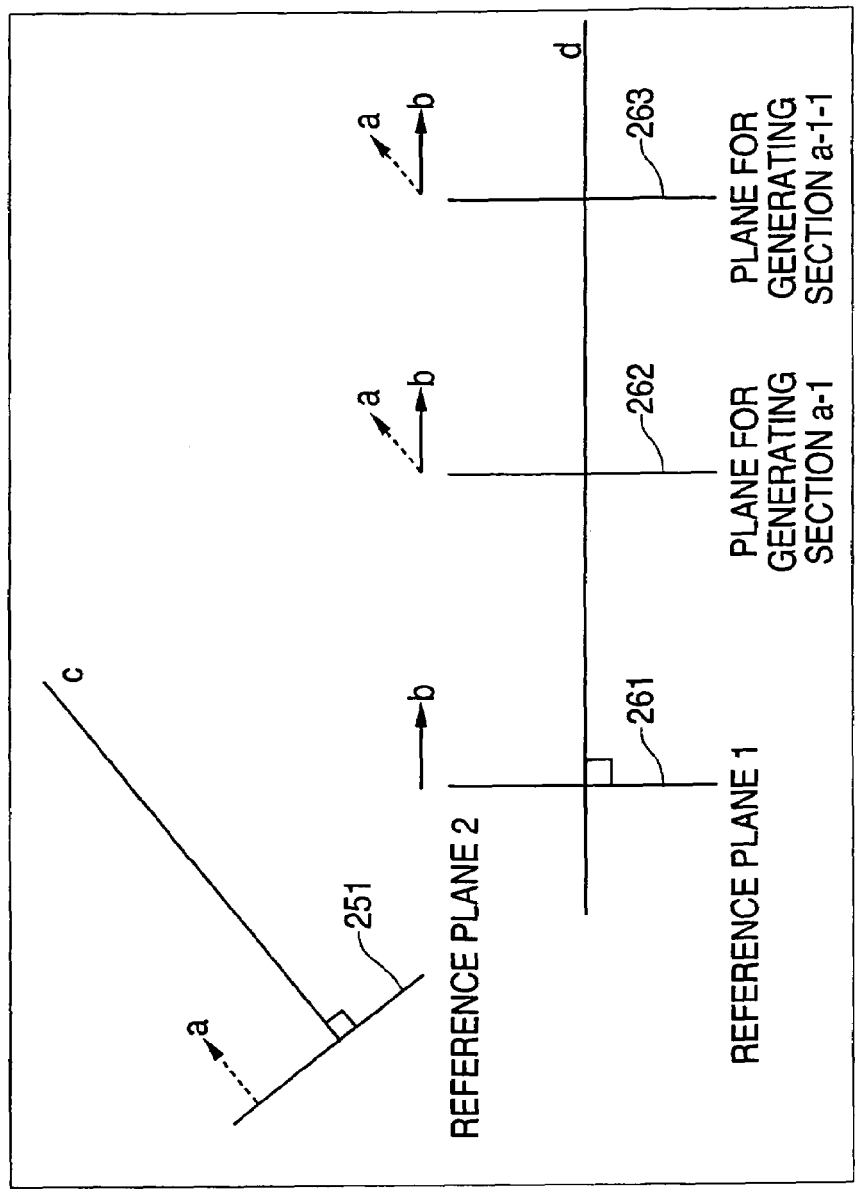

DEVICE AND METHOD FOR DISPLAYING BODY SECTION AND MEDIUM FOR STORING A PROGRAM REGARDING THE SAME

BACKGROUND OF THE INVENTION

1. Field of the Invention

This invention relates to a device displaying a body section, a method for displaying a body section and a medium for storing a program for realizing the device. More particularly, the present invention relates to a device displaying a body section, a method displaying the body section and a medium storing a program for realizing the device which makes the observation of the effective section of complex bodies.

2. Description of the Prior Art

According to the range of design methods using three-dimensional CAD, various techniques and devices for reviewing the design object by a computer in advance of a trial production of products are developed. Particularly the effective observation of bodies in a three-dimensional space by a computer is desired.

There are two ways for observing the bodies in the three-dimensional space by a computer. One is a technique for rapidly displaying the object, another is a technique for easily reaching an observed point.

In the technique for rapidly displaying an object, methods to reduce the loads, simplifying the object body, or neglecting some parts which are not seen in displaying are mainly used.

On the other hand, as a technique that displays a necessary section of the parts, control of sections that are not displayed are eliminated, or a transparency control technique is used making portions set before a viewpoint in three-dimensional space transparent. Other techniques only display a two-dimension display of a cut section. By using theses techniques, the relation of position between the arranged complex bodies or hidden parts can be observed, so that the object body can be effectively investigated.

Specifically the method for displaying the section of the object body is the most effective method to observe the object. And so, a technique for displaying effectively the section is desired.

In the prior art, when a section of an object body in a virtual three-dimensional space of a computer is generated, a plane parallel to the display screen is defined as a plane for generating the section to display a section parallel to the screen. In addition, the user decides a depth of the section to be displayed and the section of the two-dimensional plane is displayed.

As mentioned above, in the prior art, when a position of the plane for generating the section is defined in parallel to the display screen, the parts of the object body exists in the user side before the plane for generating the section is neglected in displaying them, and the two dimensional section of the object body is displayed.

In the prior art, the user transfers or rotates the object, and decides the plane for generating the section parallel to the display screen, and displays the two dimensional section which the user needs. Thus, functions that the two dimensional section is generated are based on the section which is determined in the three-dimensional space.

As mentioned above, in the prior art, as a plane for generating a section is defined in parallel to the display screen, when the object is transferred or rotated, the section displayed after the transfer or the rotation is different from the section before the transfer or the rotation.

That is, as the plane for generating the section is not defined, when the object body is transferred or rotated, the plane from the different angle is not shown, but rather a two-dimensional section at another point is shown.

While the prior art techniques generate a two-dimensional section cut at a plane at designated point by the three dimensional space, the generated section in the three-dimensional space is only displayed by a two-dimensional section parallel to the screen but cannot be displayed by the three-dimensional section.

Moreover, changing the position of the section set in the three-dimensional space, the user input the coordinates of each position, or a redefinition by using the two-dimensional chart are necessary. So, by the prior technique, users cannot seize the inner part of the body easily at a glance.

SUMMARY OF THE INVENTION

The present invention relates to a device displaying a body section, a method displaying the body section and a medium for storing a program realizing the device. Particulalry, the present invention relates to the device displaying the body section, a method for displaying body section and, a medium storing the program for realizing the device which are able to observe effectively the complex body section.

An object of the present invention is to provide a device, a method displaying body section, and a medium storing the program, by which complex sections of bodies are observed easily so as to overcome the above mentioned problem.

Another object of the invention is to provide a device, a method displaying body section, and a medium storing the program, which generates the three-dimensional section of the body cut by the set displaying plane defined to the body and displays it, so as to display the necessary three-dimensional section, when users are transferring and rotating the body.

Another object of the invention is to provide a device, a method displaying body section, and a medium storing the program which defines and edits the relation between parts of the body and the set displaying plane and the relation between the set displaying planes each other.

Another object of the invention is to provide a device, a method displaying body section, and a medium storing the program, which sets the allowable region of existence of the set displaying plane, so as not to produce an inutile set displaying planes.

Another object of the invention is to provide a device, a method displaying a body section, and a medium for storing the program, in which users designate the direction of the set displaying plane on the body.

Another object of the invention is to provide a device, a method displaying a body section, and a medium storing the program, in which users add parts or arrange some areas for the set displaying plane.

Another object of the invention is to provide a device, a method displaying a body section, and a medium storing the program, which checks easily the interference between the parts.

Another object of the invention is to provide a device, a method displaying a body section, and a medium for storing the program, which displays the two-dimensional section and the three-dimensional section on a same display screen.

Another object of the invention is to provide a device, a method for displaying a body section, and a medium for storing a program, displaying the three-dimensional section two-dimensional section on a same display screen and showing the correspondence between them.

Another object of the invention is to provide a device, a method displaying body section, and a medium for storing the program that users set path on the body surface on which the necessary set displaying planes are generated, so as to generate the necessary set displaying automatically or semi-automatically.

The present invention has following components so as to achieve the above mentioned objects.

(1) A device for displaying a body section in a virtual three-dimensional space by a computer comprises: management means for managing attribute information of parts and arranging information of a set displaying plane for making a body section defined based on a plane of one of a parts, implementing means for generating a three-dimensional section of the body cut by the set displaying plane according to the management data of the management means, and for displaying the three-dimensional section with the set displaying plane on the display screen, and up-date means for up-dating the arranged information managed by the management means by corresponding to the transfer or rotation of the set displaying plane.

(2) A device for displaying a body section in a virtual three-dimensional space by a computer comprises management means for managing attribute information of parts and one or plural kinds of attribute information of set displaying plane for making a body section with the relation between the parts and the set displaying information, implementing means for generating a three-dimensional section of the body cut by the set displaying plane according to the management data of the management means, and for displaying the three-dimensional section with the set displaying plane on the display screen, and up-date means for up-dating the arranged information managed by the management means by corresponding to the transfer or rotation of the set displaying plane.

(3) A method for displaying a body section for displaying a body section in a virtual three-dimensional space by a computer comprises a process managing management data of one or plural set displaying planes for cutting the body to make the section and of the attribute information of parts and of set displaying planes with the relation information with the parts and set displaying plane, which are made by the same data structure, a process registering the management data, process for displaying the section and set displaying plane with the relation information, and a process updating the section made by the set displaying plane corresponding to the designation of transfer or rotation of the set displaying plane with considering the relation information.

(4) A medium for storing the program for displaying a body section for displaying a body section in a virtual three-dimensional space, in which the program comprises a process managing management data of one or plural set displaying planes for cutting the body into the sections and of the attribute information of parts and of set displaying planes with relation information between the parts, and a set displaying plane, which are made by the same data structure, a process for registering the management data, a process displaying the section and set displaying plane with the relation information, and a process for up-dating the section made by the set displaying plane corresponding to the designation of transfer or rotation of the set displaying plane with considering the relation.

(5) A device for displaying a body section in a virtual three-dimensional space by a computer comprises a management unit managing attribute information of parts and arranging information of a set displaying plane making a body section defined based on a plane of one of a parts, an implementing unit generating a three-dimensional section of the body cut by the set displaying plane according to the management data of the management unit, and displaying the three-dimensional section with the set displaying plane on the display screen, and an up-date unit up-dating the arranged information managed by the management unit by corresponding to the transfer or rotation of the set displaying plane.

(6) A device for displaying a body section in a virtual three-dimensional space by a computer comprises management unit for managing attribute information of parts and one or plural kinds of attribute information of set displaying plane for making a body section with the relation between the parts and the set displaying information, an implementing unit generating a three-dimensional section of the body cut by the set displaying plane according to the management data of the management unit, and for displaying the three-dimensional section with the set displaying plane on the display screen, up-date unit for up-dating the arranged information managed by the management unit by corresponding to the transfer or rotation of the set displaying plane.

(7) A device displaying a body section by a computer comprises a management unit managing set displaying planes for cutting body sections, an implementing unit generating a three-dimensional section of the body cut by the set displaying plane, and a displaying section displaying the set displaying plane on the display screen.

(8) A method for displaying a body section by a computer comprises managing set displaying planes for defining planes cutting a body based on a plane of the body, generating a three-dimensional section of the body cut by the set displaying plane, and displaying the section with the set displaying plane on the display screen.

(9) A medium storing a program for displaying a body section by a computer comprises a program managing set displaying planes for making the body section, and an implementing program generating a three-dimensional section of the body cut by the set displaying plane and displaying the section with the set displaying plane on the display screen.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5A shows the process flow of the program for displaying the body section.

FIG. 5B shows the process flow of the program for displaying the body section.

FIG. 7 shows the process flow of the program for displaying the body section.

FIG. 8 shows the process flow of the program for displaying the body section.

FIG. 9 shows the process flow of the program for displaying the body section.

FIG. 10 shows the process flow of the program for displaying the body section.

FIG. 11 shows the process flow of the program for displaying the body section.

FIG. 12 shows the process flow of the program for displaying the body section.

FIG. 13 shows the process flow of the program for displaying the body section.

FIG. 14 shows the explanation of the display.

FIG. 25A shows explanation of the process of the program for displaying the body section.

FIG. 25B shows explanation of the process of the program for displaying the body section.

FIG. 40 shows explanation of the process of the program for displaying the body section.

DESCRIPTION OF THE PREFERRED EMBODIMENTS

Aspects of the present invention are explained by the following.

At first, outlines of the present invention are explained, and an detailed explanations of aspects of the present invention are presented.

Figure 1:
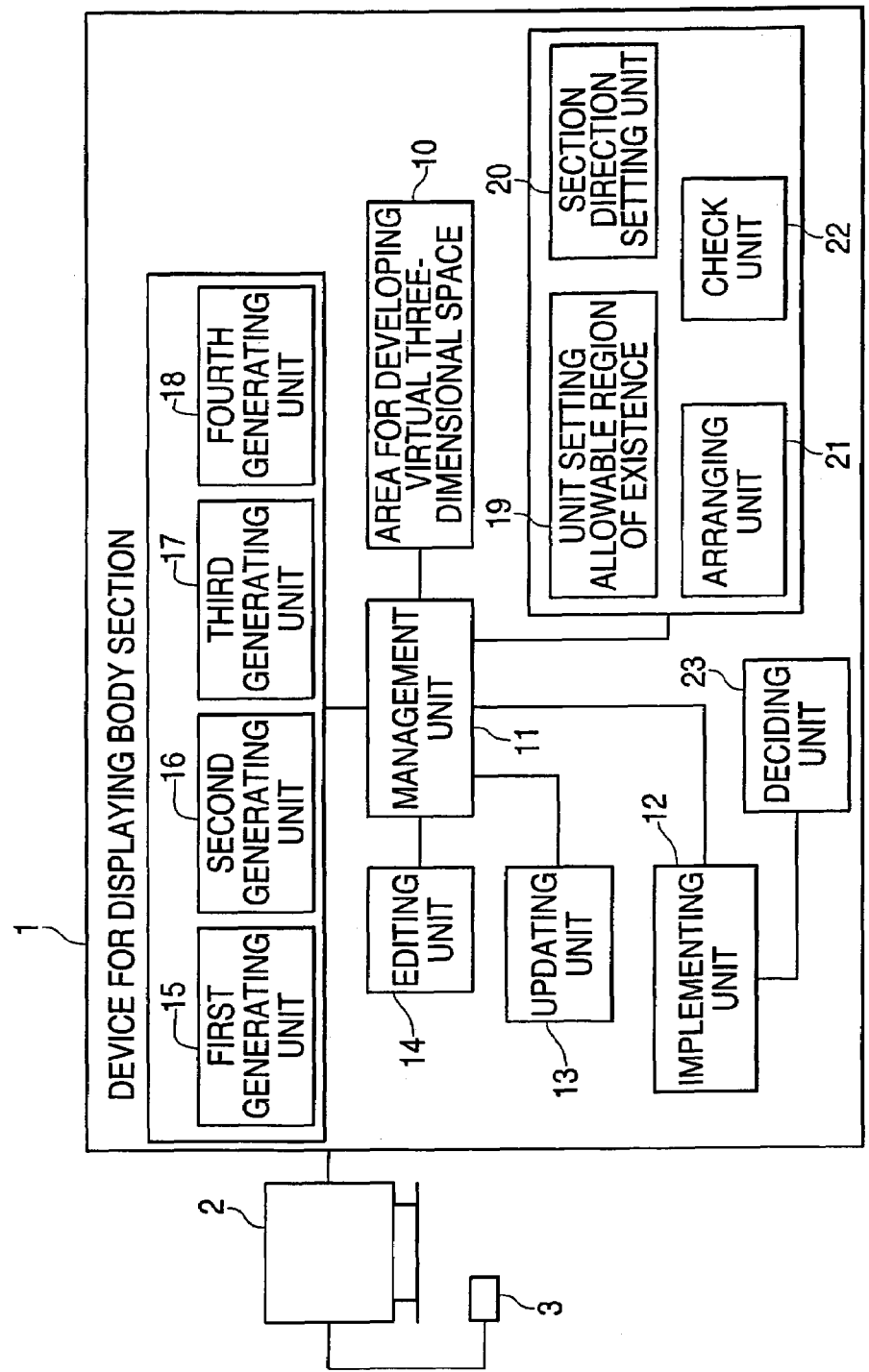
FIG. 1 shows the components according to an aspect of the present invention.

FIG. 1 shows principal components of the first embodiment of the present invention.

In FIG. 1, a device for displaying a body section 1, a terminal 2 and an input device 3 are shown.

The displaying device 1 of a body section generates sections of a body in a three-dimensional space. The terminal 2 displays the body section, and it works as an interfacing unit with users. The input device 3 is used for the input implementing process.

The displaying device of the body section of the present invention comprises a virtual three-dimensional space arranged in area 10, management 11, an implementing unit 12, an updating unit 13, an editing unit 14, a first generating unit 15, a second generating unit 16, a third generating unit 17, a fourth generating unit 18, a unit for setting allowable range of existence 19, a setting direction setting unit 20, an arranging unit 21, and a check unit 22.

The management unit 11 manages a space structure of the virtual three-dimensional space arranged in the virtual three-dimensional space arranging area, and manages attribute information (positions on coordinates etc.) of parts of the body arranged in the virtual three-dimensional space and attribute information (positions on coordinates etc.) of one or plural set displaying plane for displaying section of a body arranged in the virtual three-dimensional space with the same data structure and the relation between them (for example, a relation of a parent and child).

The implementing unit 12 manages and generates a section of a body in the three-dimensional space cut by the set displaying plane according to the management data of the management unit 11, and displays the three-dimensional section, the set displaying plane and the relations managed by the management unit 11 on the display screen. Further it generates the two-dimensional section cut by the set displaying plane, and displays the two-dimensional section on the display screen of the terminal 2.

The implementing unit 12 displays the operating panel for operating the set displaying plane corresponding to the set displaying plane, and displays a sign board arranged identification letters (the identifying letters for identifying a relation between the set displaying planes, if the relation exists). The implementing unit 12 displays the set displaying plane by displaying the frame of the set displaying plane, and when the three-dimensional section not being displayed, displays it by the half transparent color (when a relation between the set displaying planes existing, they are the same colors).

The updating unit 13 updates the management data of the manage mean unit 11, corresponding to transferring and rotating the parts or the set displaying plane on the displaying screen, and considering the relation managed by the management unit.

The updating unit 13, when there is a relation between the parent and the child, transfers and rotates the parent and the child with linkage in time of the update of the parent with the update of the management data of the child.

The editing unit 14 edits the relation displayed on the display screen by interfacing with users.

The first generating unit 15 generates the set displaying plane by the request for generating the set displaying plane issued with the plane of the parts, and registers it in the management unit 11 with the relation of the parts. Or the new set displaying plane is generated by the new request for generating the set displaying plane issue by the designation of the registered set displaying plane, and it is registered in the management unit 11 with the relation of the registered set displaying plane.

The second generating unit 16, considering a relation with the set displaying plane or the set displaying plane generated just before, from the set displaying plane and the specific of parts, and registered the set displaying plane containing the specific.

The third generating unit 17, considering the relation between the set displaying plane and the path information made on the set displaying plane directed, generates a new set displaying plane tracing the pth information and registers it in the management unit.

The fourth generating unit 18, considering a relation with the designated set displaying plane or the set displaying plane generated just before, and moves the set displaying plane continuously to generate the set displaying plane, and registers it in the management unit 11.

The existing range setting unit 19 sets the exiting range for the set displaying plane, and registers it in the management unit 11.

The setting direction setting unit 20 sets the cutting direction for the set displaying plane, and registers it in the management unit 11. In this time, setting a cutting direction of the body showing the form depending on the set displaying plane may be set.

The arranging unit 21 arranges the adding parts on the set displaying plane, or arranges the range, and registers them in the management unit 11.

The checking unit 22 checks the interference between one or plural parts (added parts arranged by the arranging unit 21) and another parts (usually plural parts), the one or plural parts moving linked with the set displaying plane managed by the linkage information of the managing unit 11.

The deciding unit 23 decides whether to control the two-dimensional section and the dimensional section with linkage or no-linkage. When the deciding unit decides the linkage operation, the implementing unit 12 accepts the decision and generates the set displaying plane used for generating the three-dimensional section, and displays it on the same display displaying the three-dimensional section. When the deciding unit decides the no-linkage operation, the executing unit 12 generates the two-dimensional section cut by a set displaying plane selected the set displaying planes, and displays it with the three-dimensional section on the same display.

As an example, when the two-dimensional section and the three-dimensional section are displayed on the same display, the executing unit 12 displays the two-dimensional section while showing to which part of the three-dimensional section it corresponds, or three-dimensional section and the two-dimensional section are displayed on the same screen, showing the position of the directed noticed point.

The method according to aspects of the present invention may be implemented on a computer by a program that is are stored in a diskette or a disk device of a server. They are installed on a body section displaying device 1 to act in a memory.

In the shown body section displaying device 1, the first generating unit 15 receives the request for generating the set displaying plane issued with designation of the parts plane, and generates the set displaying plane by making the connection with the parts, and registers in the management unit 11. Further it accepts the request of generation of a new set displaying plane issued directed a registered set displaying plane by defining the connection with the registered set displaying plane, and registers it in the management unit 11.

By these, management unit 11 manages the attribute information (coordinate information) of all parts composing the body, and the attribute information (coordinate information) of one or plural set displaying plane for showing the body section according to the connection defined between them (for example, parent child relation), and by the same data structure.

Accepting the management data of the management unit 11, the implementing unit 12 generates the three-dimensional section of the body cut by the set displaying plane according to the management data of the management unit 11, and displays the three-dimensional section, the set displaying plane and the connection managed by the management unit 11 on the display of the terminal 2.

As the three-dimensional section is displayed, users direct the transfer and rotation of the set displaying plane by clicking or dragging for an operation panel or a sign board shown corresponding to the set displaying plane, or by clicking or dragging for one of the parts. So, the up-date unit 13 up-dates the management data managed by the management unit 11 considering the connection managed by the management unit 11. For example, according to the connection managed b the management unit 11, at the time of the up-dating the parts of parent, the position of the set displaying plane of the child is updated in connection of the parent, or at the time of the updating the set displaying plane of parent, the position of the set displaying plane of the child is updated in connection of the parent.

Like this, the body section displaying device 1 generate the three-dimensional section on the body cut by the set displaying plane defined by the plane of parts composing the body and displays it. Further the set displaying plane is transferred and rotated corresponding to the user operation. So users can look the three-dimensional necessary interactively.

For making the components, the editing unit 14 edits the connection displayed on the display, and the defined connection can be changed freely.

Also the exiting range set unit 19 sets the possible range of existance for displaying the set displaying plane and registers it in the set displaying plane. By this, the moving of the set displaying plane is limited.

The setting direction setting unit 20 sets the cut direction on the body for the set displaying plane and registers it in the management unit 11 to direct the form of the three-dimensional section of the body cut by the set displaying plane.

Also the arranging unit 21 arranges added parts or arranged area for the set displaying plane and registers it in the registering unit 11.

Also the check unit 22 checks the interference between one or plural parts (added parts arranged by the arranged unit 21), as processing object that is one or plural parts moving in connecting to the set displaying plane according to the moving of the set displaying plane which the manage unit 11 manages. By this component, it is known whether the component moving with the set displaying plane interferes another parts or not.

Also the deciding unit 23 whether to control the two-dimensional section and the dimensions section with linkage or no-linkage. When the deciding unit decides the linkage operation, the executing unit 12 accepts the decision and generates the two-dimensional section by the set displaying plane used for generating the three-dimensional section, and displays it on the same display displaying the three-dimensional section. When the deciding unit decides the no-linkage operation, the executing unit 12 generates the two dimensional section cut by a set displaying plane selected the set displaying planes, and displays it with the three-dimensional section on the same display. By this, a necessary two dimensional section is displayed freely corresponding to the three-dimensional section.

The executing unit 12 displays the three-dimensional section showing what part of the three-dimensional section it corresponds to, the three-dimensional section and the two-dimensional section are displayed, showing the position of the directed noticed point.

Further, in the components, the second generating unit 16 for generating a new set displaying plane containing a specific point, by linking with the set displaying plane or the set displaying plane generated just before, from a specific point of parts and the designated set displaying plane and parts are composed. Also, the third generating unit 17 for generating a new set displaying plane from a path information set to the designated set displaying plane on the path of the path information, while making a relation information with the set displaying plane, tracing the path information is composed. Also the forth generating unit 18 for generating a new set displaying plane based on a designated set displaying plane, while linking with a directed set displaying plane or a set displaying plane generated before one, is composed. By these components, the set displaying plane can be generated automatically or semi-automatically.

Figure 2:
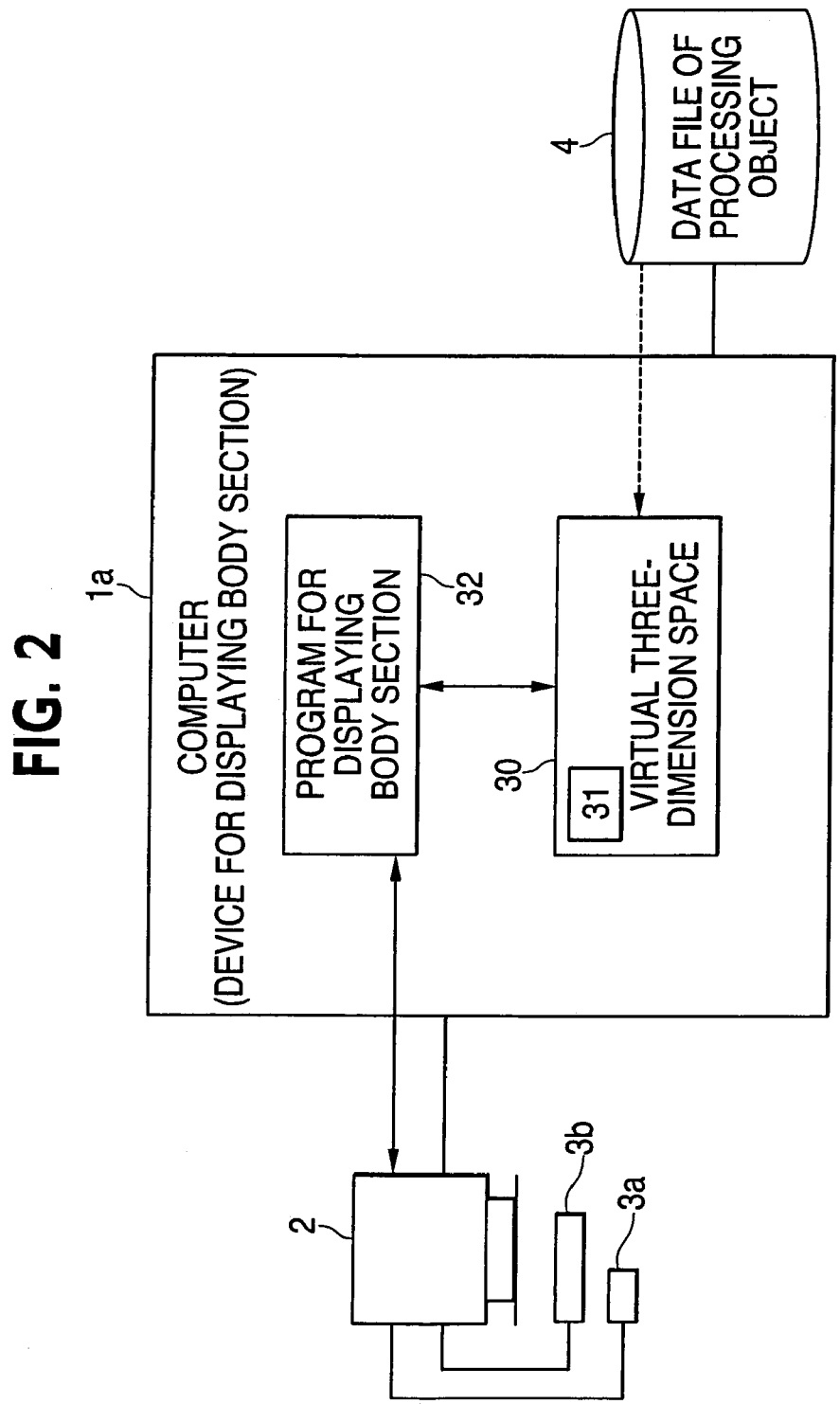
FIG. 2 shows one embodiment of the present invention.

FIG. 2 shows a principal components of the second embodiment of the present invention.

In FIG. 2, a computer 1a (device for displaying body section) executing the present invention, a terminal 2 included with the computer 1a, a mouse 3a coupled to the terminal 2, a keyboard 3b coupled to the terminal 2, a data file of process objective body 4 which stores data for displaying the virtual three-dimensional space of the body of processing object of the present invention, the virtual three-dimensional space 30 which is generated by expanding the object data stored in the data file of the processing object body, a space structure management table 31 which manages space structures of the virtual three-dimensional space 30, and a program 32 for displaying the body section for realizing the present invention are shown.

Figure 3:
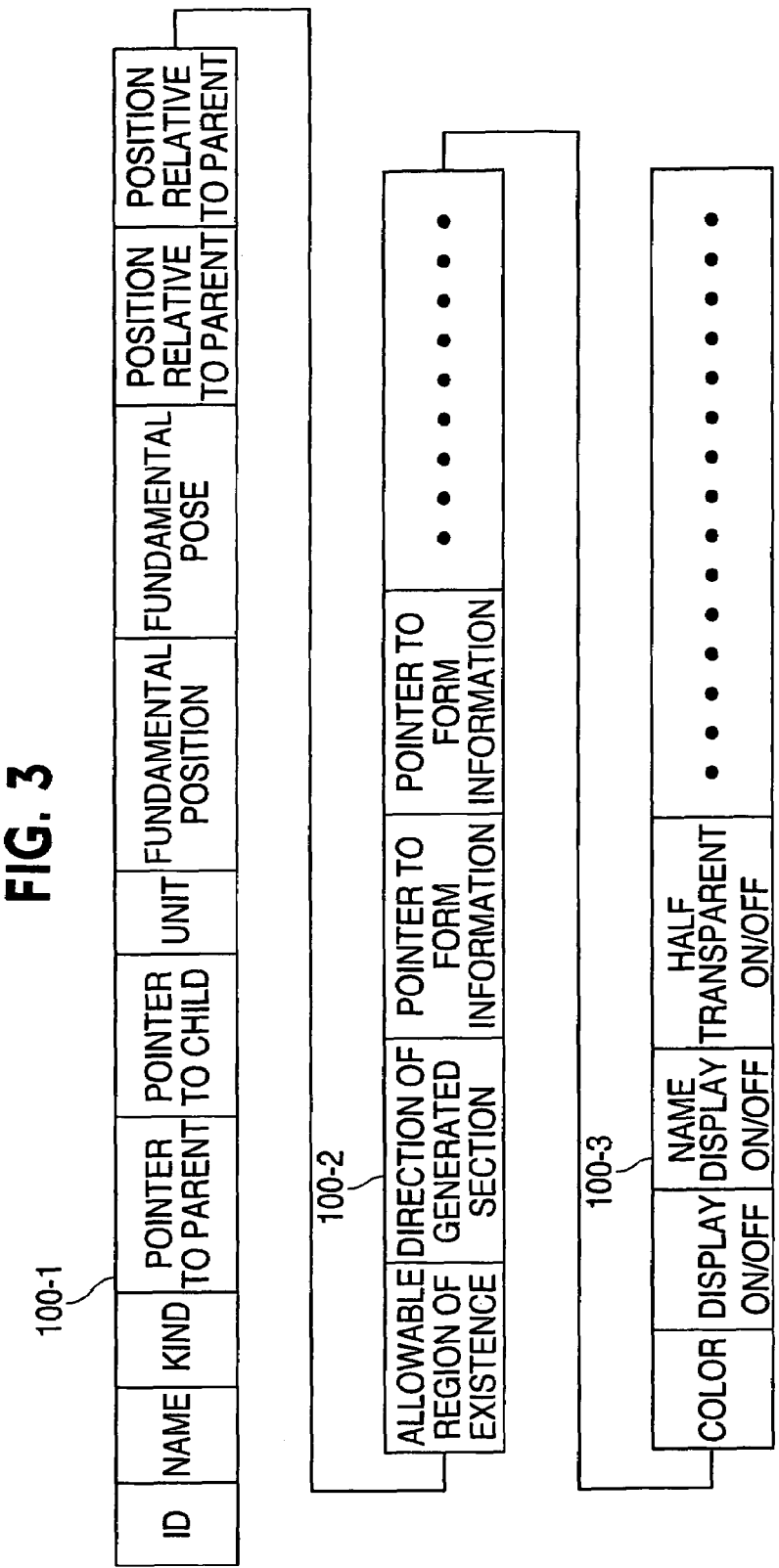
FIG. 3 shows the explanation figure of the space structure management table.

FIG. 3 shows the space structure management table 31 comprising components 100-1, 100-2 and 100-3.

The space structure management table 31 manages the attribute information of the parts concerning to the body formed in the virtual three-dimensional space, and the attribute information of a reference plane for displaying the section of the body and the plane for generating the section (same with the set displaying plane), as they are same one. It has a data structure shown in FIG. 3.

That is, the space structure management table 31 manages IDs, names, kinds (parts, the reference plane and the plane for generating the section etc.), pointers to parents (parts, reference plane, plane for generating section etc.), pointers to children (parts, reference plane, plane for generating section etc.), units (measure units of mm etc.), fundamental positions, fundamental poses, positions relative to parents, poses relative to parents, allowable regions of existence, directions of generated sections (set for reference plane, planes for generating the section), pointers to form information (there is not the form information for the reference planes, planes for generating the sections, but set pointers to the recalculating the sizes for setting in the screen), pointers to material information, colors (flags for displaying colors), display on/off (on/off flags for displaying), displaying name on/off (on/of flags for displaying names), half transparent on/off (on/off flags for half transparent displaying), etc.

On the other hand, the program 32 for displaying the section of the body is installed by the floppy disk or transmission line. It displays the exterior of the body formed on the virtual three dimension space 30 as shown in FIG. 4, and by responding to the direction of users thereon process for displaying the three dimensional section or two dimensional section showing the inner state of the body.

Figure 4:
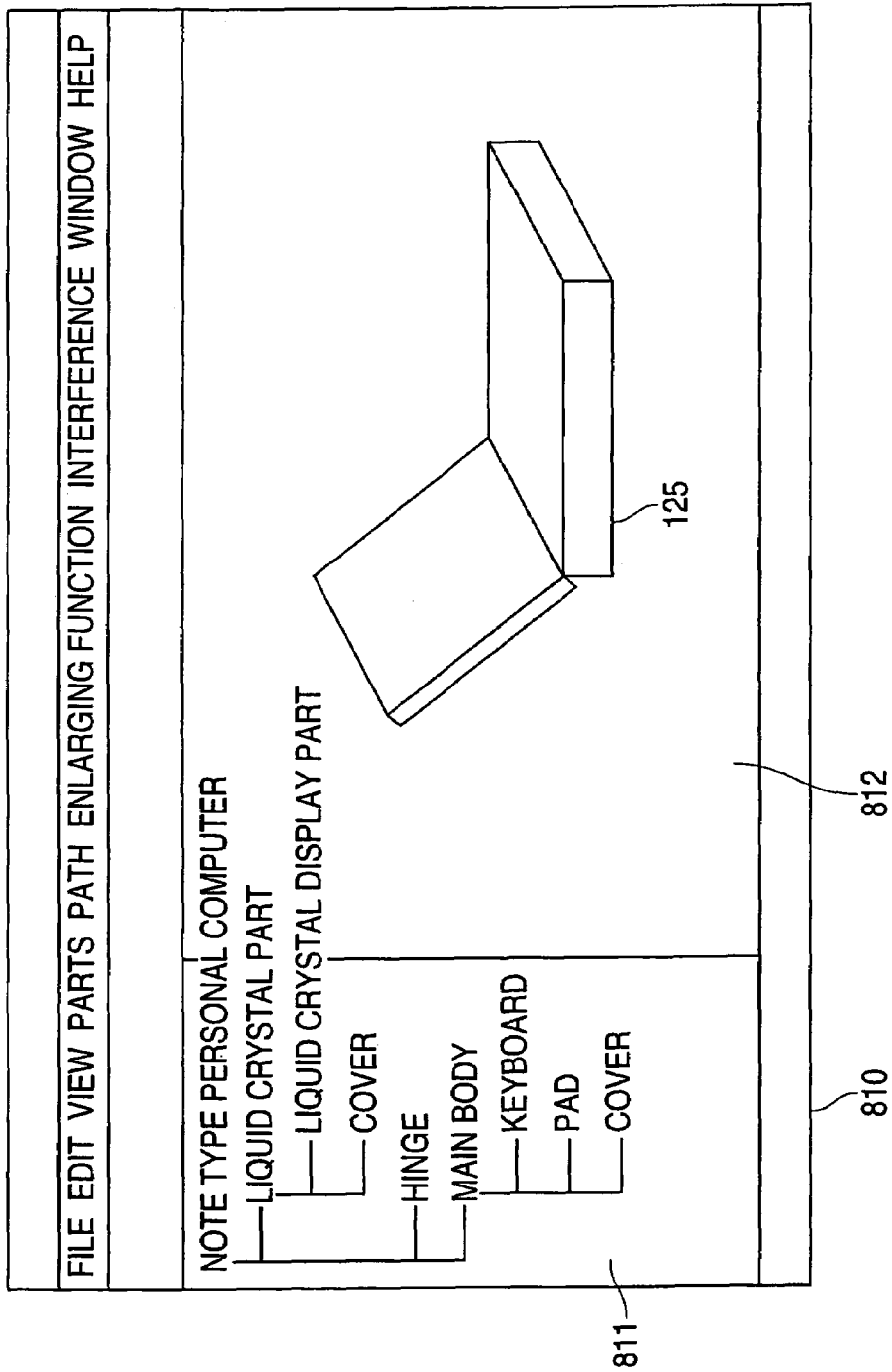
FIG. 4 shows the explanation of the process of the prgram for displaying the body section.

In FIG. 4, a screen 810, a tree structure 811 showing the parent relation of the plane for generating section, and a range 812 displaying the three dimensional section of body, display the range for selecting functions to make the body section are shown.

The tree structure shown in the range in FIG. 4 is a case that the reference plane and the plane for generating the section are not set, and that a otebook type personal computer displayed in the virtual three-dimensional space having a iquid crystal part, over and a ain body of child having a ey board ads and a over is shown.

From FIG. 5 to FIG. 13, one embodiment of process flow executed by the program 32 for displaying the body section is described. Next, according to the process flow, the out line of the present invention is explained.

Figure 6:
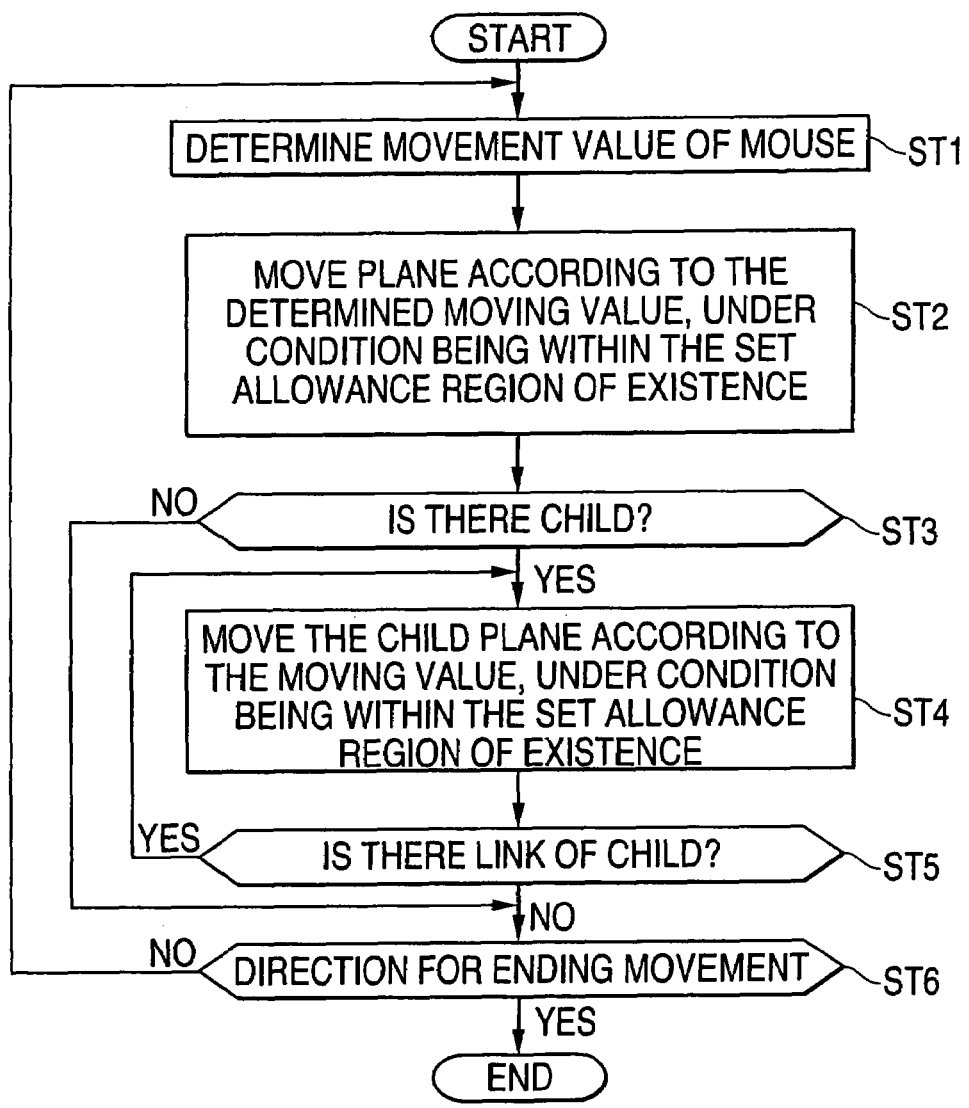
FIG. 6 shows the process flow of the program for displaying the body section.
Figure 44:
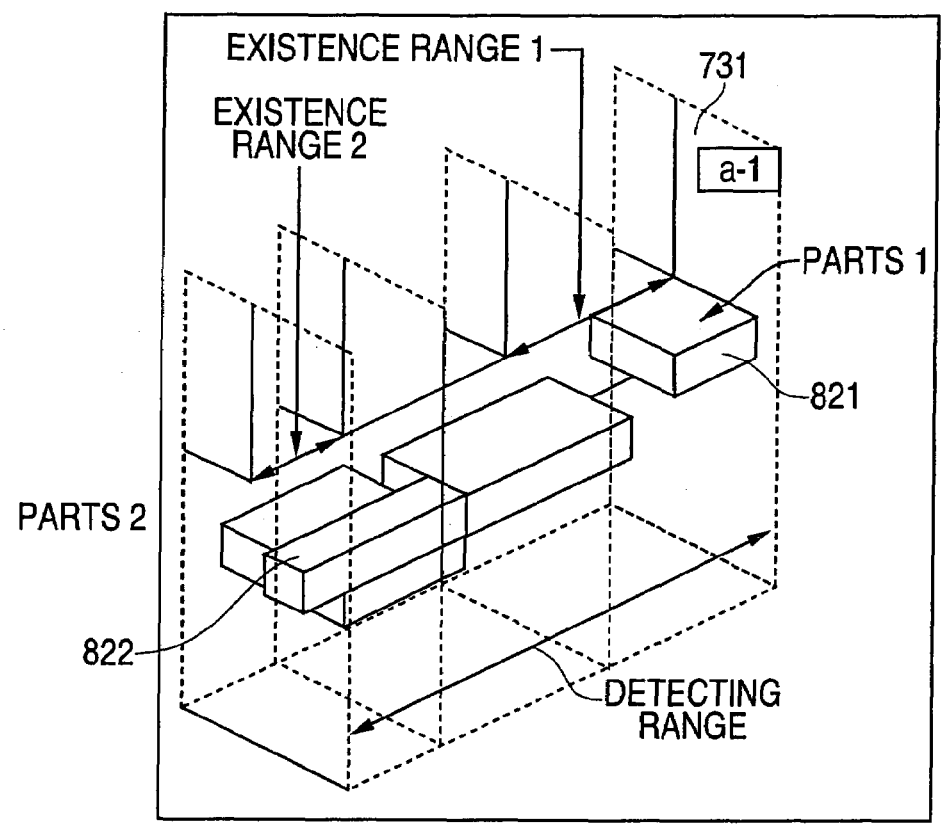
FIG. 44 shows explanation of the process of the program for displaying the body section.

FIG. 5A shows processes for requesting setting the reference plane. FIG. 5B shows processes for setting and adding the plane for generating the section. FIG. 6 shows processes for transferring the plane. FIG. 7 shows processes of request for displaying the section. FIG. 8 shows processes of request for two-dimensional section. FIG. 9 shows processes of request displaying the section. FIG. 10 shows processes of request for displaying. FIG. 11, FIG. 12 and FIG. 13 show processes of request for generating the plane for generating the section. The present invention is explained according to the flow chart, while the explanation FIG. 14 FIG. 44 are referenced in the explanation.

When a body is displayed in the three-dimensional space as shown in FIG. 4, and a request for setting the reference plane is issued from a user, at first, at step ST 1 of FIG. 5A, a plane designated by the cursor is specified, and at step ST 2 of FIG. 5A, a reference plane of which the parent is the specified parts is generated to register it in the space structure management table 31, and displays it on the reference plane.

FIG. 14–FIG. 19 show screens displaying acts of the present invention. In FIG. 14–FIG. 19, wherein like numerals refer to like parts throughout. In these figures a screen 810, the region 811 for displaying the tree structure of parents of the plane for generating the body section, the region 812 for displaying the body section, region 813, 814, 815 for selecting functions of process to edit the body section, and the object of the body section 125 are shown.

In FIG. 14, a menu 121 opened by the cursor designating a plane of parts is shown. In FIG. 14, it is a case designating the cover mv-coverprt The menu 122 in FIG. 14 shows the menu opened by designating dit in the menu 121. The menu in FIG. 14 shows the menu opened by designating dd In FIG. 15, the reference plane 126 having its ID tm0012 and a display of the ID 141 are shown.

Figure 16:
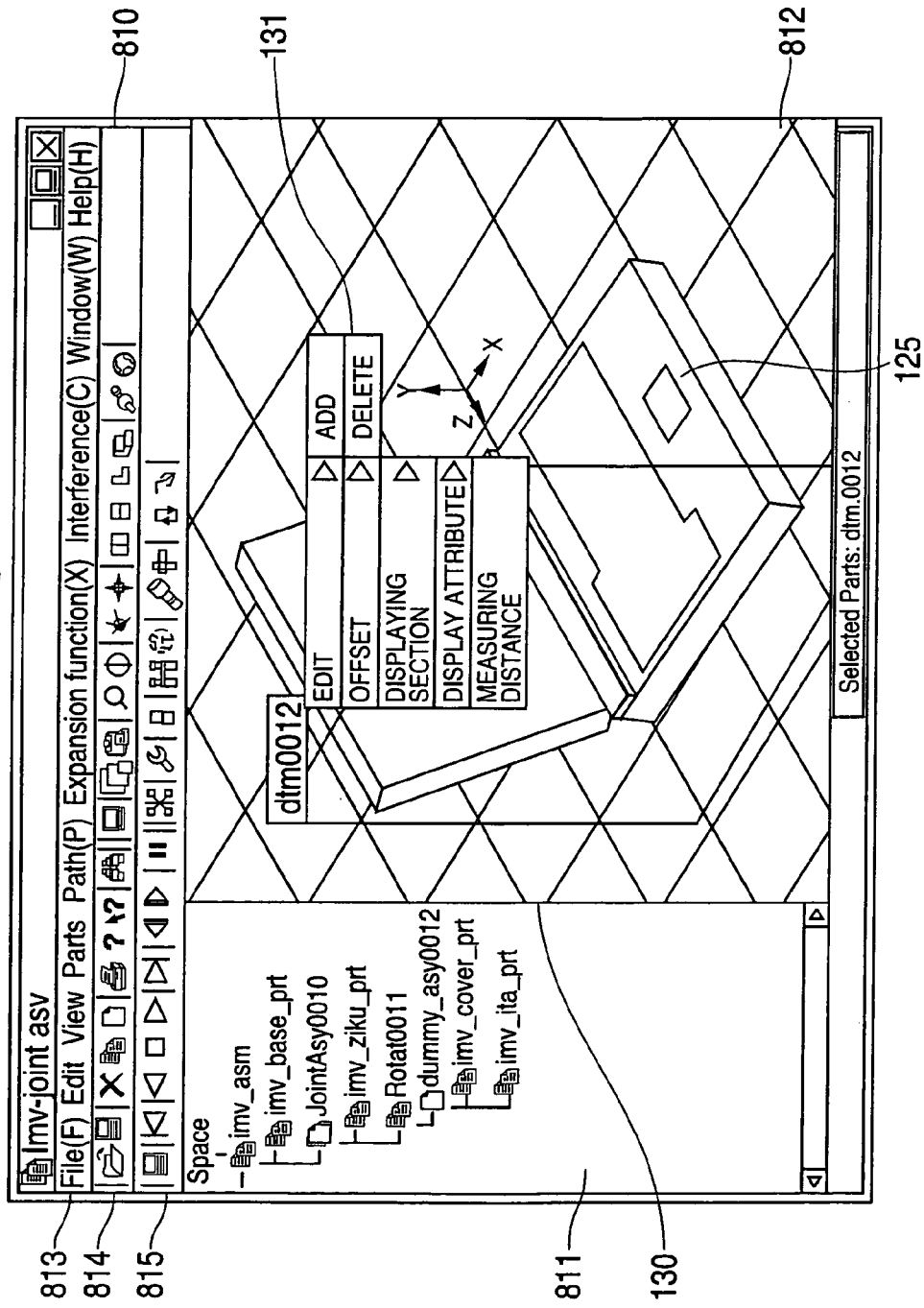
FIG. 16 shows the explanation of the display.

In FIG. 16, the menu 130, which is opened by cursor corresponding to the display of ID tm0012 is shown.

Figure 17:
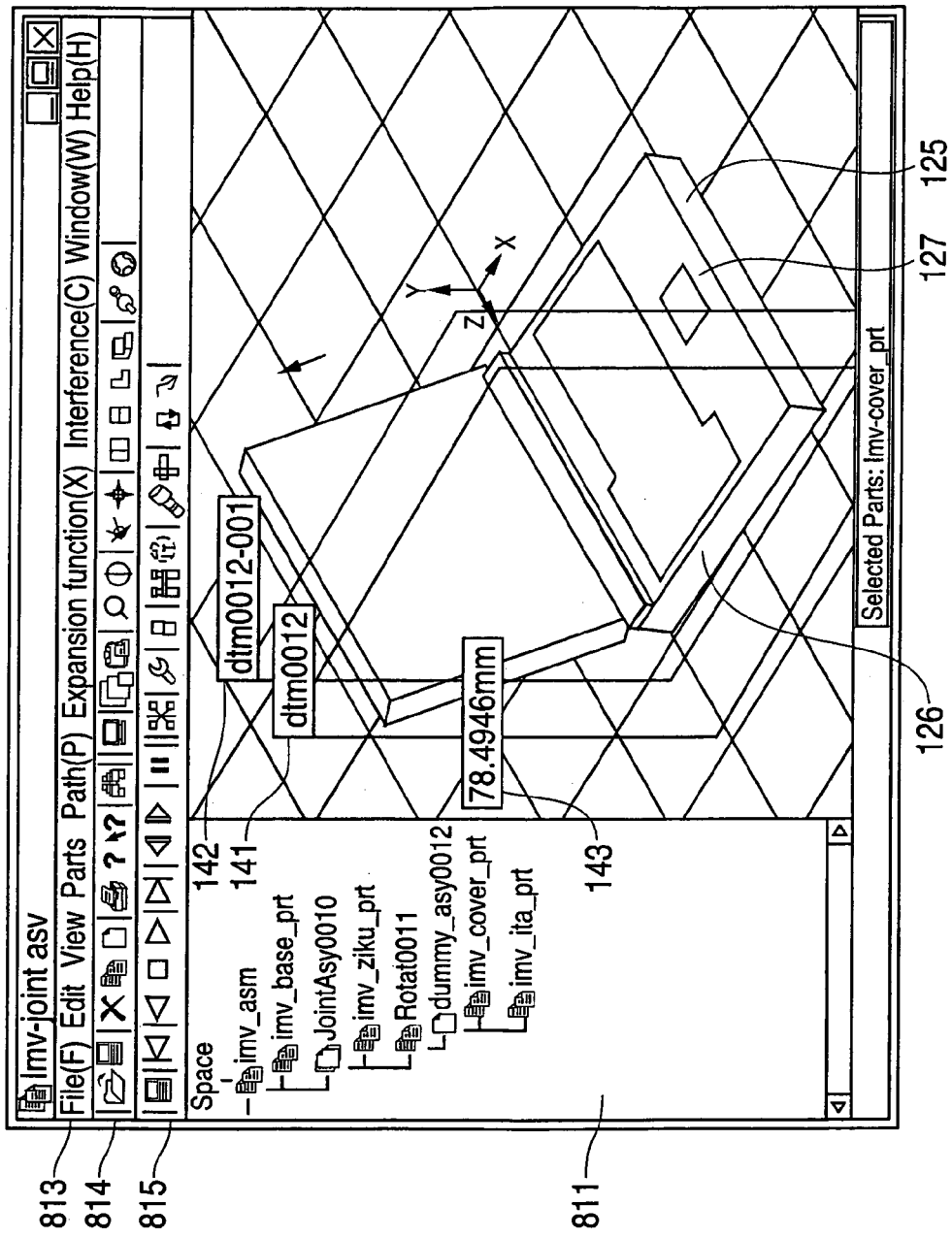
FIG. 17 shows the explanation of the display.

In FIG. 17, the plane for generating the section having ID of dmm0012-001 a display 142 of ID of the plane for generating the section 127 and an offset display of the plane 127 showing a distance from the reference plane 126 are shown.

Figure 18:
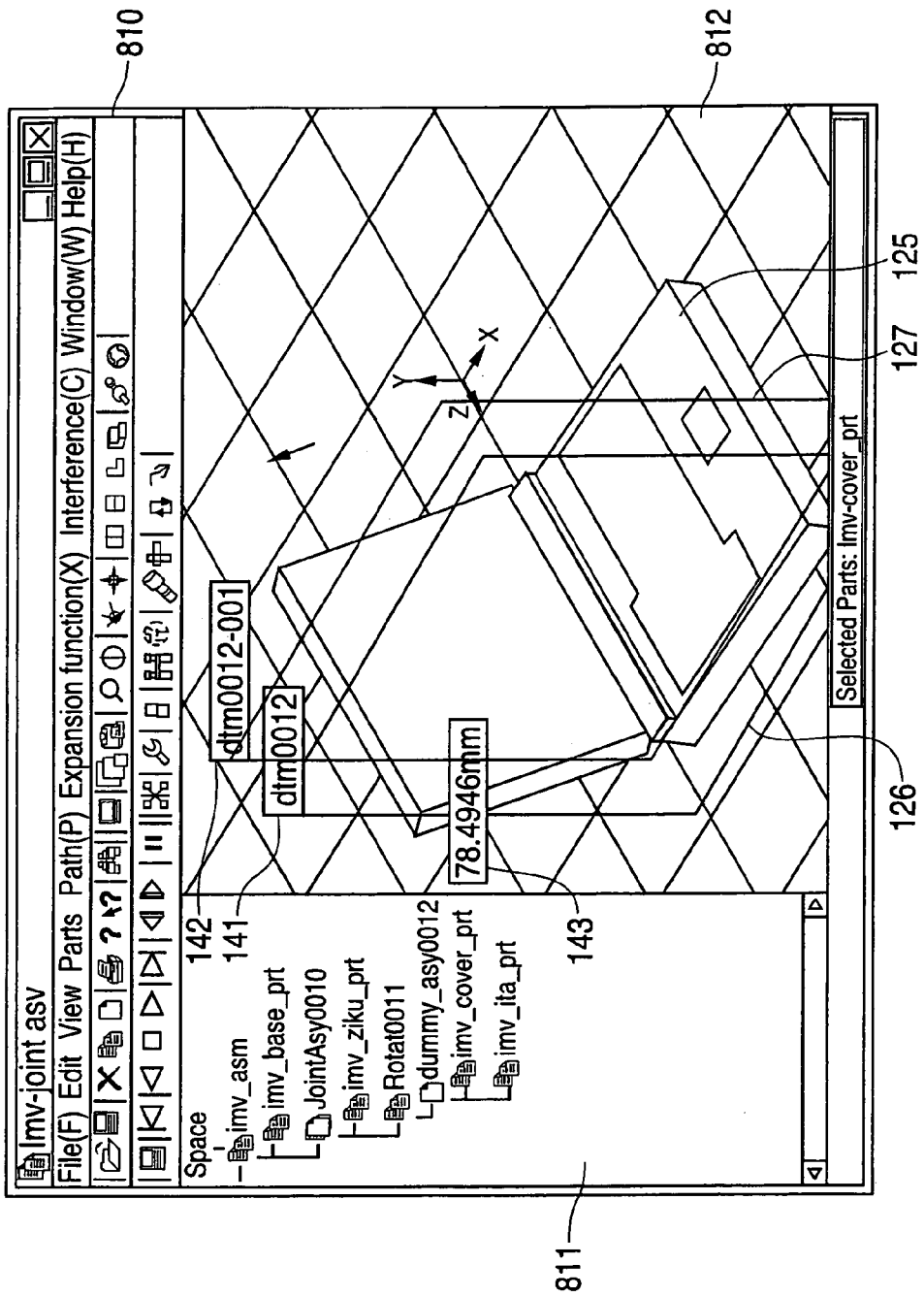
FIG. 18 shows the explanation of the display.

FIG. 18 shows a screen of a state registered the plane for generating the section 127 to the tree structure of the relation of the parent and child.

Figure 19:
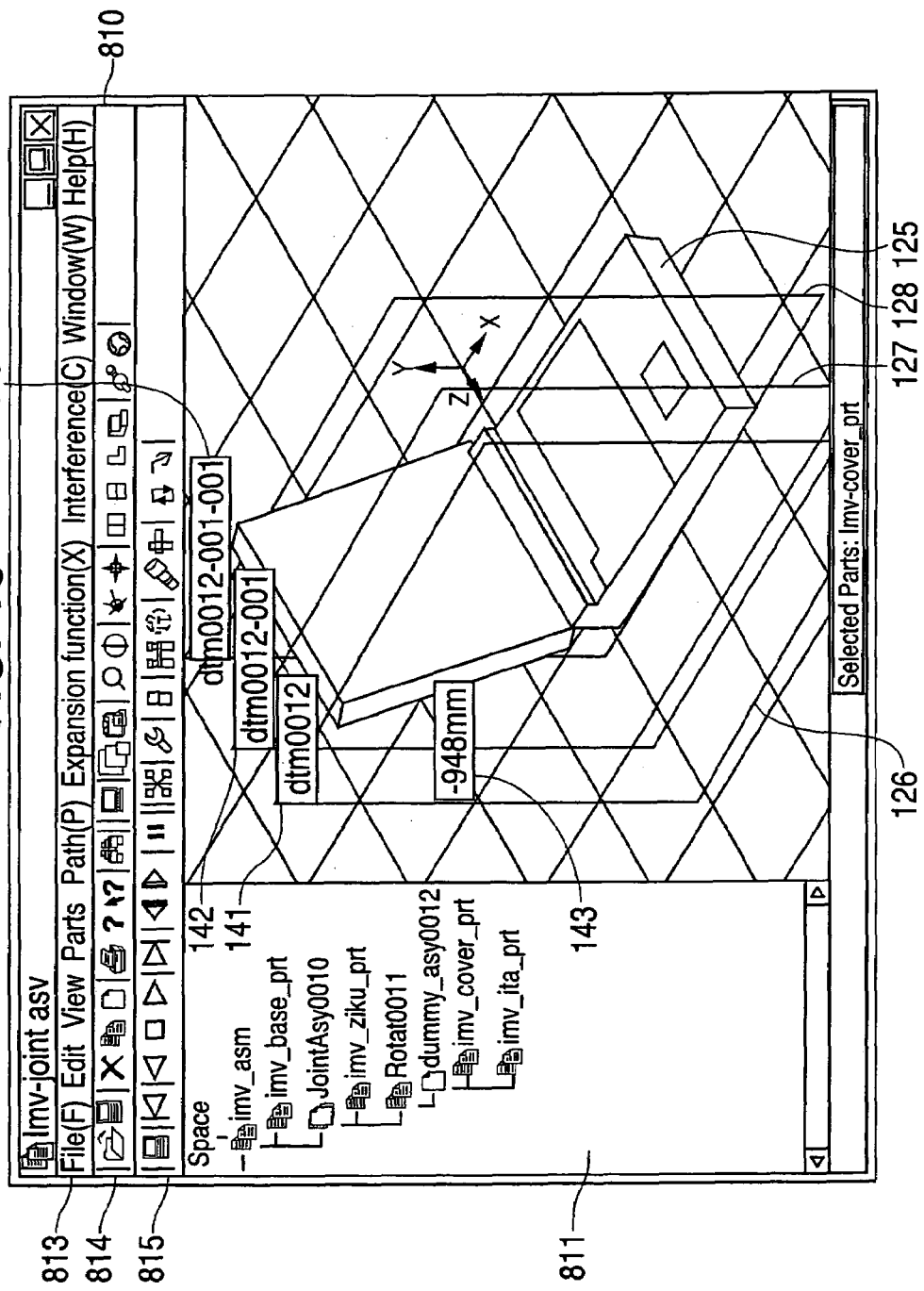
FIG. 19 shows the explanation of the display.

FIG. 19 shows the screen of the state registered the plane for generating the section 128 having the ID of mm0012-001-0012 to the tree structure shown in FIG. 18.

Figure 15:
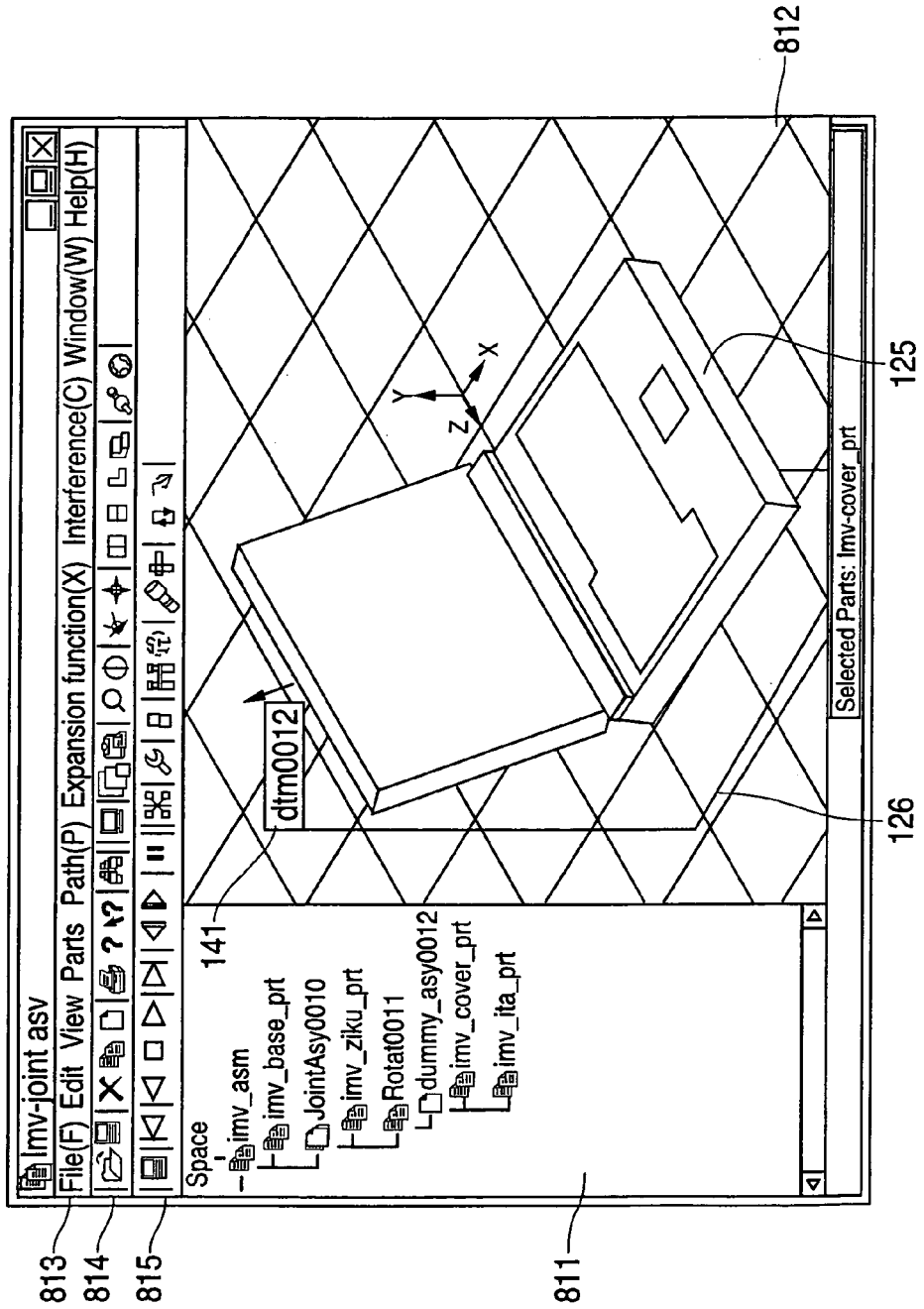
FIG. 15 shows the explanation of the display.

That is, as shown in FIG. 14, when, from a menu 123 which is opened in the time of cursor of designating to the parts (in this case, plane of mv-cover-prt), the reference plane is clicked by the mouse 3a, ID of tm0012 is generated to be registered in the space structure management table 31 Like this, the reference plane 126 is set and displayed on the display screen 810, as shown by the tree structure shown in the region 811 in FIG. 15.

Now, the program 32 for displaying the body section processes for the frame of the reference plane so as to be set in the display screen. For clicking the reference plane easily, a sign board (141, 142 in FIG. 14) arranging the string of letters of ID of the reference plane (in some cases, there is not the string of letters). Now the sign boad is displayed always in the display screen like the frame of a plane generating the section. Also, irection of the generating section registered in the space structure management table 31 is registered direction of a normal direction to the inner of the parts as initial value.

On the other hand, when a request setting and adding the plane for generating the section is issued from the user in time displaying the body of the three-dimensional form as shown in FIG. 4, the program 32, as shown in FIG. 5 (b) at first, at step ST 1, the program specifies the plane designated by the cursor (there is a cases that the plane is the reference plane and a plane for generating the registered section). Further the program 32 decides the position moved (the moving position of the normal direction) from the specified plane, and the step ST 3, a plane for generating the section positioned at the moved point of which the parent is the specified plane is registered in the space structure management table 31. Like this a plane for generating section 127 is set, and displayed on the display screen.

That is, as shown FIG. 16, when the dd on the plane for generating section is clicked by the mouse 3a on the menu opened by the designation of cursor designating the reference plane 126 or the plane for generating the section (in this case, it is a reference having ID of tm0012, and the transferring position (transferring position of normal direction) from the plane is decided, as shown in FIG. 17, the plane for generating section of ID of tm0012-001 is generated and registered in the space structure management table 31. Like this, the plane for generating section 127 is set and displayed on the displayed screen (tm0012-001 is added to the tree structure). Also as shown in FIG. 19, the plane for generating section of ID of tm0012-001-001 128 is registered in the space structure management table 31 and displayed on the screen 810.

Now, the program 32 for displaying body section processes for the frame of the plane for generating section so as to be set in the display screen. Also the sign board arranged the string letters of ID of the plane for registering is displayed to click easily the plane for generating section. Now the sign board is also displayed always on the display screen like the frame of the plane for generating the section. The ID is added for the parent plane so as to be known, like ID of "dtm0012-001" as the parent "dym001". Also, concerning to the irection of generated plane for registering in the space structure management table 31, the direction of the parent plane thereof is registered as initial value.

Figure 20:
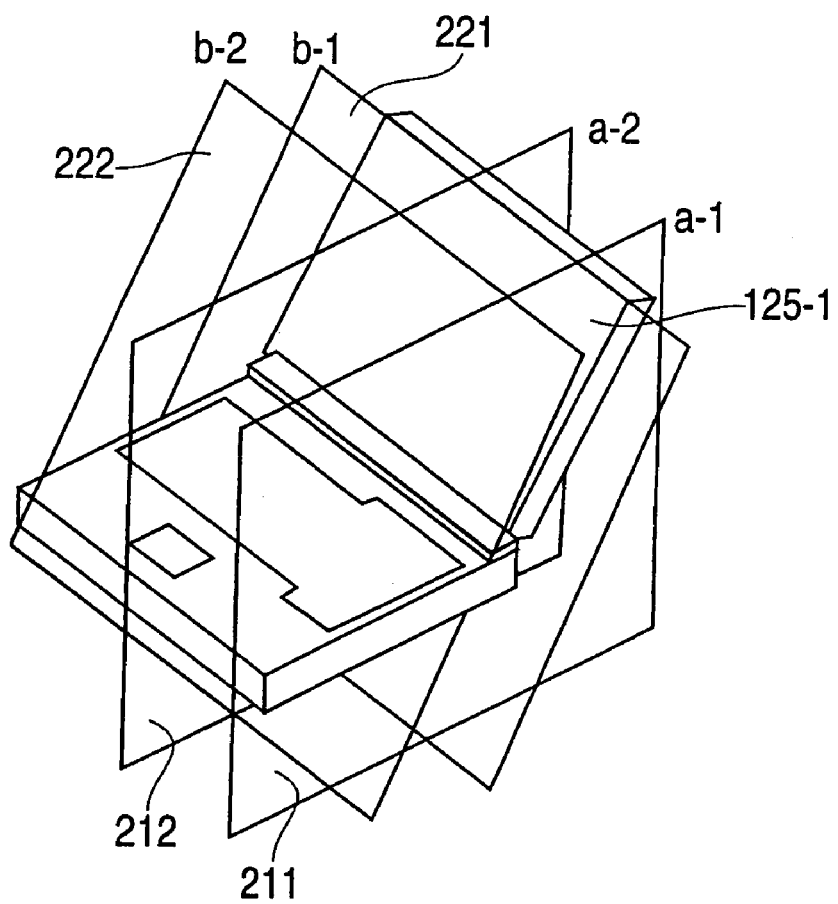
FIG. 20 shows explanation of the process of the program for displaying the body section.
Figure 21A:
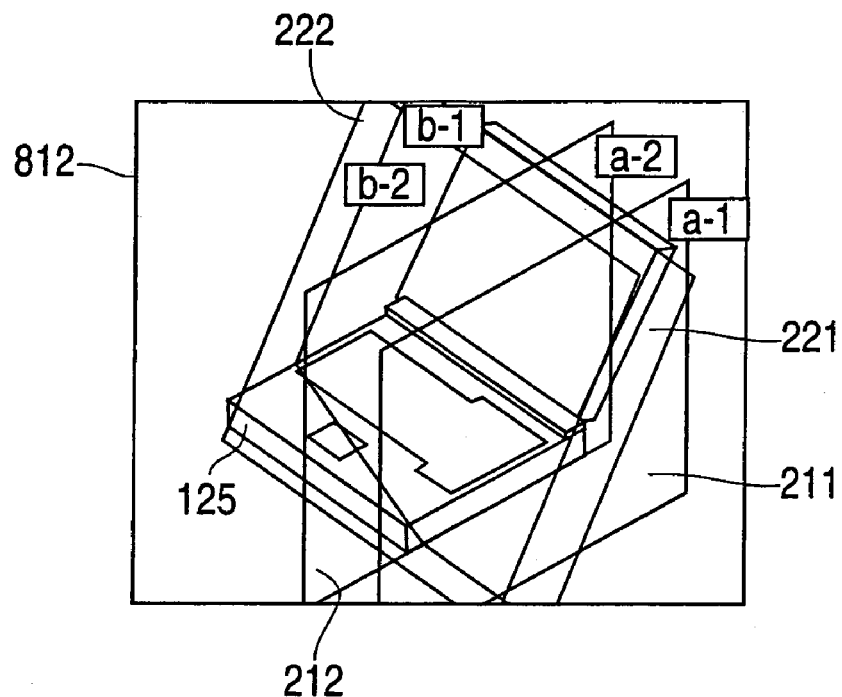
FIG. 21A shows Explanation of the process of the program for displaying the body section.
Figure 21B:
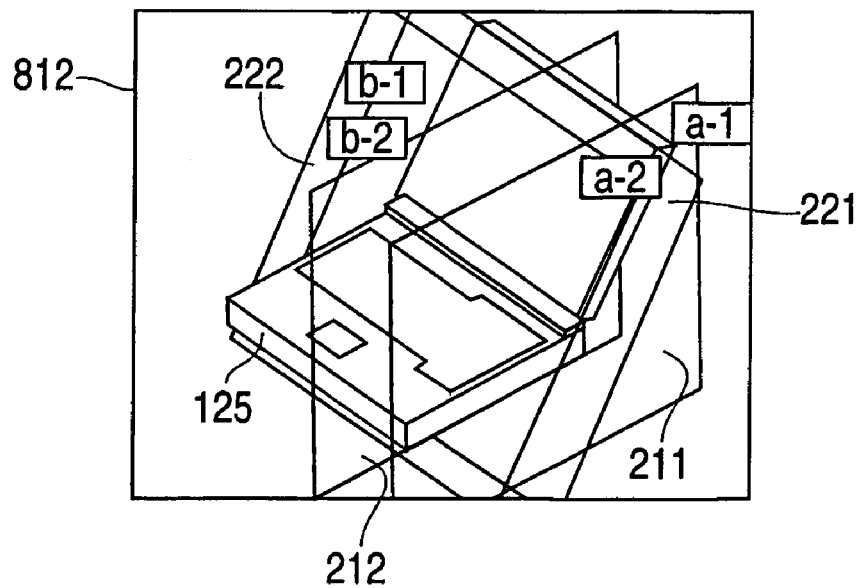
FIG. 21B shows explanation of the process of the program for displaying the body section.

FIG. 20 shows a case setting plural reference planes. FIG. 21A and FIG. 21B show displaying the relation between parent and child.

In FIG. 20, FIG. 21A and FIG. 21B, the body 125, the reference plane 211 and the plane 212 for generating the section corresponding to the reference plane 211, another reference plane 221, another plane 222 for generating the section corresponding to the reference plane 221 are shown.

The present invention, as examples, plural reference plane (a-1,b-1 in the figure) may be set, and they may be set on movable parts like a cover 125-1.

The plane 127,128 for generating the section of the child set like this is restricted to the reference plane 126 or plane for generating the section of the parent (for the plane 128, it is the plane 127). That is, in the case of the embodiment, the moving direction of the plane is restricted by the normal direction of the parent plane. Also as describing later, when a parent plane moves, the child plane moves by being linked with a parent. The set displaying plane set to a parent part is not affected to the movement or rotation of child parts. The child part can move or rotate independently to the parent part keeping the relation with the parent, and a set displaying plane set to the child part moves and rotates according to the movement or rotation of the child part.

The program for displaying body section 32 may not display the reference plane 126 or the plane (127,128) for generating section with a frame, but displays a plane having half transparent color as shown in FIG. 21(*a*). In this case, the planes having a relation of parent and child are displayed with same half transparent colors for showing the relation of parent and child. Or concerning to the plane having a relation to a parent and child, the sign board (a-1,a-2), (b-1,b-2) may be displayed arranged as shown FIG. 21 (*b*).

Like this, the information of relation of parent and child of the reference plane and the plane for generating section registered in the space structure management table 31 is displayed on the screen of the terminal 2 by the same process for the parts of body of the program displaying body structure 32.

For example, when a reference plane -1 of which parent is over of iquid crystal part of ote type personal computer and a plane -2 for generating section of which the parent is the reference plane -1 are set, and a reference plane -1 of which parent is over of ain body of ote type personal computer and also a plane -2 for generating section of which the parent is the reference plane -1 are set, the information of the parent and child relation is displayed on the display screen 810 of the terminal 2 as shown FIGS. 22 A and 22 B.

Figure 22A:
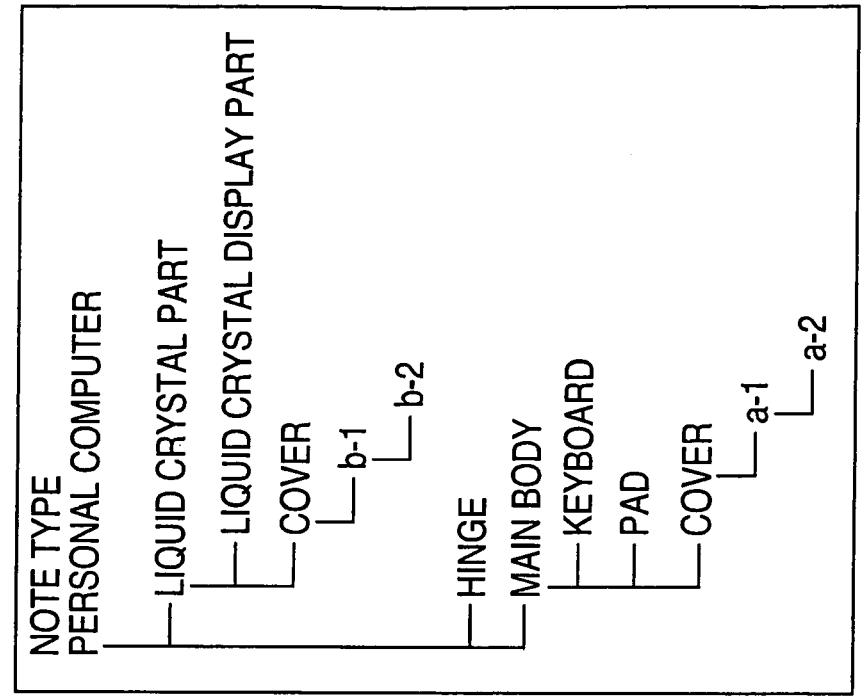
FIG. 22A shows explanation of the process of the program for displaying the body section.
Figure 22B:
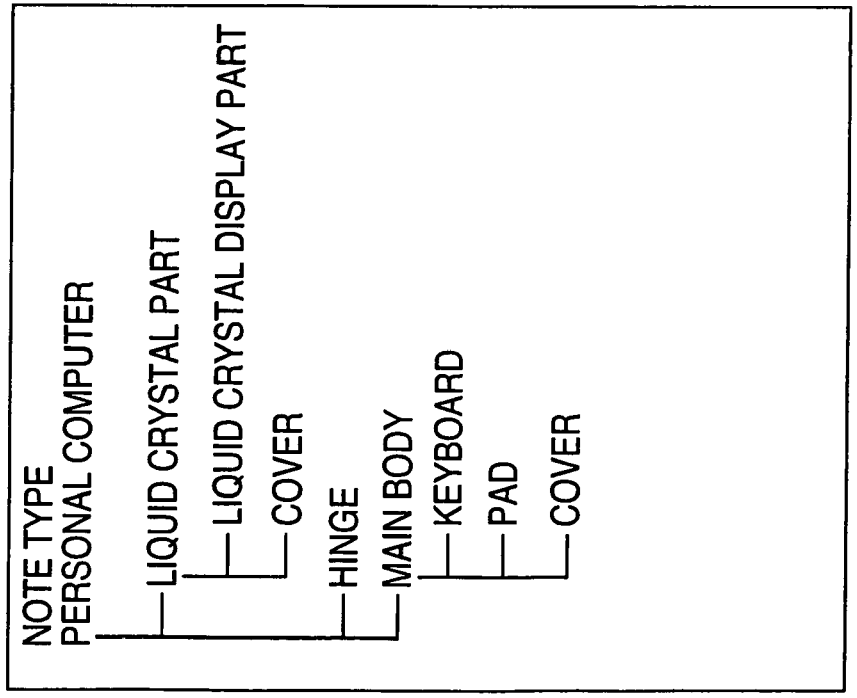
FIG. 22B shows explanation of the process of the program for displaying the body section.

In FIGS. 22 A and 22 B, the display region 300, 301 of the tree structure of the plane for generating the section are shown, In FIG. 22A, the tree structure 300 of the plane for generating the section has the stricture composing of "note type personal computer", "liquid crystal part", the "liquid crystal part displaying part", "cover", "hinge", "main body", "keyboard", "pad" and "cover" as shown in the drawing. Corresponding to the set of the reference planes and the planes for generating the section, the tree structure is changed as shown in FIG. 22B. That is, the reference plane a-1 and the plane a-2 of the child of the reference a-1, and the reference b-1 and the plane b-2 of the child of the reference b-1 are shown in FIG. 22 B.

While the body is displayed with the reference plane 126 and the plane for generating the section in the three-dimensional section as shown in FIG. 18, when users click and drag by the mouse 3*a*, the sign board (or display of the plane ID) for the plane for generating the section on the display of the reference plane 126 and the plane 127, 128 for generating the section, the request of transferring (the request of transferring for the reference plane is permitted also, the process is processed by the same process) is issued. Further, the program 32 for generating the body section finds the movement value of mouse 3*a* (transferring direction is contained) at step ST 1 of FIG. 6, next in following step ST 2 of FIG. 6, the information managed by the space structure management table 31 (position information/pose information) is updated, according to the movement value within the allowable region of existence ("allowable region of existence" managed by the space structure management table 31) set for the plane for generating the section requested the transfer. Like this, the position of the plane for generating the section requested transfer is transferred.

Figure 23:
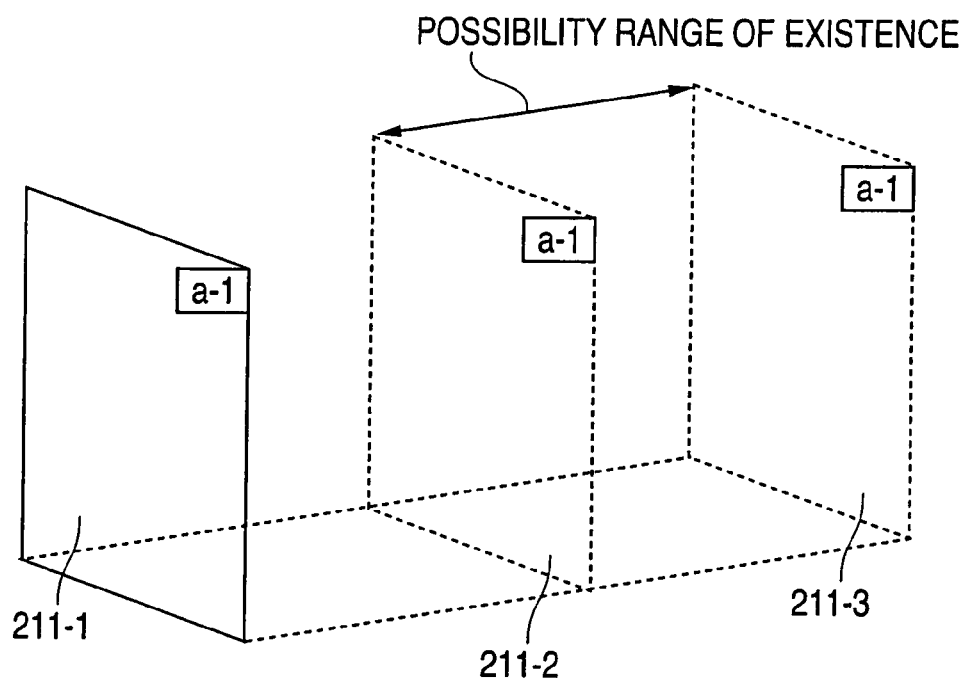
FIG. 23 shows explanation of the process of the program for displaying the body section.

FIG. 23 shows an explanation drawing of the allowable region of existence of the plane for generating the section. In FIG. 23, the reference plane (plane for generating the section) 211-1, 211-2, 211-3 is shown. The reference plane (the plane for generating the section) exists between the position of the plane 211-2 and plane 211-3.

Figure 24:
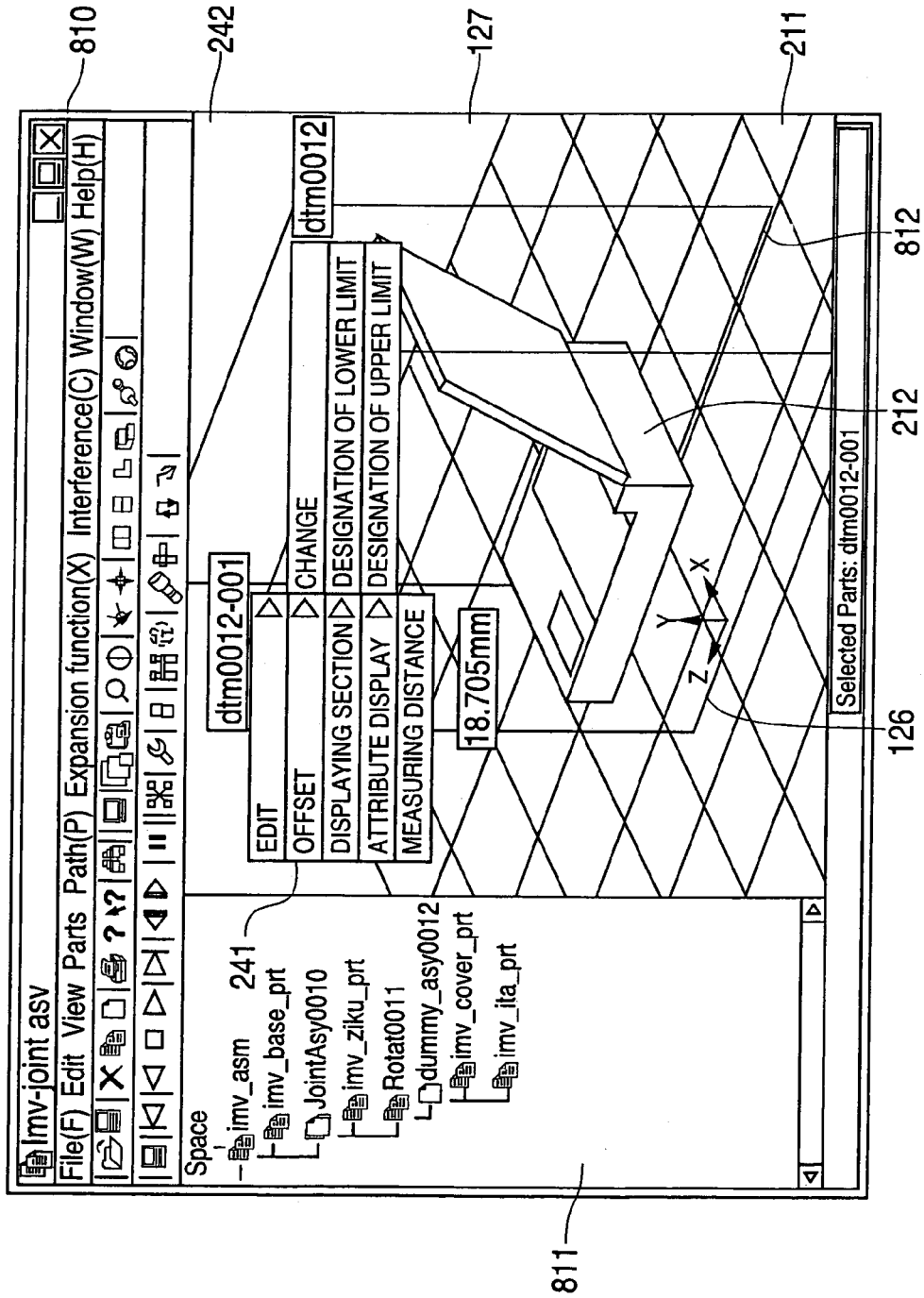
FIG. 24 shows the explanation of the display.

FIG. 24 shows a screen for setting the reference plane, and the allowable region of existence of the plane for generating the section. In FIG. 24, the reference plane 126 and the plane for generating the section are displayed. In FIG. 24, reference number 212 shows a menu opened by cursor designating the menu 141 of ff set. The menu is for setting the allowable region of existence of the plane for generating the section (or the reference plane). In FIG. 24, the case setting the upper limit is shown.

That is an existence region of the plane for generating the section (an existence region in direction of transfer) is registered on the space structure management table 31 according to the llowable region of existence as shown in FIG. 23. When the allowable region of existence is registered, the transfer process of the plane for generating the section is implemented within the range of the registered allowable region of the existence Now the process of the register of the xistence range is implemented as following. Users designate the plane for generating the section (or the reference plane) of the registering object) and decides the position, and issue a request for setting esignation of upper limit and esignation of lower limit according to the menu shown in FIG. 24. The program 32 for generating section registers the position set by the pper limit and ower limit in the space structure management table 31.

Next at step ST 3 of FIG. 6, referring the space structure management table 31, it is checked whether a plane for generating section for child is set for the plane for generating section having the transfer request. When a plane for generating section for the child is set, at step ST4 of FIG. 6, the information (position information and pose information) managed by the space structure management table 31 is updated according to the movement value within the allowable region of existence for the plane for generating section of child. Like this, the plane for generating section of child is transferred.

Next at step ST 5, referring the space structure management table 31, it is checked whether a plane for generating section for child is set for the plane for generating section processed at step ST 4. When a plane for generating section for the child is set, returning to step ST4, the information (position information and pose information) managed by the space structure management table 31 is updated according to the movement value within the allowable region of existence for the plane for generating section of child.

Further at step ST 5/step ST 3, when the plane for generating section is not decided at step ST 6, it is found whether the user designates ending or not the transfer process. When the designation exists, the process is ended, and when the designation does not exist, returning to the step ST 1, the transfer of the plane for generating section of transfer request is continued.

FIGS. 25A, 25B are drawings for explaining the transfer process of the plane for explaining the section. FIG. 25 A shows a state before moving the plane for generating the section, and FIG. 25B shows a state after moving the plane for generating the section. In FIG. 25 A, the plane for generating the section 211 is a plane for generating the section of which parent is the cover 125-1, the plane for generating the section 212 is a plane for generating the section of which parent is the plane for generating the section.

As mentioned above, for example, in case that a reference plane -1 of which parent is ain body of ote type personal computer and that a plane for generating the section -2 of which a parent is the reference plane -1 and that a reference plane -2 of which a parent is the reference plane -2 are set, when the plane for generating section -2 is transferred (the normal direction of the reference plane -1 is the transfer direction) by the direction of the user as shown FIG. 25, linking with the transfer, the plane for generating section -3 which is child of the plane for generating -2 is processed so as to transfer (the reference plane -1 (the normal direction of the reference plane -1 is transfer direction.

Figure 26:
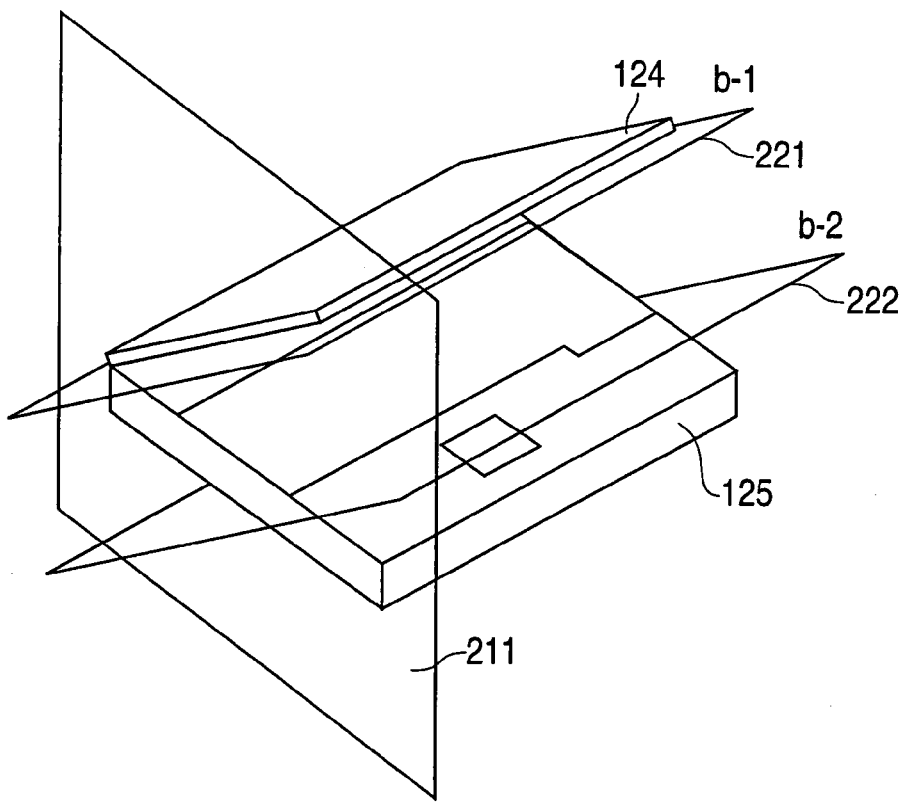
FIG. 26 shows explanation of the process of the program for displaying the body section.

FIG. 26 shows a drawing of explanation of the simultaneous movement of the reference plane and the plane for generating the section. In FIG. 26, a cover 125-1 of the personal computer body 125, a reference plane (b-1) 221 of which parent is the cover 125-1, and a reference plane (b-2) 222 of which parent is the plane for generating the section 221.

Also, as the space structure management table 31 manages the reference plane and the plane for generating section by the same data structure of the parts of the body, in the case that the reference plane -1 of which parent is over125-1 of ain body, and a plane of which parent is the reference -1 is set, when the over125-1 is opened or closed by the designation of the user, the reference plane -1 of child of the over125-1 and the plane for generating the section of the -2 of child of the reference plane -2 move simultaneously, while the over opening or closing.

as shown in FIG. 18, when the body is displayed in the three dimensional space and, while the reference plane 126 and the plane 127 for generating section being displayed, the request for displaying the body section is issued from the user, the program 32 for displaying body section references the space structure management table 31 at step ST 31, and determines the generating direction of the reference plane and plane for generating section at first as shown in FIG. 7.

Figure 27:
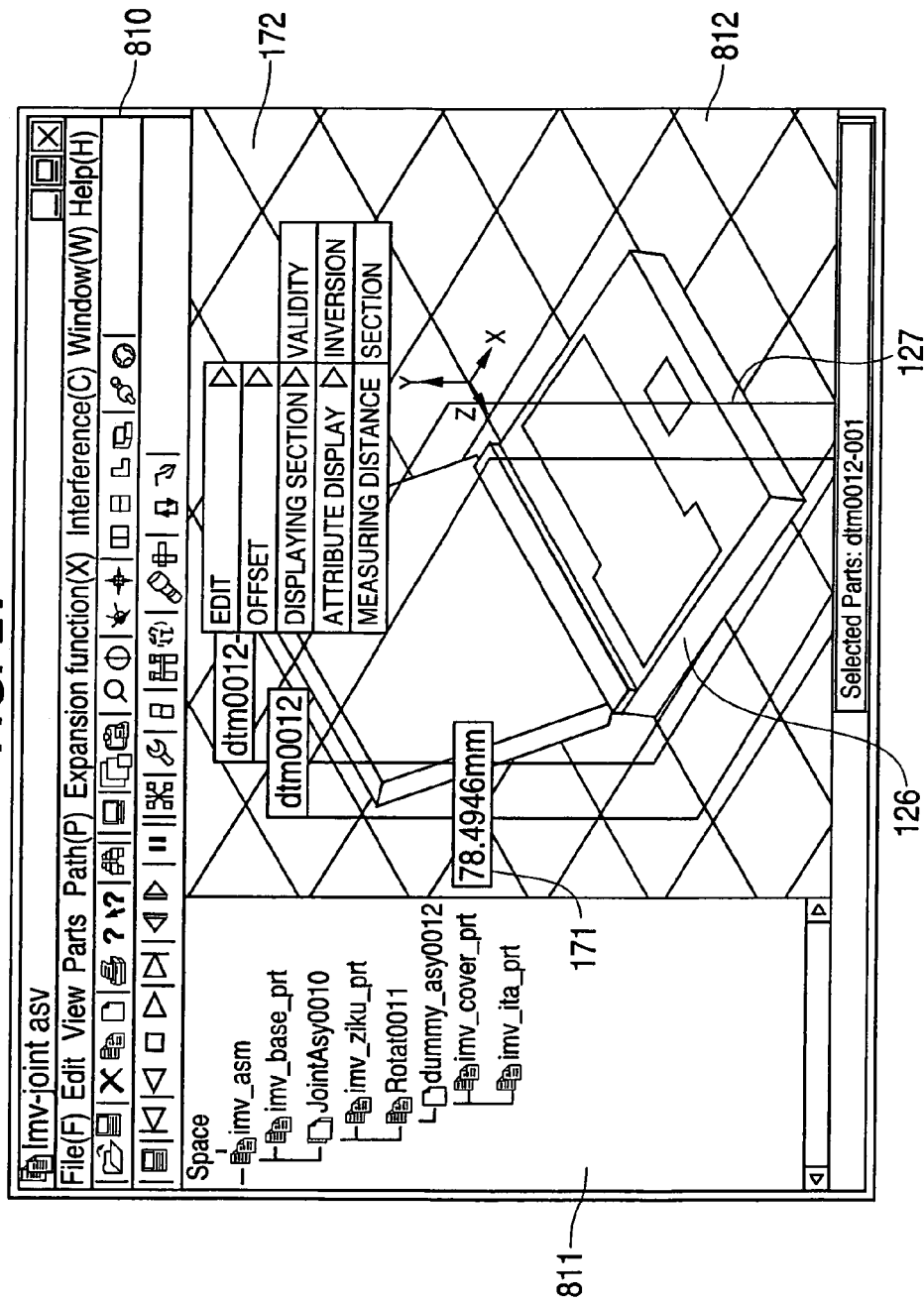
FIG. 27 shows explanation of the display.

FIG. 27 shows a drawing for explaining the generating direction of the plane for generating the section. In FIG. 27, the menu 171 is opened by designating the reference or the plane for generating the section by a cursor. The menu is setting the generating direction of the reference plane or the plane for generating the section directed by the cursor. The menu 172 is opened by designating the menu 171 by a cursor.

That is, as shown in FIG. 27, when the request for displaying the body section is issued by the user clicking the ffective of the ection displaying on the menu 171, 172 opened by the user designation of the reference plane and the plane for generating section, the generating direction of the set reference plane and plane for generating the section is determined by referencing the space structure management table 31.

Next, at step ST 2 of FIG. 7, a plane is decided by the determined generating specified direction of the body section.

FIGS. 28 A,B,C and D shown a drawing for explaining the direction of the generating direction of the plan for generating the section.

Figure 28A:
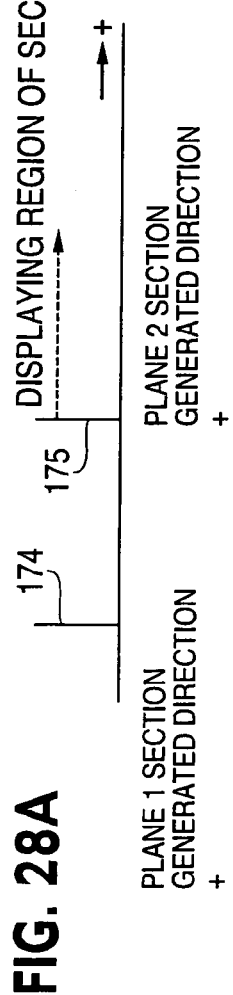
FIGS. 28A–D show explanations of the process of the program for displaying the body section.

In FIG. 28A, reference number 174 is the plane 1 for generating the section having the generating direction of positive, reference number 175 is the plane 2 for generating the section having the generating direction of positive. In FIG. 28A, the section displayed region is defined in the direction of positive from the plane 2 for generating the section (175).

Figure 28B:
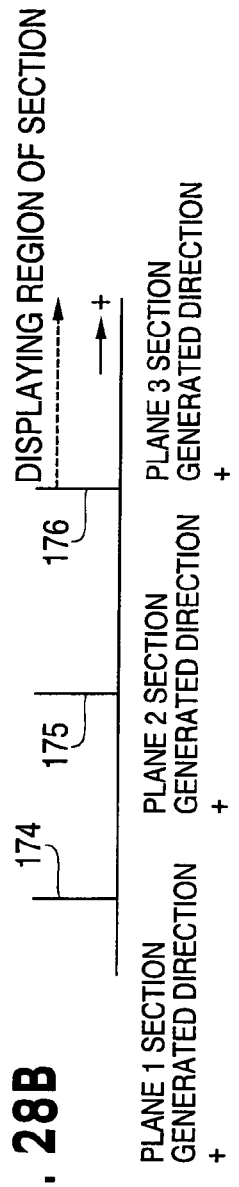

In FIG. 28B, reference number 174 is the plane 1 for generating the section having the generating direction of positive, reference number 175 is the plane 2 for generating the section having the generating direction of positive, reference number 176 is the plane 3 for generating the section having the generating direction of positive. In FIG. 28B, the section displayed region is defined in the direction of positive from the plane 3 for generating the section (176).

Figure 28C:
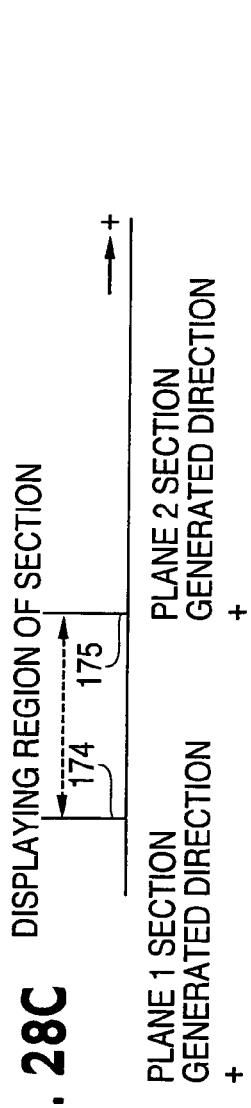

In FIG. 28C, reference number 174 is the plane 1 for generating the section having the generating direction of positive, reference number 175 is the plane 2 for generating the section having the generating direction of negative. In FIG. 28C, the section displayed region is defined between the plane 1 for generating and the section (174) the plane 3 for generating and section (175).

Figure 28D:
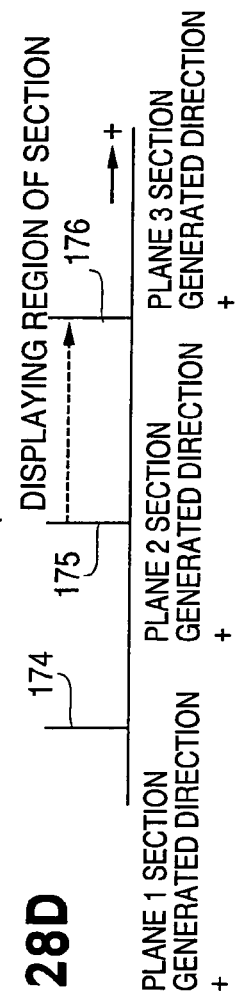

In FIG. 28D, reference number 174 is the plane 1 for generating the section having the generating direction of positive, reference number 175 is the plane 2 for generating the section having the generating direction of positive, reference number 176 is the plane 3 for generating the section having the generating direction of negative. In FIG. 28D, the section displayed region is defined between the plane 2 for generating and the section (175) the plane 3 for generating and section (176).

For example, as shown in FIG. 28 A, when the generating direction of the section of the plane 1 is +direction, and the plane 2 which is positioned in +direction from the plane 1 is + direction, the plane 2 is decided as a plane for generating the body section. Also, as shown in FIG. 28 B, when the direction of the generating direction of the plane 1 is + direction, and the generating direction of the plane 2 which is positioned in + direction from the plane 1 is + direction, and the generating direction of the plane 3 which is positioned in + direction from the plane 2 is + direction, the plane 3 is decided as the plane for generating the section.

Also, as shown in FIG. 28 C, when the generating direction of the section is +direction, and the generating direction of the plane 2 which is positioned in +direction from the plane 1 is − direction, the plane 1 and the plane 2 are decided as a plane for generating the body section. Also, as shown in FIG. 28 B, when the direction of the generating direction of the plane 1 is + direction, and the generating direction of the plane 2 which is positioned in + direction from the plane 1 is + direction, and the generating direction of the plane 3 which is positioned in + direction from the plane 2 is − direction, the plane 2 and the plane 3 are decided as the plane for generating the body section.

Figure 29:
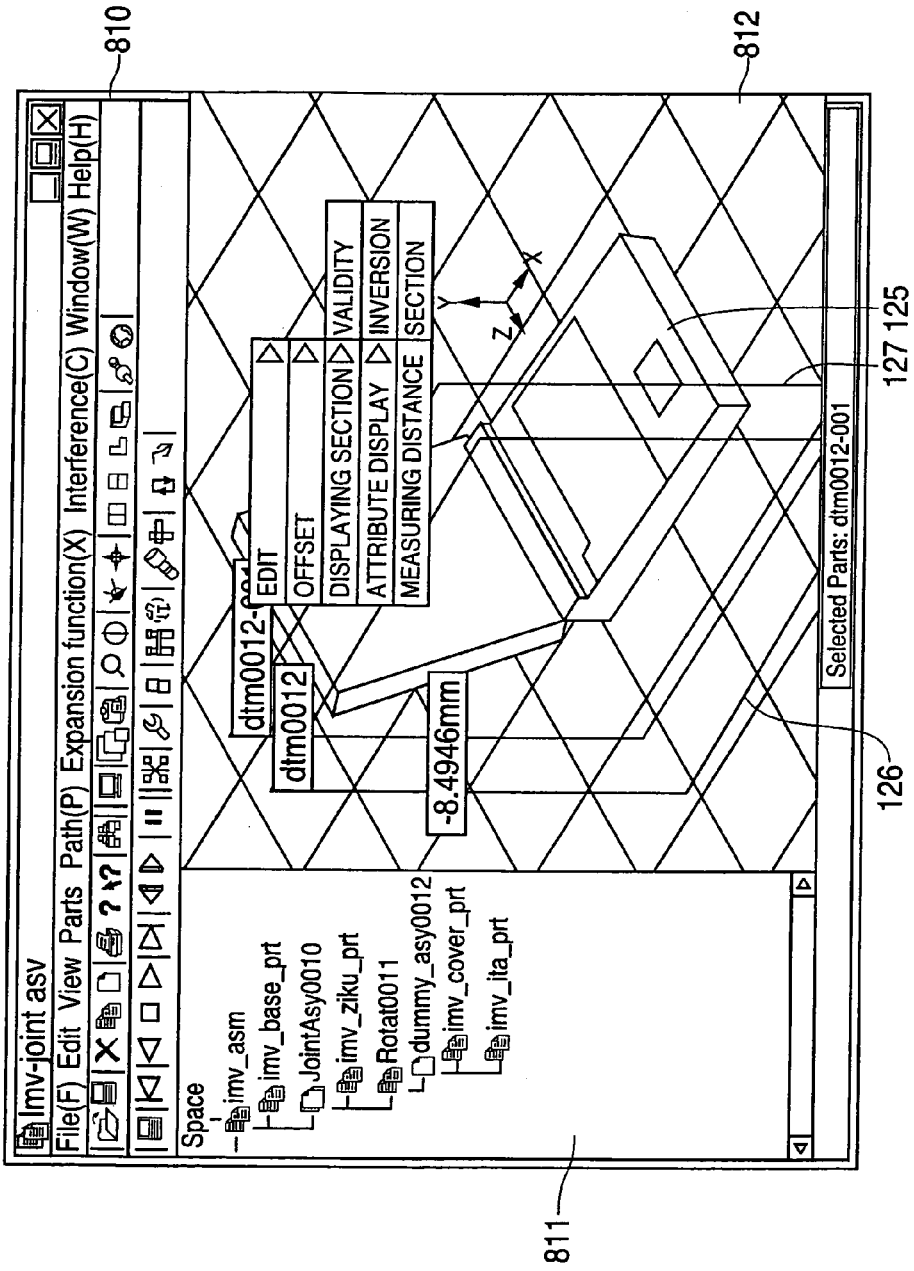
FIG. 29 shows the explanation of the display.

FIG. 29 shows a screen displaying the generating section cut by the plane 127 for generating the section. In FIG. 29, the reference plane 126, the plane 127 for generating the section, the generating section 126-1 menu 171 and menu 172 are shown. The menu 171 and 172 are for changing the generating direction of the plane for generating the section.

Figure 30:
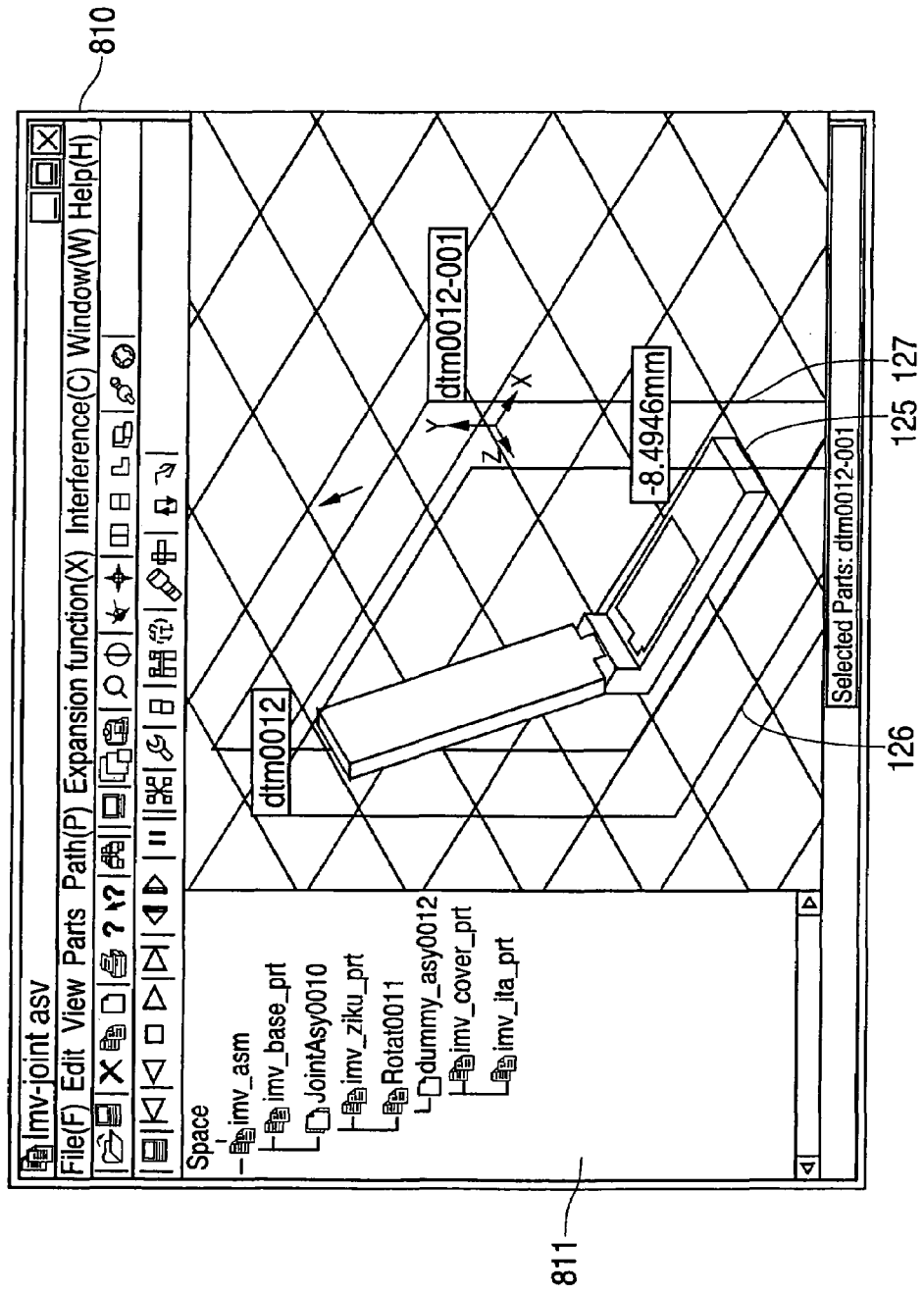
FIG. 30 shows the explanation of the display.

FIG. 30 shows a screen displaying the section cut by the plane 127 changed the generating direction of the section by the menu 171,172 in FIG. 29. In FIG. 30, the object body 125 cut by the plane 126 and the plane 127 are shown. The section of FIG. 30 can be seen from a view point at the right side of the cut object body 125, while seeing the body 125 in direction of the objective body as shown in FIG. 30, the section cannot be seen in FIG. 30.

Figure 31:
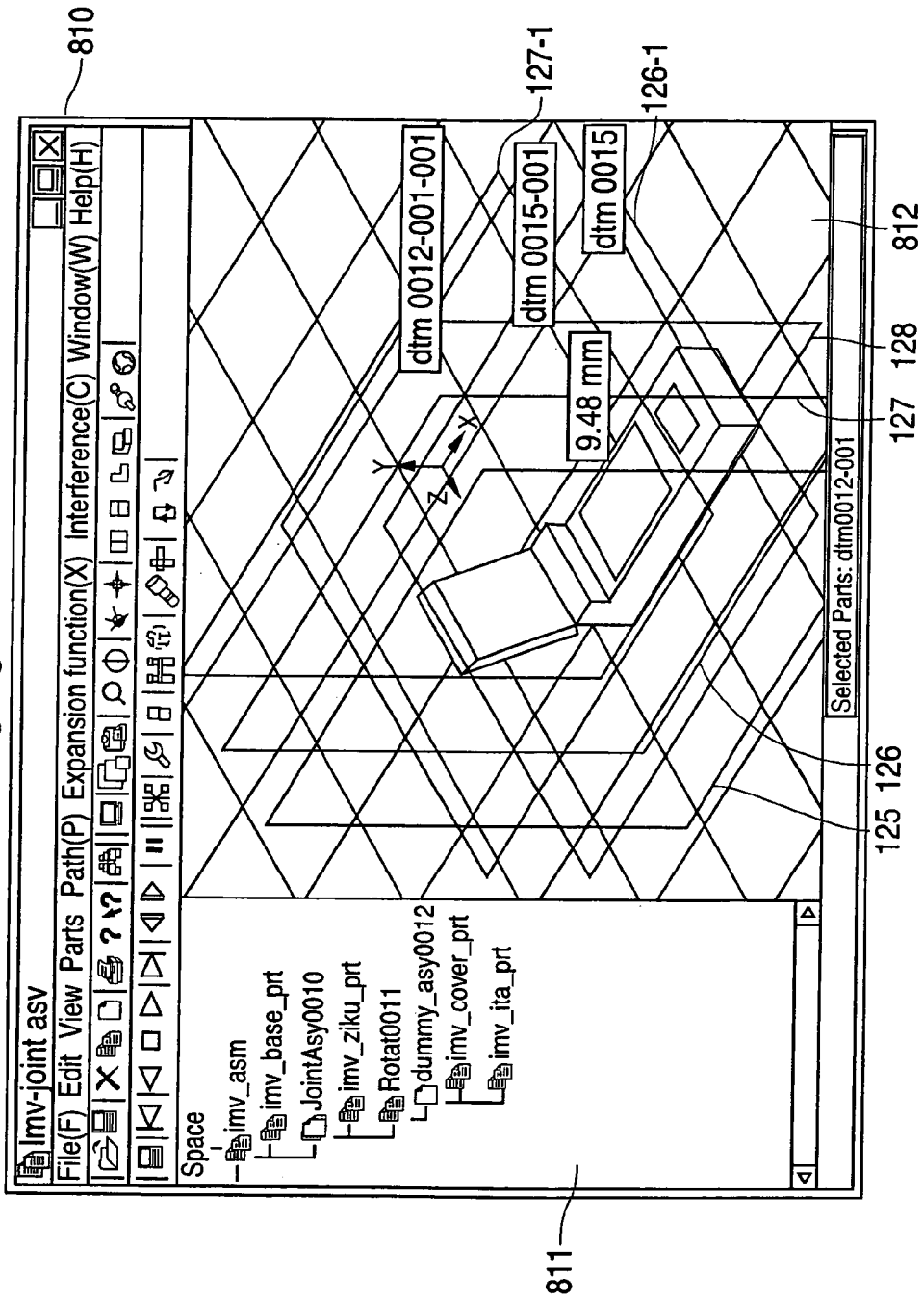
FIG. 31 shows the explanation of the display.

FIG. 31 shows a screen displaying the section cut by the plane 128 (dtm0012-001-001). The tree structure in the region 811 shown in FIG. 31 shows the plane 128 for generating the section (dtm0012-001-001). Is selected.

Next, at step ST 3 of FIG. 7, the body section regulated by the plane (plane position, pose, generated section direction of section) is generated, and displayed on the display screen of the terminal. For example, as shown in FIG. 29, when a plane tm0012-001 as a plane for generating the body section is decided, the body section regulated by the plane is generated and displayed on the display 810 of the terminal 2.

Next, at step ST 4, it is decided whether the request for changing the generating direction of section is issued or not, in case of existence of the request for changing the generating direction of the section, at step ST 5, the generating direction of the section is changed (reversed), and registered in the space structure management table 31.

That is, as shown in FIG. 29, when the request changing the generating direction of the section is issued by the user clicking the everse of the section displaying on the menu 171, 172 opened bby the user designation of cursor designating the reference plane and the plane for generating section, the generating direction of the set reference plane is reversed.

When the generating direction of section is changed according to the process of step ST 5 of FIG. 7, a different body section from the body section displayed at the time is displayed by returning to the step ST 1 of FIG. 7 through step ST 6 of FIG. 7. For example, for changing the generating direction of section "dtm0012-001" shown in FIG. 29, the body section shown in FIG. 30 is displayed, instead of the display of the body section shown in FIG. 29.

At next step ST 6 of FIG. 7, it is determined whether the designation ending the display of the body section is issued or not, and when it is issued, the process is ended, and when it is not issued, the process returns to the step ST 1.

Figure 32A:
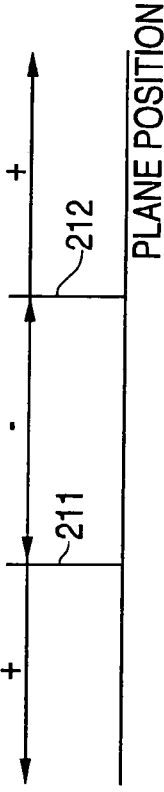
FIG. 32A shows explanation of the process of the program for displaying the body section.
Figure 32B:
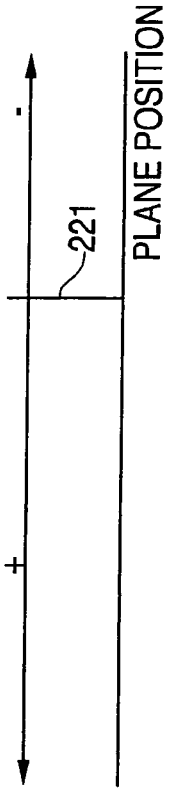
FIG. 32B shows explanation of the process of the program for displaying the body section.
Figure 32C:
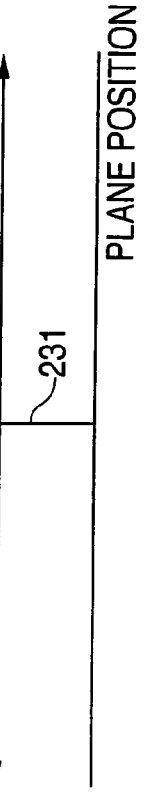
FIG. 32C shows explanation of the process of the program for displaying the body section.

Like this, when the request for displaying the body section is issued by the user, the program 32 for displaying the body section generates the three-dimensional section of the body cut by the reference plane 126 and the plane 127, 128 for generating the section, and displays them on the screen as shown in FIG. 31, FIG. 32A shows the generating direction of the section for a plane 1 for generating the section. The plane 211 and plane 212 for generating the section which are different position each other. FIG. 32B shows the generating direction of the section for the plane 2 for generating the section. The plane 221 is a plane 2 for generating the section. FIG. 32C shows the generating direction of the section for the plane 3 for generating the section. The plane 231 is a plane 3 for generating the section.

Figure 33B:
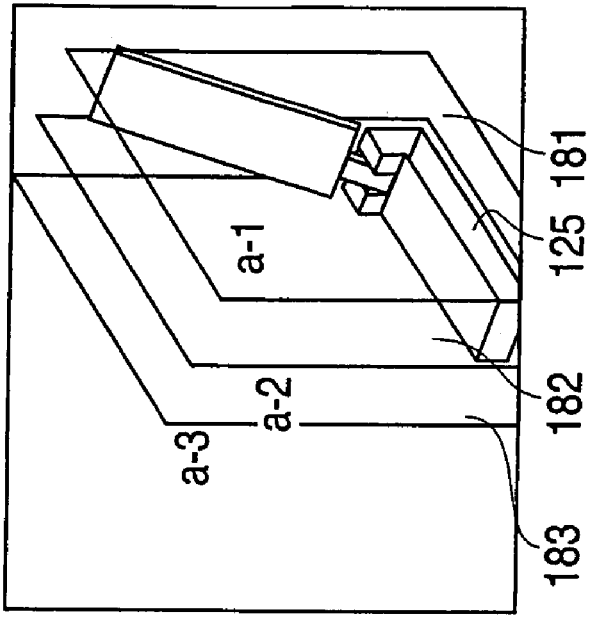
FIG. 33B shows explanation of the display.
Figure 33A:
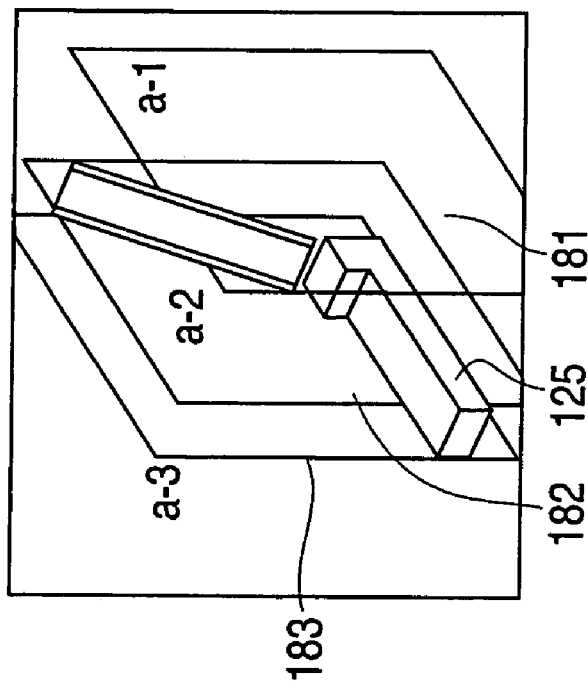
FIG. 33A shows explanation of the display.

FIGS. 33 A and B show the display of the section generated by the designated plane for generating the section of which the generating direction is registered.

As an example, the program 32 for displaying the body section may determine registering the enerating direction of the section depending to the plane position (plane position in transferring direction) in the space structure management table 31, as shown in FIGS. 32A,B and C.

Like this, when the generating direction of the section has been registered, as example, the control shown in FIG. 33 A and B is realized. That is, when the plane for generating the section -2 having the plane for generating the section -3 as the child, and the section cut by the plane for generating the section -2 and the reference plane -1 are displayed, in the situation, if the plane for generating section "a-2" is moved by user operation, the planes cut by the plane for generating the section -2 and plane for generating the section -3 are displayed corresponding to the movement.

Figure 34:
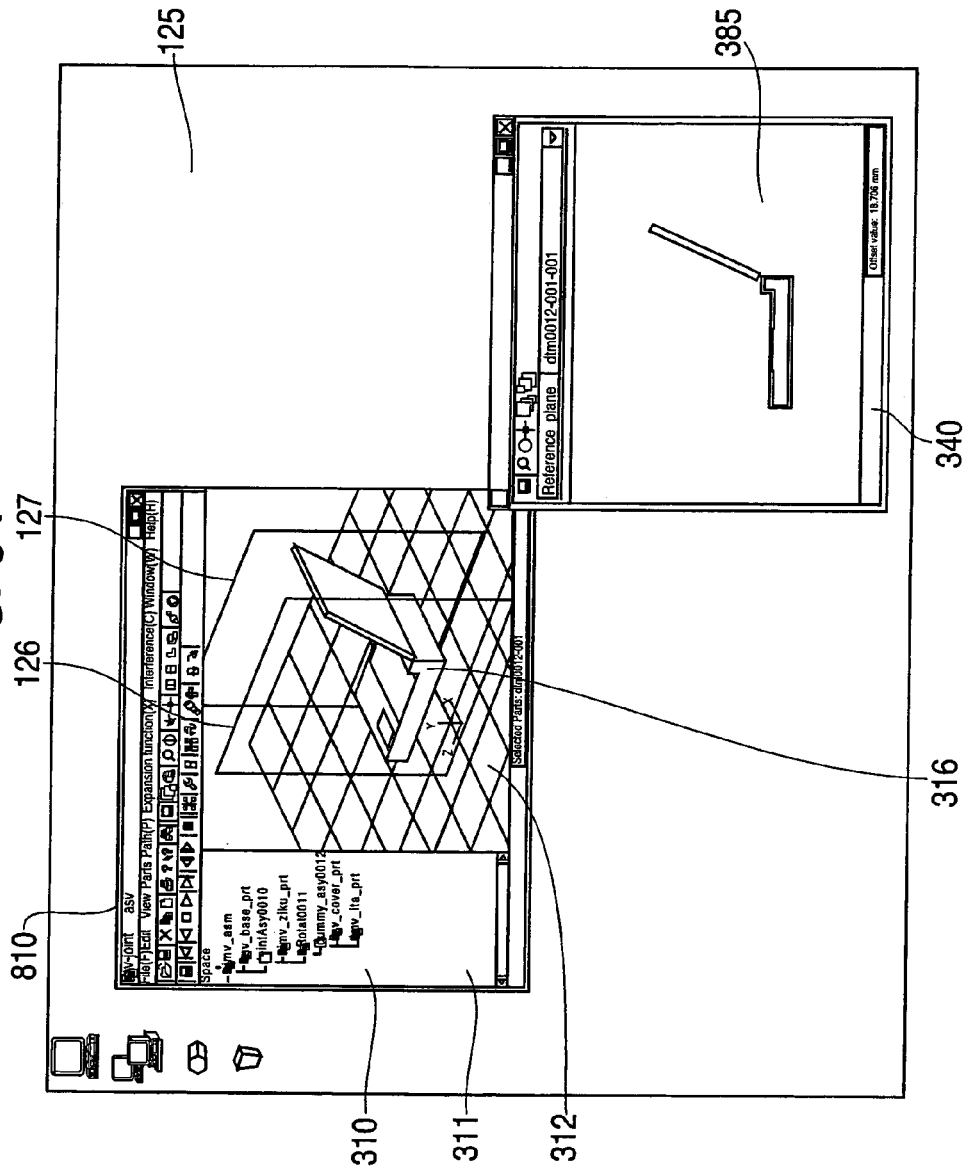
FIG. 34 shows explanation of the display.

When the request for displaying the two-dimensional section of the body is issued by user with the designation for the plane for generating the two-dimensional section during that the three-dimensional section of the body is displayed with the display of the reference section 126 and the plane 127 for generating the section as shown in FIG. 18, the program 32 for displaying the body section generates the two-dimensional image 345 of FIG. 34 regulated by the plane designated at step ST 1 at first as shown in FIG. 8.

That is, as shown in FIG. 27, when a user clicks a display of ection on the display of section display with the designation of the plane for generating the two dimensional section by user clicking the ection in isplaying section by the mouse 3a on the menu 171,172 opened by the cursor designation to the reference plane 126 or the plane 127 for generating the section, the two-dimensional plane of section (defined by plane position, pose, direction of the plane) regulated by the plane is generated.

FIG. 34 shows the screen 810 displaying the three-dimensional section and the two dimensional section simultaneously (in no-linkage mode between the three-dimensional section and the two-dimensional section simultaneously). In FIG. 34, the window 310 displays the three-dimensional section. The window 340 displays the two dimensional section 345 corresponding to the three-dimensional section of the object body 125 shown on the window 310.

Figure 35:
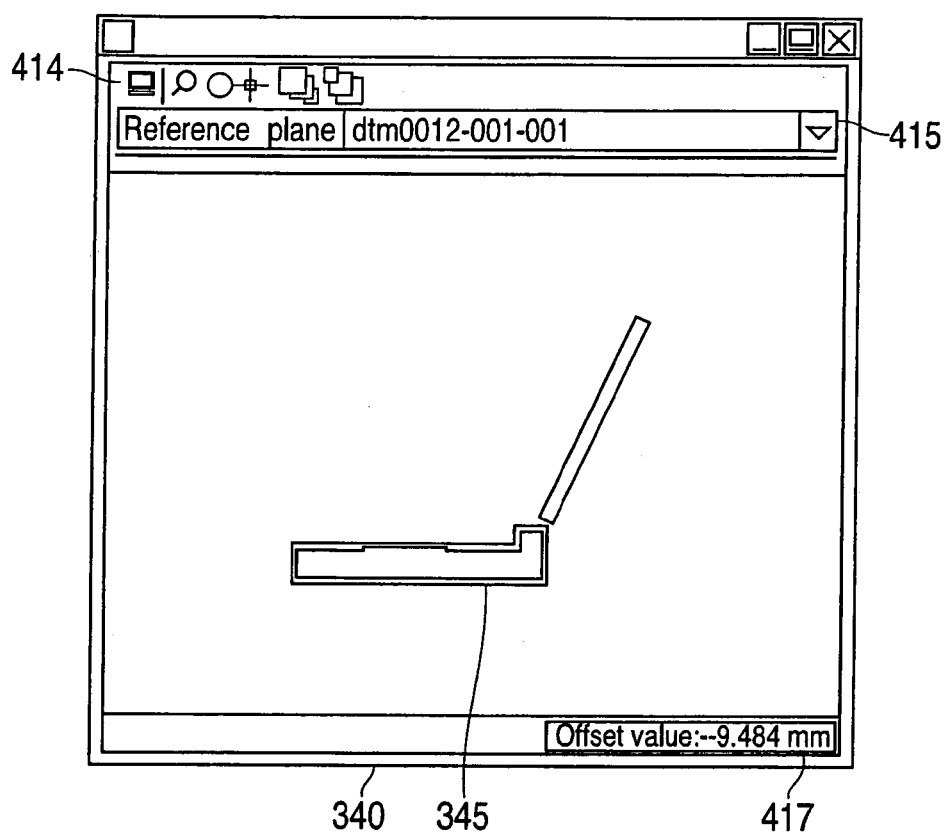
FIG. 35 shows explanation of the display.

FIG. 35 shows the display of the two-dimensional section. In FIG. 35, window 340 shows the two-dimensional section. The icon 414 is for selecting functions editing the two dimensional section, the selection button 415 is for selecting ID of the plane for generating the section, and the display 417 of ff set is corresponding to the distance of the plane for generating the section from just before the reference plane or plane for generating the section.

Figure 36:
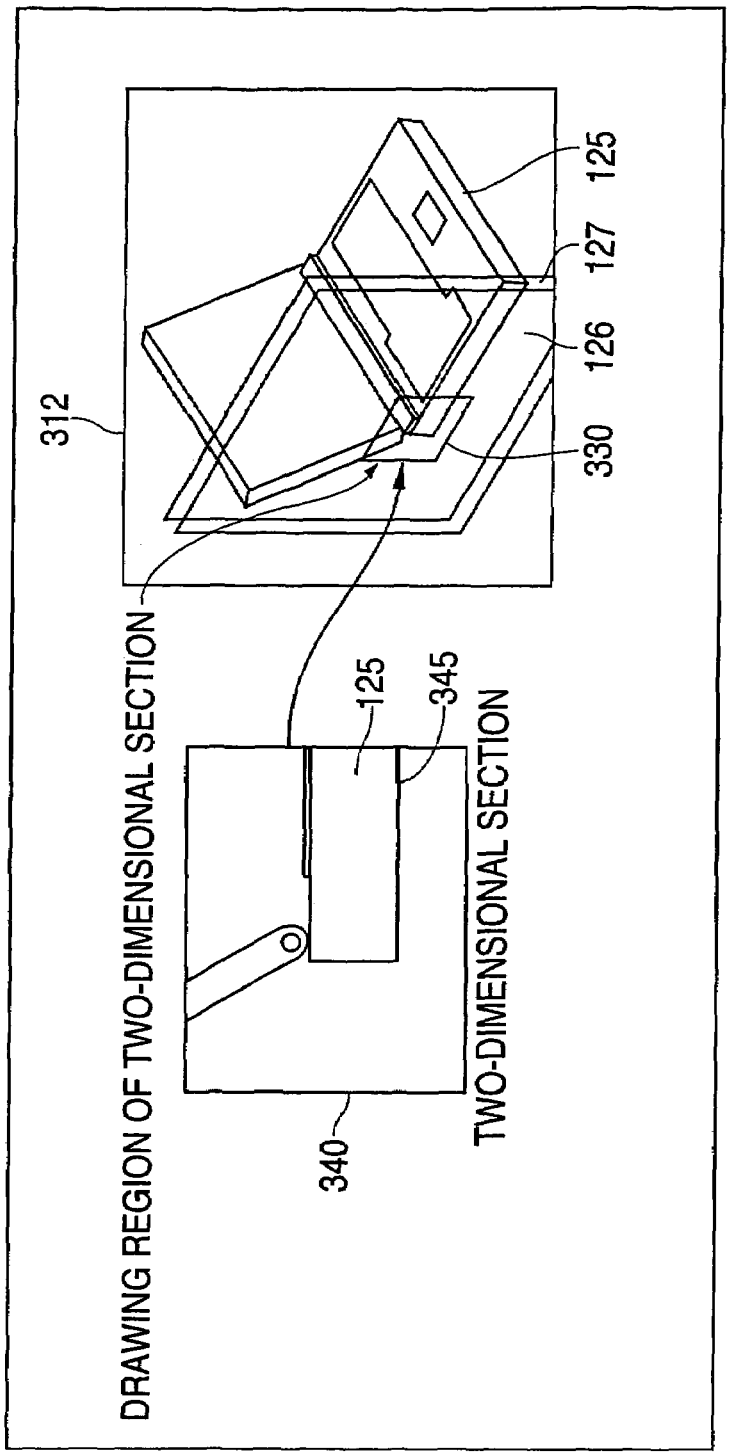
FIG. 36 shows explanation of the process of the program for displaying the body section.

FIG. 36 shows the three-dimensional section and the two dimensional section displayed on the screen in linkage mode. In FIG. 36, the window 312 displays the three-dimensional section, the frame 330 shows the range corresponding to the two dimensional-section 345, the window 340 displays the two-dimensional section corresponds to the section in the frame 330. In the linkage mode, the correspondence between the two-dimensional and three-dimensional section on the display thereof can be easily known.

Figure 37:
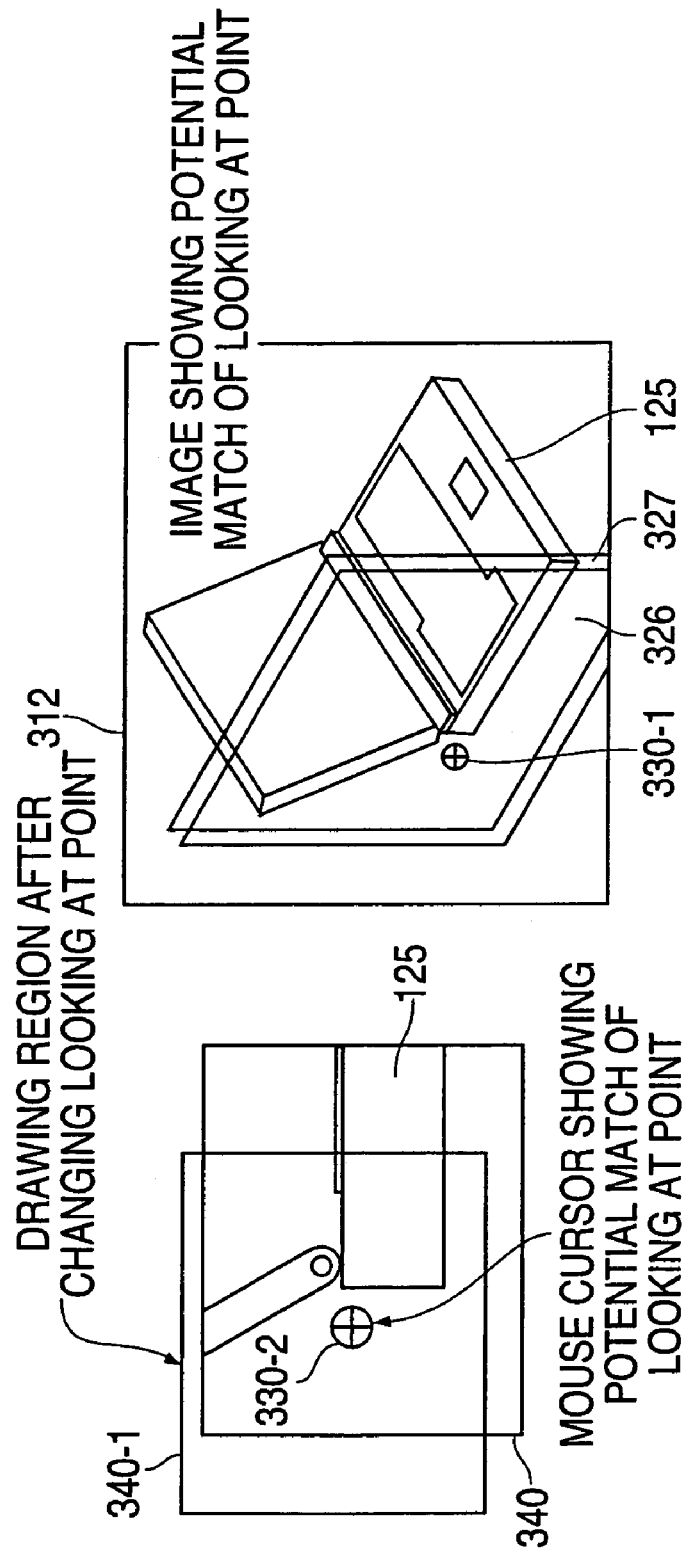
FIG. 37A shows explanation of the process of the program for displaying the body section.
FIG. 37B shows explanation of the process of the program for displaying the body section.

FIG. 37 shows the three dimensional section and the two dimensional section displayed on the screen in the linkage mode. A temporary view point 330-1 is shown on the window 312, and the temporary view point 330-2 on the window 340 is corresponding to the temporary view point 330-1. Further, when the temporary view point 330-1 is determined, the display of the section 125 of the two dimensional and the view point 330-2 move on the window 340 so as for the view point 330-2 is positioned in the center of the window 340-1.

Next, further continuing explanation of the present invention by referring the flow chart. At step ST2, in FIG. 8, a window 340 for displaying the two-dimensional section 316 is opened on the display screen 810 for displaying the three-dimensional section of body 125. That is, the three-dimensional section and the two-dimensional section 345 are displayed on the same display screen 810.

Next at step ST 3 of FIG. 8, it is determined whether change of the plane for generating the two-dimensional section 345 is requested or not. When the change is requested, going to the step ST 4 of FIG. 8, a new plane for generating the two-dimensional section 345 is set, and returning to the step ST 1, the two-dimensional section cut by the new plane is displayed.

That is, as shown in FIG. 35, a selection button 415 for generating the two-dimensional section is prepared on the window 340 for displaying the two-dimensional section 345, therefore, by selecting operations 415 of the button for setting a new plane for generating the two-dimensional section (selected from the set reference plane and the plane for generating the section), the two-dimensional section 345 cut the new plane is displayed.

On the other hand, at step ST 3 of FIG. 8, when it is determined that the change request of the plane for generating the section is not issued, going to the step ST 5 of FIG. 8, it is determined whether the direction for ending the display of the two-dimensional section is issued or not. When it is issued, the process is ended, and it is not issued, the process returns to step ST 3 of FIG. 8.

Like this, program 32 for displaying the body section generates the two-dimensional section 345 cut by the plane selected from the reference plane 126 or the plane 127, 128 for generating the section and displays it on the same display screen displaying the three-dimensional section 316.

In the above components, the program 32 for displaying the body section displays the section so that the corresponding part of the two-dimensional section to the three-dimensional section can be known. For example, as shown in FIG. 36, the corresponding part of the two-dimensional section to the three-dimensional section is displayed. By this display, the user understand easily the correspondence of the three-dimensional section and the two dimensional section.

When a specified point is directed on the screen, the program 32 for displaying the body section displays the corresponding point on the three-dimensional section, and the point is displayed on the two-dimensional section. That is, as shown in FIGS. 37A and 37B, the point designated on a section is displayed on another section. By this the user understands at a glance the designated specified point etc.

Moreover, in this displaying way of the body section, the program 32 for displaying the body section has a function linking the three-dimensional section and the three dimensional section, and users can select the linking display mode and the no-linking display mode.

The two-dimensional section on the display screen shown in FIG. 34 is a two-dimensional section cut by a plane selected from the reference plane and the plane for generating the sectional of the body, and the two-dimensional section and the two-dimensional section are not linked. On the contrary, when the mode of the linkage of the three-dimensional section and the two dimensional section is set, the program 32 for displaying the body section displays a two-dimensional section cut by a plane use for cutting the three-dimensional section.

Figure 38:
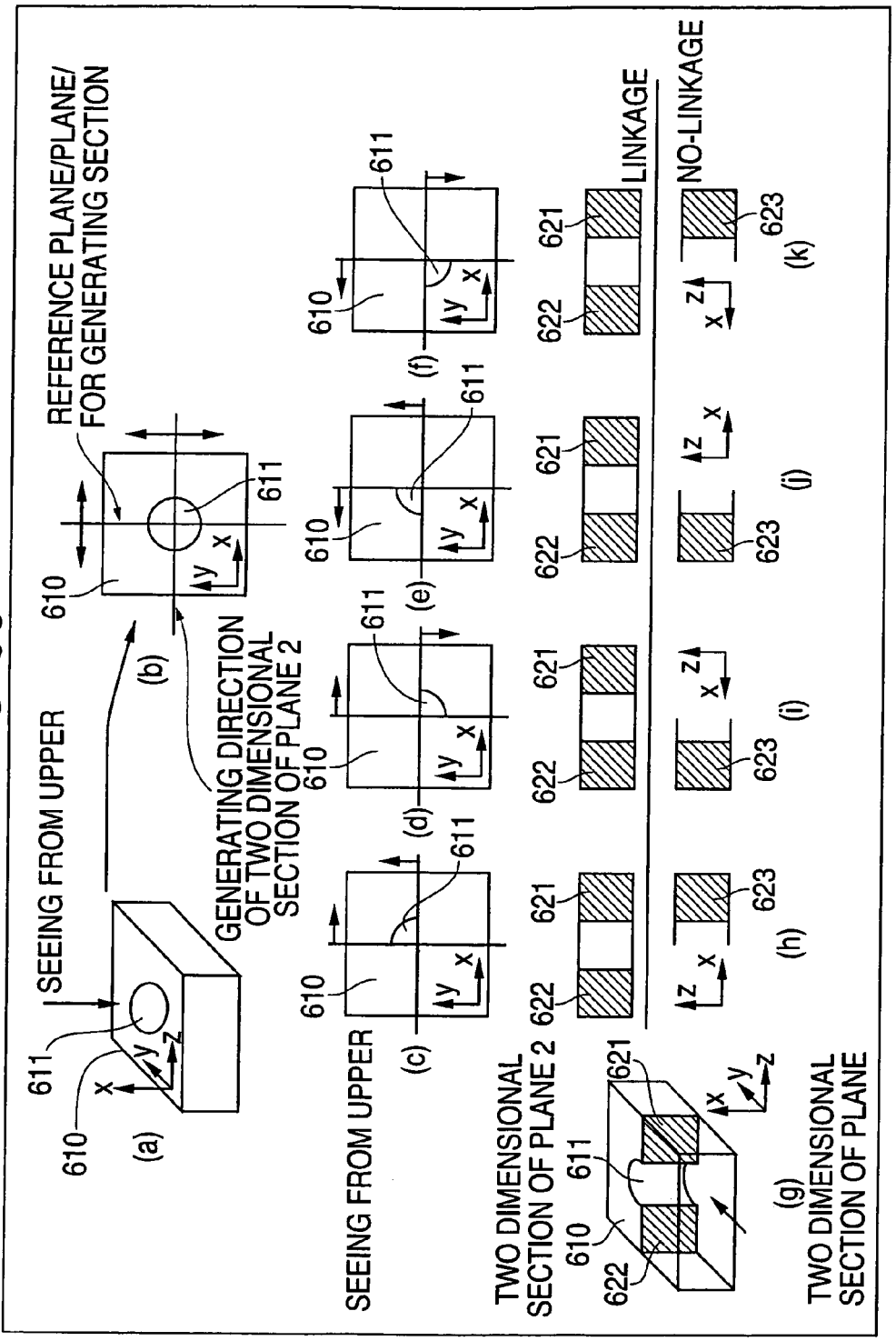
FIG. 38 shows explanation of the process of the program for displaying the body section.

FIG. 38 shows a drawing explaining the section display in cases of the non-linkage mode and the linkage mod of the relation between the three-dimensional section and the two-dimensional section. In FIG. 38, the object body 610 and a through hole 611 formed in the object body 610, the display of the object body in the no-linkage mode and the section 623 of the body in the linkage mode are shown. The action of the linkage mode and the no-linkage mode are different from the linkage mode and the no-linkage mode explained in FIG. 34.

In FIG. 38, (a) shows the oblique view of the object body, (b) shows the plain view of the object body.

In FIG. 38, (c),(d),(e) and (f) show the relation of the plane 1 and plane 2 for generating the section for the object body 610, and the generating direction of the plane 1 and the plane 2.

In FIG. 38, (g) shows the oblique view of the section cut by the plane 1 for generating the section.

In FIG. 38, the upper figure of (h),(i), (j) and (k) show the section cut by the plane 2 for generating the section in the no-linkage mode corresponding to (c),(d),(e) and (f) each.

In FIG. 38, the lower figure of (h),(i), (j) and (k) show the section cut by the plane 2 for generating the section in the linkage mode corresponding to (c),(d),(e) and (f) each.

When, for example, the displaying object is a rectangular body 610 having a through hole 611 and a plane 1 and a plane 2 are set as the plane for generating the three-dimensional section as shown in FIG. 38, the program 32 for displaying the body section generates a two-dimensional section corresponding to the direction of the section plane (in this example, the plane 2) is displayed in case of the no-linkage displaying mode (see the section 623 in FIG. 38 (h),(i),(j) and (k)). On the other hand, when the linkage mode is set, the two dimensional section of the plane 1 and 2 for generating the three dimensional section are displayed according to each direction corresponding to the direction for generating the section (see the section 622 and 623 in FIG. 38 (h),(i),(j) and (k))).

That is, the program 32 for displaying the body section having the linkage mode and no-linkage mode, the program determines whether the linkage display mode is set or not at step ST 1 in FIG. 9. When the no-linkage mode is determined, going to step ST 2 of FIG. 9, a three-dimensional section of the body is generated by the reference plane and the plane for generating section the and displays it on the screen. Further at step ST 3 of FIG. 9, a two-dimensional section is generated by the plane selected from reference planes and planes for generating the section, and it is displayed on the display screen.

Further, when the set of the linkage mode at step ST 1 of FIG. 9 is determined, going to step ST 4 of FIG. 9, the three-dimensional section of the body is generated by the reference plane and the plane for generating the section, and it is displayed according to FIG. 7. Next at step ST 3, the two-dimensional section of the body is generated by the reference plane and the plane for generating the section.

As shown in FIG. 18, when the three-dimensional section of the body is displayed with the reference plane and the plane for generating the section, and the request for editing the tree structure 116 of the relation between parents and children on the display screen is issued, the program 32 for displaying the section specifies the element (parts, the reference plane, the plane for generating the section) for the change object determined by user's clicking at step ST 1 at first.

Next at step ST 2, the located position of the element clicked by user is selected at step ST 2, and it is determined whether the parent element is directed by the new parent element (parts, the reference plane. When the new parent element is selected, the plane for generating the section) is selected, going to next step ST 3. According to the new parent element, the information (ointer to parent osition from parent ose from parent) which the element of the changing objet managed by the space management table 31 is up-dated to change the parent element for the changed object.

Figure 39A:
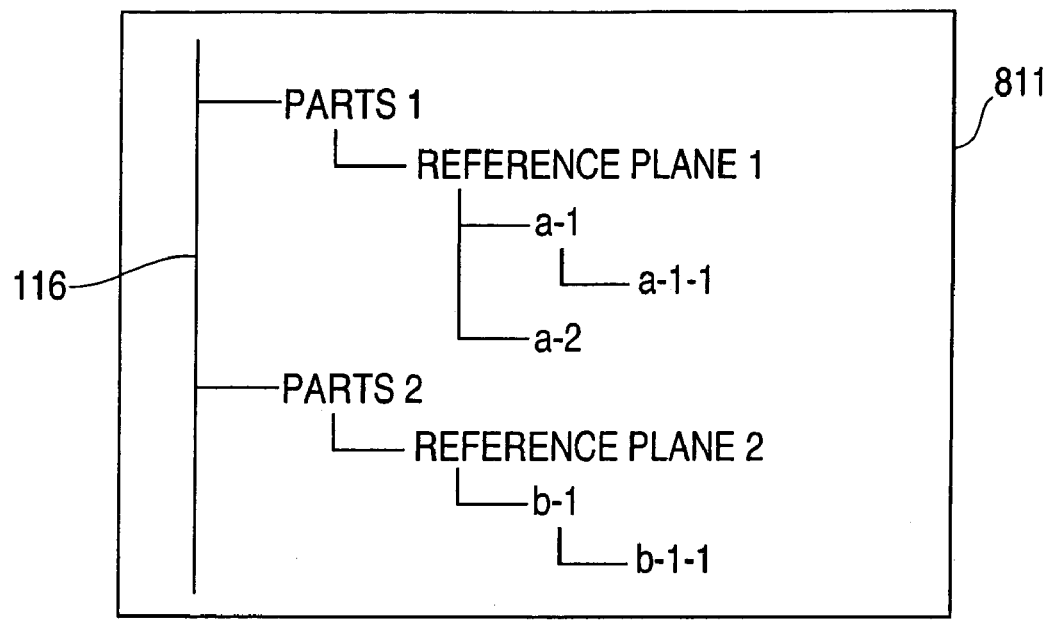
FIG. 39A shows explanation of the process of the program for displaying the body section.
Figure 39B:
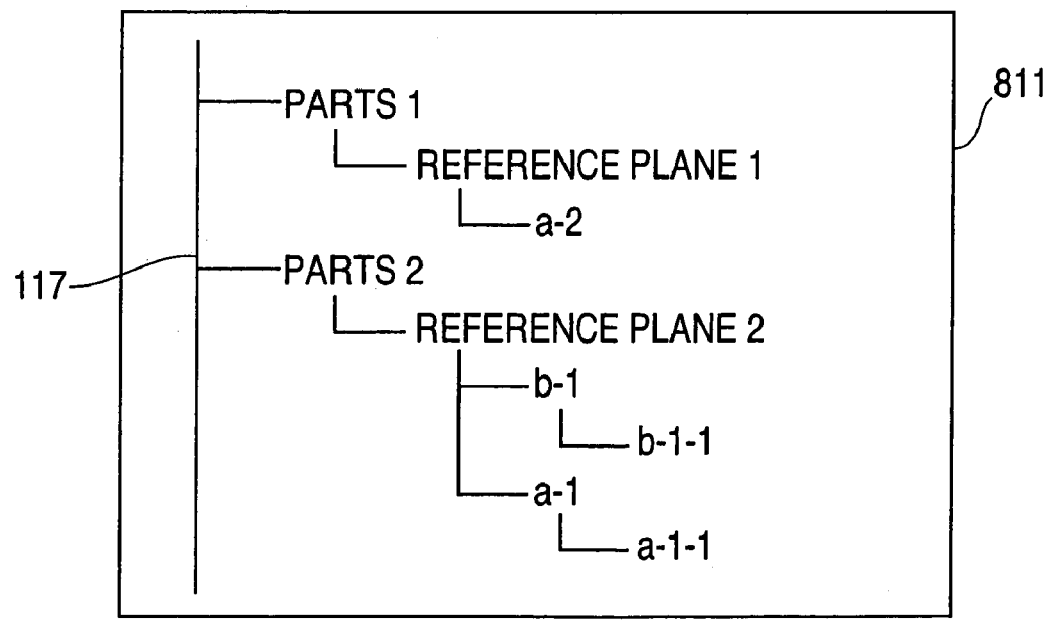
FIG. 39B shows explanation of the process of the program for displaying the body section.

FIG. 39 A shows an example of the tree structure of the parent and chide 116. FIG. 39 B shows an example of the tree structure 117. In FIG. 39 A, the parent of the branch of the plane for generating the section (a-1)-(a-2) is the reference plane 2. But, in the tree structure 117 in FIG. 39 B, the parent of the branch of the plane for generating the section (a-1)-(a-2) is changed to the reference plane 2.

Like this, when the tree structure 116 of the parent child relation shown in FIG. 39 A is displayed, and user's request that the parent of the plane for generating the section -1 (having the child plane for generating the section -1-1) is changed to the reference plane 1 from the reference plane 2, the parent of the plane for generating the section -1 is changed to the reference plane 2 from the reference plane 1 as shown in the tree structure 117.

FIG. 40 shows a drawing explaining the change of moving direction of the plane for generating the section corresponding to the change of parent thereof. In FIG. 40, the reference plane 2 (251) having normal direction c and the reference plane 1 (261) having normal direction d are shown. In FIG. 40, a shows the moving direction of the plane for generating the section of which parent is the reference plane 1 (251). In FIG. 40, a-1 and a-2 are the plane for generating the section. The parent of the plane for generating the section (a-1), (a-1-1) is the reference plane 1 (261). In FIG. 40, b is the moving direction of the reference plane 1 (261), the plane for generating the section a-1 and the plane for generating the section a-1-1.

Like this, when the parent is changed, it happens in some cases for the moving direction to be changed. For example, when the parent is changed from the reference plane 1 to the reference plane 2 as shown in FIG. 40, and the normal direction a of the plane 2 is different from the normal direction 1 of the reference plane 1, the moving direction is defined by the moving direction b ction b of the reference plane 1 instead of the moving direction a defined by the normal direction of the reference plane 2.

As explained by the process flow shown in FIG. 5 (b), the program 32 for displaying the section of body generates the plane for generating the section by interfacing with the user. But it has a function making the plane for generating the section automatic or semi-automatic according to the process flow from FIG. 11 to FIG. 13. Next, the process is explained.

In case according to the process in FIG. 11, at step ST 1 of FIG. 11, the program 32 for displaying the section of the body sets the reference plane by implementing the same process with the process flow of FIG. 5(a). Next at step ST 2 of FIG. 11, a specified position is determined in the direction of the normal direction of the reference plane. Further at step ST 3 of FIG. 11, a plane for generating the section of which the parent is the reference plane (or a plane for generating the section generated just before) is generated at the point.

Next at step ST 4 of FIG. 11, it is determined whether the search reaches the end of the body or not. When it reaches the end of the body, the process is ended, and when it does not reach the end of the body, the process returns to the step ST 2.

Figure 41:
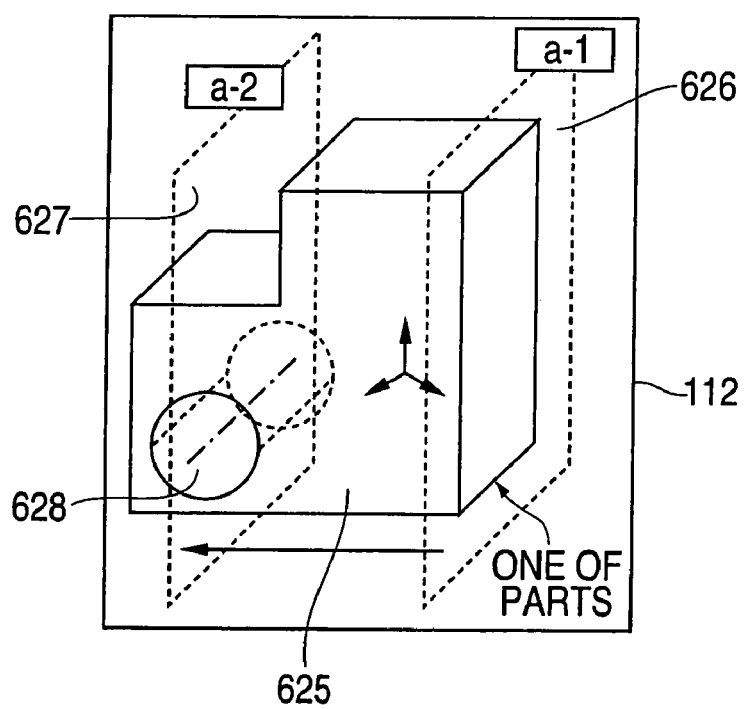
FIG. 41 shows explanation of the process of the program for displaying the body section.

FIG. 41 shows a drawing explaining the auto-generation of the plane for generating the section.

In FIG. 41, a reference plane (or plane for the plane for generating the section) 625, the plane for generating the section and the through hole 628 are shown.

The reference plane (or the plane for generating the section) 625 is the reference plane (a-1) or a plane (a-1) for generating the section generated just before the generation of the plane 627 for generating the section. The plane 627 for generating the section generated at the through hole (a-2) which is a specified point.

Like this, the program 32 for displaying the body section generates the plane for generating the section automatically at the position where the specific position of the body 625 like a center of hole 628 is shown in FIG. 41. As the section at the point is usually necessary for displaying, the function is prepared. In FIG. 41, parts having the deferent level 629 is not contained in the specific point, the part like the deferent level 629 of the body 625 may be processed as a specified point as another embodiment.

On the other hand, according to the process flow in FIG. 12, at first, at step ST 1 the reference plane is set by implementing the same process with the process in FIG. 5 (a). Next, at step ST 2, the maximum moving value is set by interfacing with the user. Next at step ST 3, a position moved by the regulated value in the direction of the normal direction of the reference plane is determined, and the reference plane (or a plane for generating section generated just before) is generated at the position.

Next, at step ST 4, it is determined whether the process is reached the set maximum moving value or not. When the maximum moving value is reached, the process is ended, and it is not reached, the value the process returns to step ST 3.

Like this, according to the process in FIG. 12, the program 32 for generating the section generates the plane for generating the section automatically at the position moved by the value.

Figure 42A:
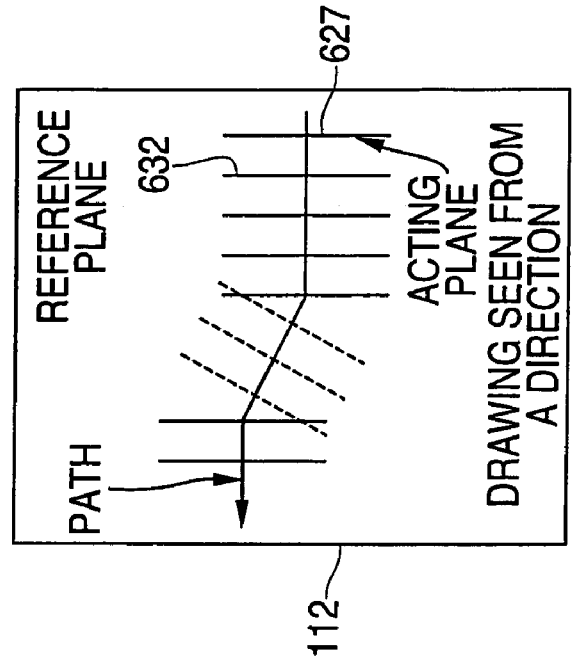
FIG. 42A shows explanation of the process of the program for displaying the body section.
Figure 42B:
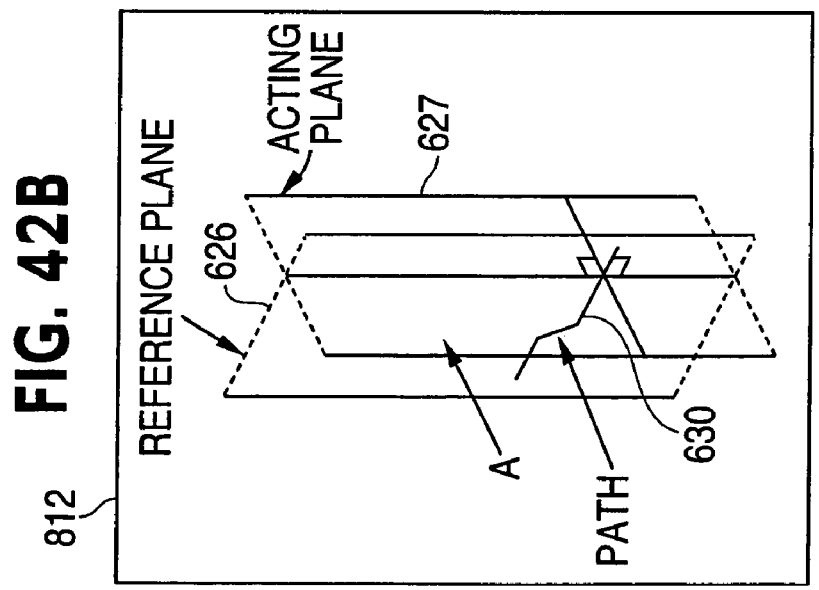
FIG. 42B shows explanation of the process of the program for displaying the body section.
Figure 43A:
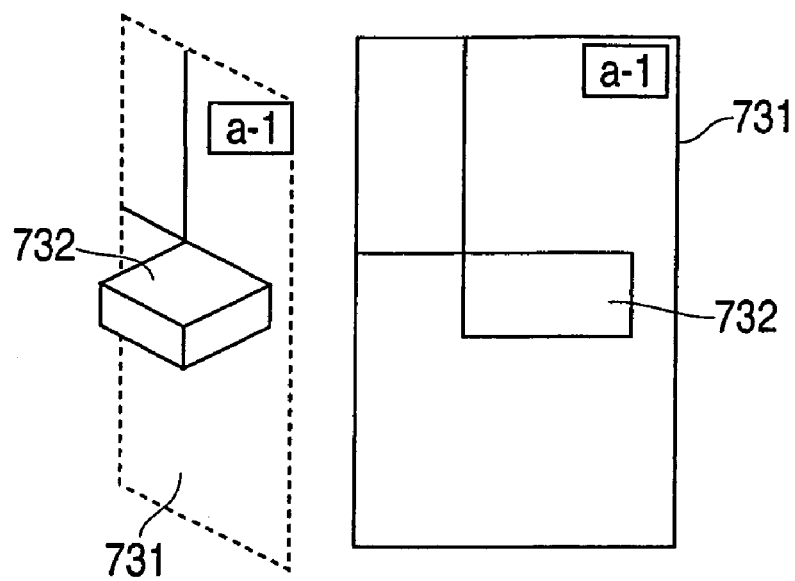
FIG. 43A shows explanation of the process of the program for displaying the body section.
Figure 43B:
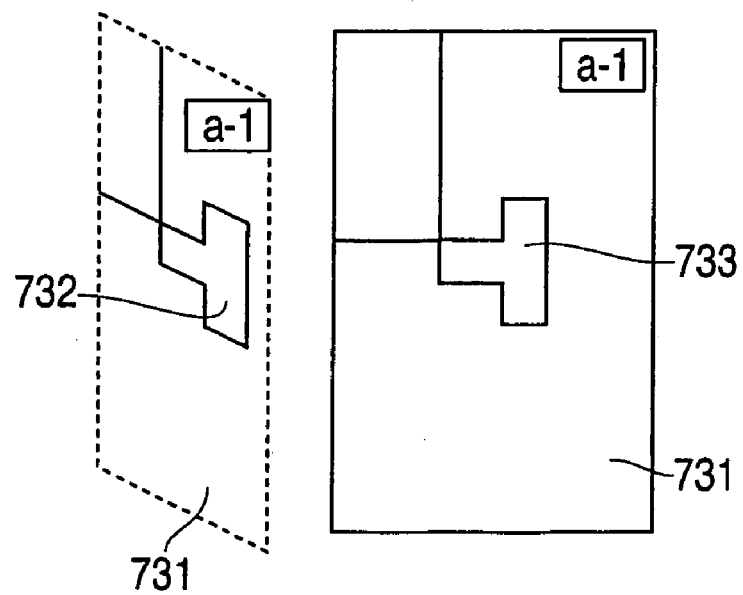
FIG. 43B shows explanation of the process of the program for displaying the body section.

FIG. 42A and FIG. 43B are drawings explaining of the auto-generation of the plane for generating the section. FIG. 42A is an oblique drawing, the FIG. 42 B a plane seen from the A diction. In FIGS. 42A, 42B, the reference plane 626, an action plane 627 and the path 630 are shown. The moving plane 627 is defined vertical to the reference plane 626. The path 630 is set on the reference plane.

On the other hand, according to the process in FIG. 13, the program 32 for generating the section, at first at step ST 1, sets a moving plane. Next at step ST 2, a reference plane (or a plane for generating section) rectangular to the moving plane is set. Next at step ST 3, a path is set to the reference plane (or a parent plane for generating section) is set.

Next at step ST 4, a position moved by a regulated value along the path is determined, and at step ST 5, a plane 632 for generating the section of which the normal direction is in direction of the path direction at the position is generated automatically. Further, at step ST 6, it is determined whether the process is reached to the end of path or not, when it is reached to the end of the path, the process is ended, and when it is not reached, it returns to step ST 4.

Like this, according to the process flow in FIG. 13, the program 32 for displaying the section of the body generates the plane 626 for generating the section at the position along the path 630 set by the reference plane 626 (or the parent plane 626 for generating the section) as shown in FIGS. 42A, 42B. The plane 626 for generating the section generated by such a way has a reference plane 626 having the path information as a parent plane thereof, and is restricted to the parent plane. That is, when the reference plane moves, the plane moves with the reference plane. In case of investigation of a caring path of a printer supply paper, the display of the section at these points is necessary, so the function is prepared.

Moreover, in addition to the function displaying the section of the body, it has a function that, investigates whether investigates they interfere with other parts of body or not, when some parts are added to the body, or replaces the parts of the body.

This function is realized by arranging the parts on the plane for generating the section which is moved freely by user operation as shown in FIG. 43(a), and by arranging the region on the plane foe generating the section which is moved freely by the user operation as shown i FIG. 43(b).

FIG. 43A is a drawing adding parts. FIG. 43B is a drawing adding regions. In FIG. 43A, a plane 731 for generating the section and one of the parts added 732 are shown. In FIG. 43B, a plane 731 for generating the section and the add region 733 are shown.

As mentioned above, the space structure management table 31 manages the reference plane 731 and the plane for generating the section by the same structure of the data. After user having defined the figure information of one of the added parts 732, user can arrange one of the parts added 732 on the plane for generating the section by using the function editing the tree structure of the relation of the parent and child and by arranging the added parts 732 as a child of the plane 731 for generating the section. Simultaneously, after user having defined the added parts not having the thickness, user can arrange the region 733 by using the editing function for editing the tree structure of the relation of the parents and children and by arranging the added parts as a child of the plane 731 for generating the section.

The program 32 for displaying the body section investigates whether the added parts arranged by such a way and the parts in the body are interfered with each other or not, and extracts the region where the parts can be added, and displays them corresponding to the three-dimensional display of the body. For example, as shown in FIG. 44, implementing the investigation in the designated range, and extracting the region possible for being added correspondingly to the three-dimensional display. In this process, when there are parts moving with the plane for generating the section by the linkage, the interference check is implemented containing it.

FIG. 44 is a drawing explaining the interference of parts. In FIG. 44, the plane 731 for generating section, one of parts 821 and one of parts 822 are shown. Planes for generating the section are generated within the allowable region existence of the parts 1 (821) and parts 2 (822), and the interference is detected.

As explained above, the embodiment is explained by the transfer of the plane for generating the section, but the present invention is applied to the rotation of the plane for generating the section.

As mentioned above, the space charge structure management table 31 manages the bsolute position/bsolute pose/osition from the parent/ose from the parent But their information is explained by matrix on the virtual three-dimensional space, the matrix value is only difference between the transfer process and the rotation process. So the all process of the present invention is applied to the rotation process.

Therefore the child plane 128 for generating the section moves independently with the parent plane 127 for generating the section, but when the parent plane for generating section rotates, the child plane rotates by the link of the rotation.

Next, a detail embodiment of the present invention is explained.

Figure 45:
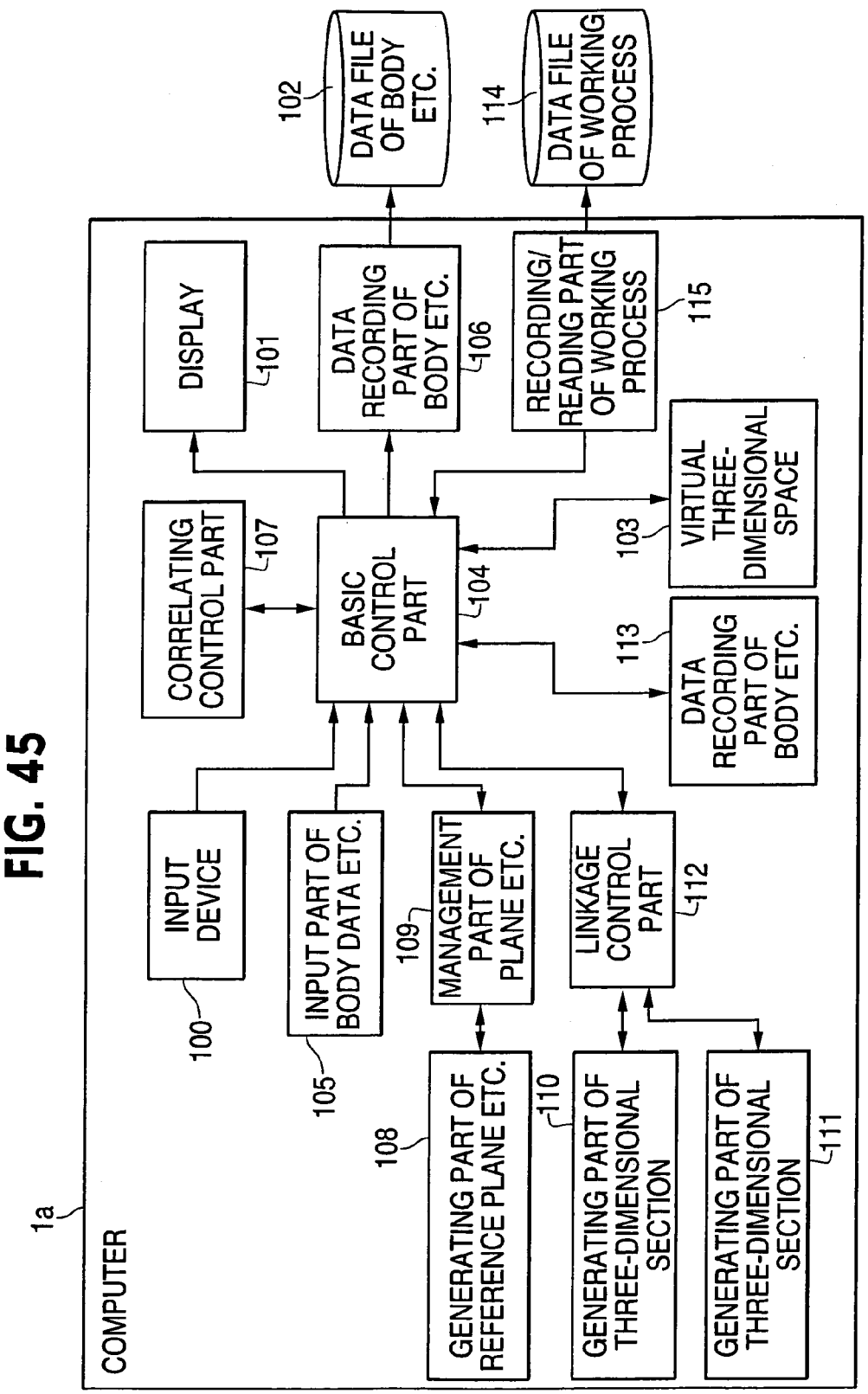
FIG. 45 shows block diagram of the function of the present invention.

As explained above, a computer 1a includes function block as shown in FIG. 45.

That is, it has the computer 1a, an input device 100 like mouse, a display 101 like CRT, data file 102 of the body etc for storing the data of process object body 125 and reference plane 126 and the plane 127, 128 for generating section, the virtual three-dimensional space 103 for developing the data of the data file 102 of body etc, the basic control part 104 for controlling the whole, data input part 105 of the body entering the data of the process object body, the reference plane and the plane for generating the section, the data registering part 106 of the body for registering the data of the process object body, the reference plane and the plane for generating the section to the data file 102 of body etc., the relation control part 107 for controlling to make the relation among the process object body, the reference plane and the plane for generating the section, the producing part 108 of the reference plane etc. for making the reference plane and the plane for generating the section, the reference plane etc. management part 109 for managing the reference plane and the plane for generating the section made dy the reference plane etc. making part 108, the three-dimensional section generating part 110 for generating the three-dimensional plane of body, the two-dimensional section 345 generating part 111, the linkage control part 112 for controlling the display of linkage display or no-linkage display of the three-dimensional section 316 and the two-dimensional section 345, the interference check part 113 for making interference check of the directed parts 822 and the parts of body 821, working process data file 114 for storing the working process data, work process record-reappearance part 115 for recording and reappearing the work process of the user.

Figure 62:
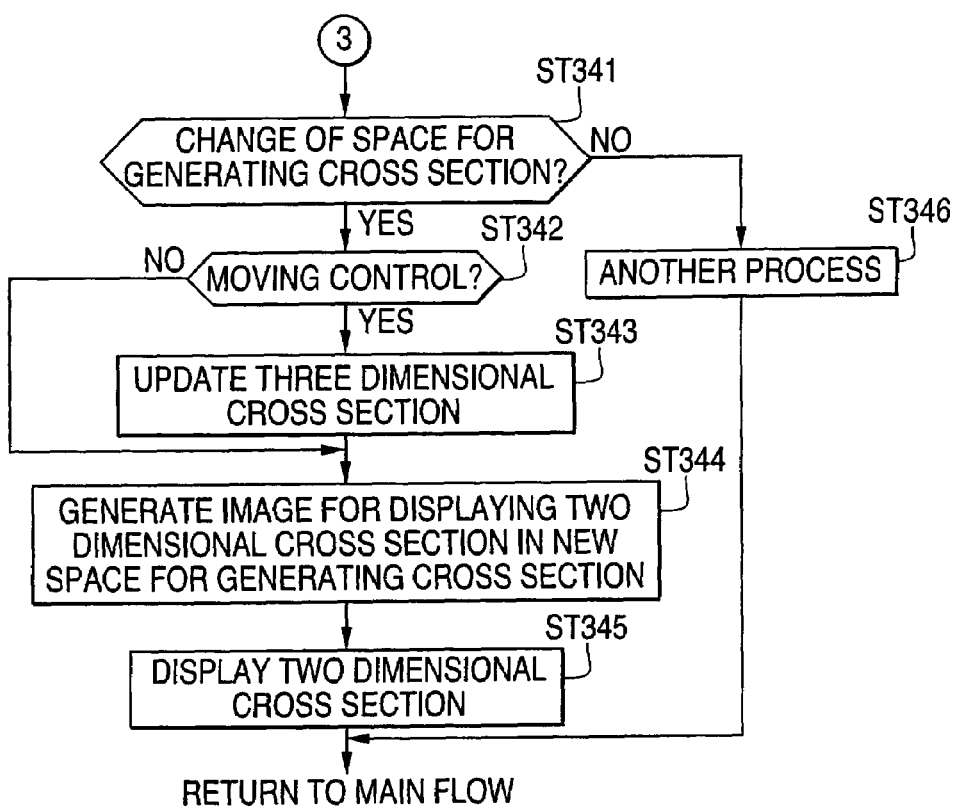
FIG. 62 shows the process flow implemented by the present invention.

The detail process flow of the present invention that the program 32 for displaying the body section composing of the function block in FIG. 45 is shown in figure from 46 to FIG. 62. Next the process flow is explained.

The program 32 for displaying the body section being acted, at first at step ST 1, it is determined whether the process is a new work or not. When it is a new work, going to step ST 2, the process object data is read from the data file 102 of the body etc. data.

On the other hand, when it is determined that it is not the new work, going to step ST 3, it is determined whether users need the working process or not, when the working process is necessary, going to step ST4, the data of the process object 125 body, reference and plane of the section is read from the body etc. data file 102, and the worked process data is read from the data file 114. On the other hand, when it is determined that the working data is not needed, going to step ST 5, the data of the process object body 125, reference plane 126 and plane 127, 128 for generating the body are read from the body etc. data file 102. Further at next step ST 4, the relation information (information of the parent and child) concerning to the read information is reappeared.

When the process at step ST2/step ST 6 is finished, next the image is displayed based on the read data. Next at step ST 8, the queue keeping the designation from the user is checked, at next step ST 9, it is determined that the designation from the user is kept in the queue or not. When it is not kept in the queue, the process returns to step ST 8, when the designation is kept in the queue, going to step ST 10, the process designated from the user is processed.

When the process designated from the user is ended, going to step ST 11, it is determined whether the request for ending the process is issued or not. When the request for ending the process is issued, the process is ended, it is not requested, returning to step ST 8, the process is continued.

Figure 46:
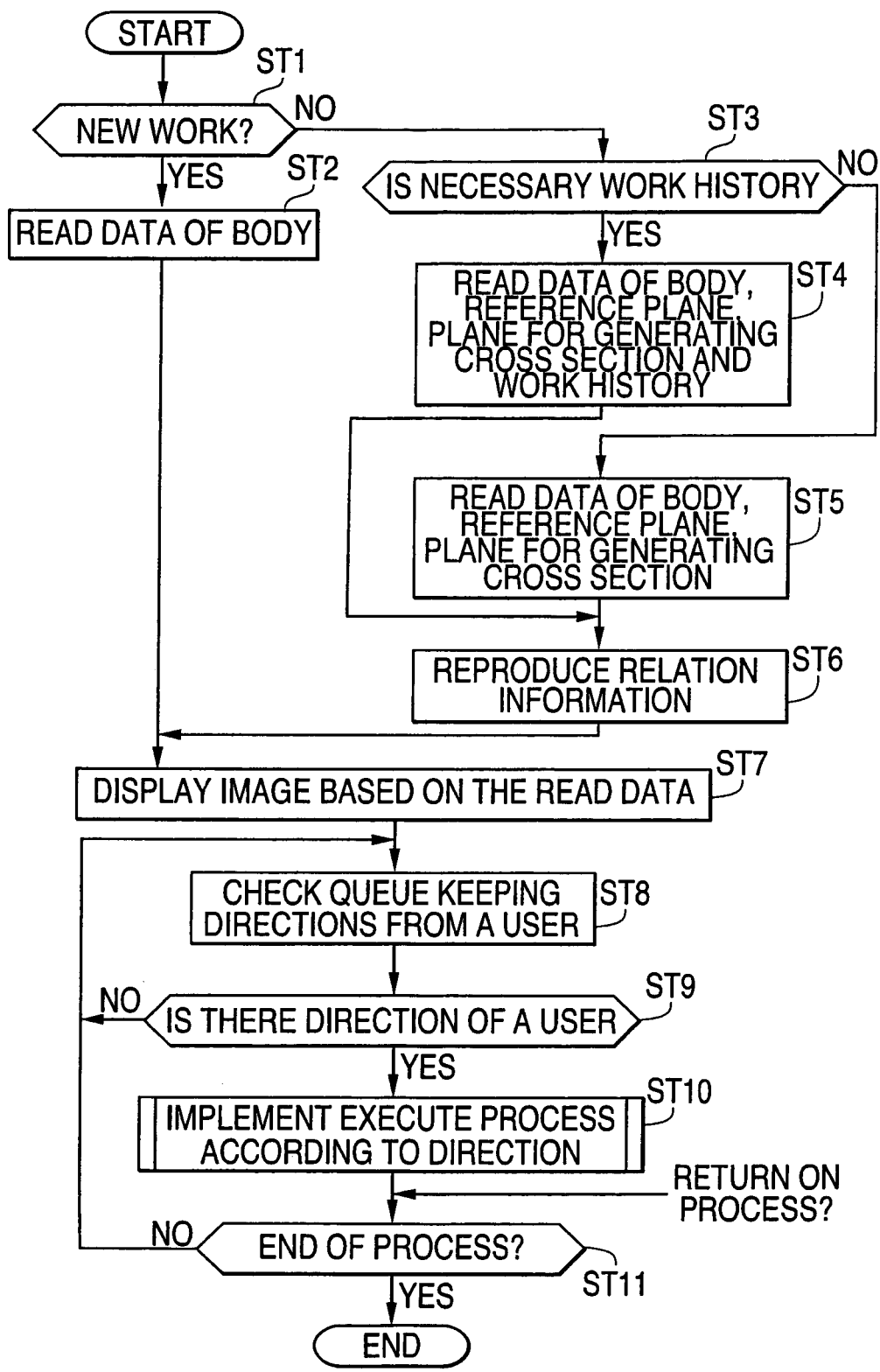
FIG. 46 shows the process flow implemented by the present invention.
Figure 47:
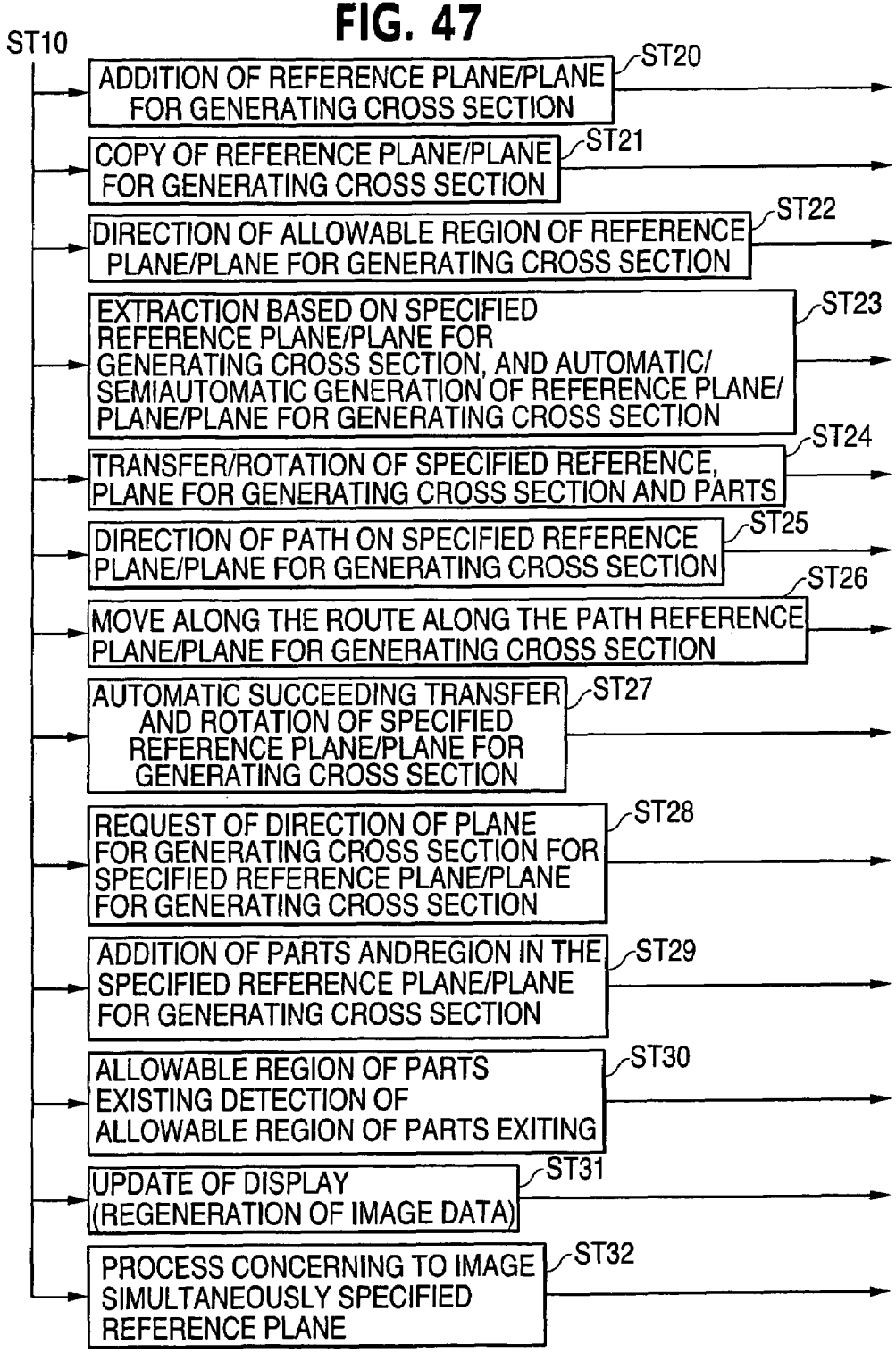
FIG. 47 shows the process flow implemented by the present invention.

As shown in the process flow in FIG. 47, the process of the step ST 10 in process flow in FIG. 46 contains process ST20, St21, ST22, St23,ST24, St25,ST26, St27, ST28, ST29, ST30, St31 and ST32.

ST 20 is the process is for adding the reference plane and the plane for generating the section.

ST 21 is the process is for coping the reference plane and the plane for generating the section.

ST 22 is the process is for directing the existence area of the reference and the plane for generating the section.

ST23 is the process is for extracting the specific based on the specified reference plane and the specified plane for generating the section, and generate automatic or half-automatic the reference plane or the plane for generating the section.

ST24 is for the process for transferring and rotating the specified reference plane and the plane for generating the section.

ST25 is the process for directing the path on the specified reference plane and the plane for generating the section.

ST26 is for the process for transferring along the path defined on the specified reference plane and the plane for generating the section.

ST27 is the process for transferring and rotating succeeding the reference plane and the plane for generating the section.

ST28 is the process for directing the direction of the generating section of the specified reference plane and the plane for generating the section.

ST29 is the process for adding the parts or region to the specified reference plane and the plane for generating the section.

ST30 is the process for detecting the existence region of the parts group.

ST31 is the process for updating the contents of the image display.

ST32 is the process concerning to imaging simultaneous the specified reference plane and plane for generating the section and the two-dimensional section.

As known from above explanation, the reference plane 126 is a plane 127 which is set at first for generating the section from the plane based on the surface. The reference plane may transfer and rotate like the plane for generating the section, so that there is not essential difference between the reference plane 126 and the plane 127, 128 for generating the section. So they are not distinguished especially in the following explanation.

Next each process is explained.

Figure 48:
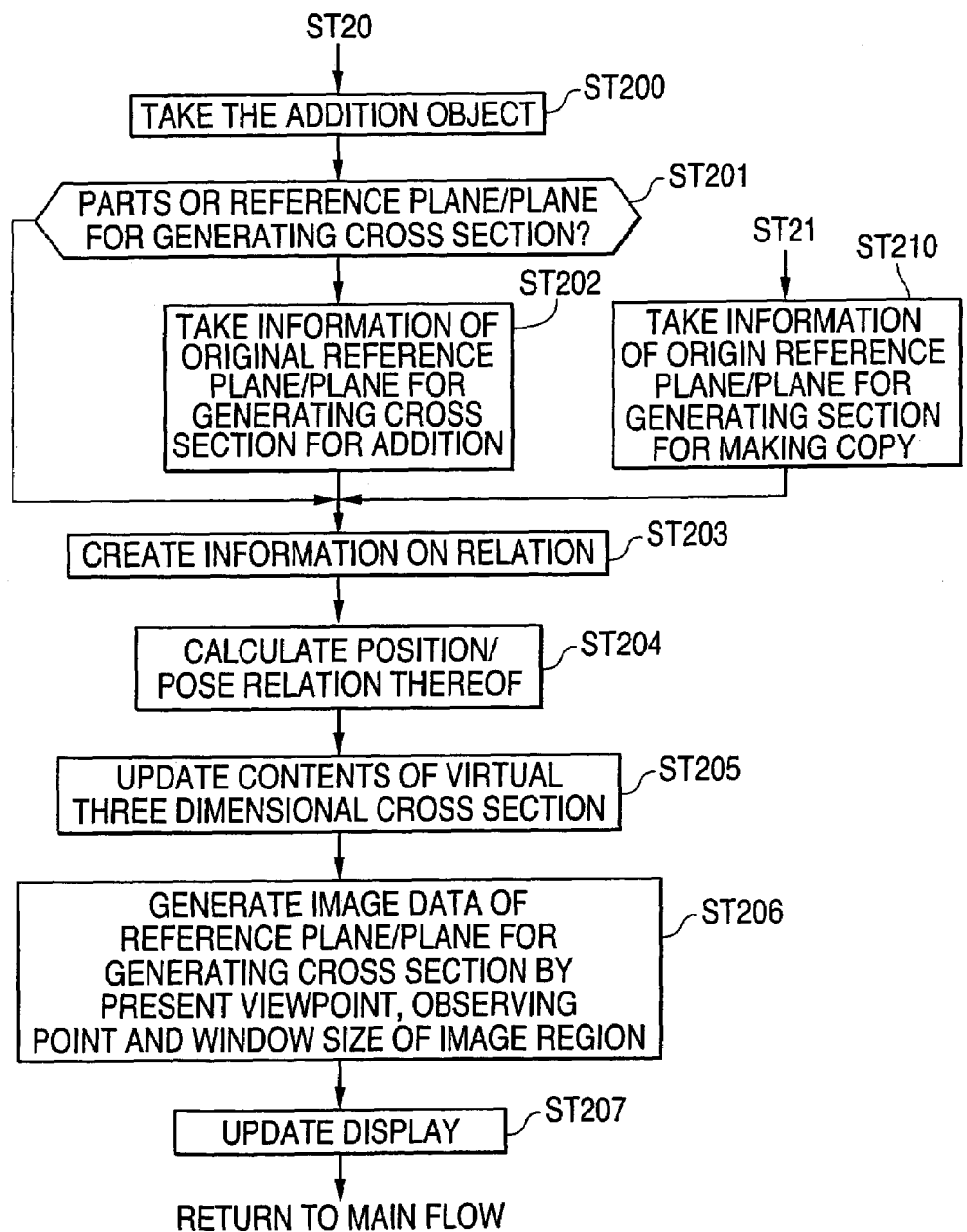
FIG. 48 shows the process flow implemented by the present invention.
Figure 49:
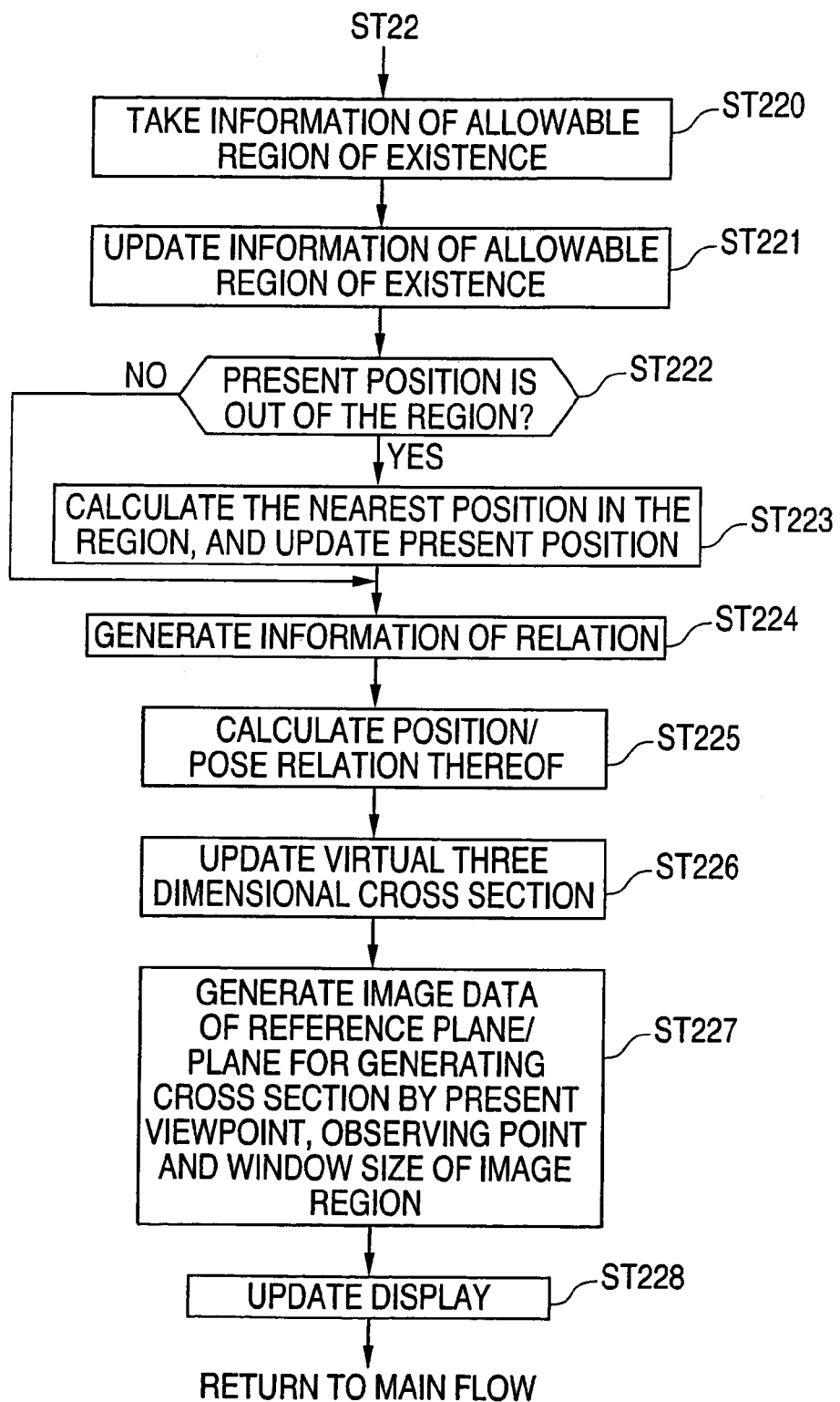
FIG. 49 shows the process flow implemented by the present invention.
Figure 50:
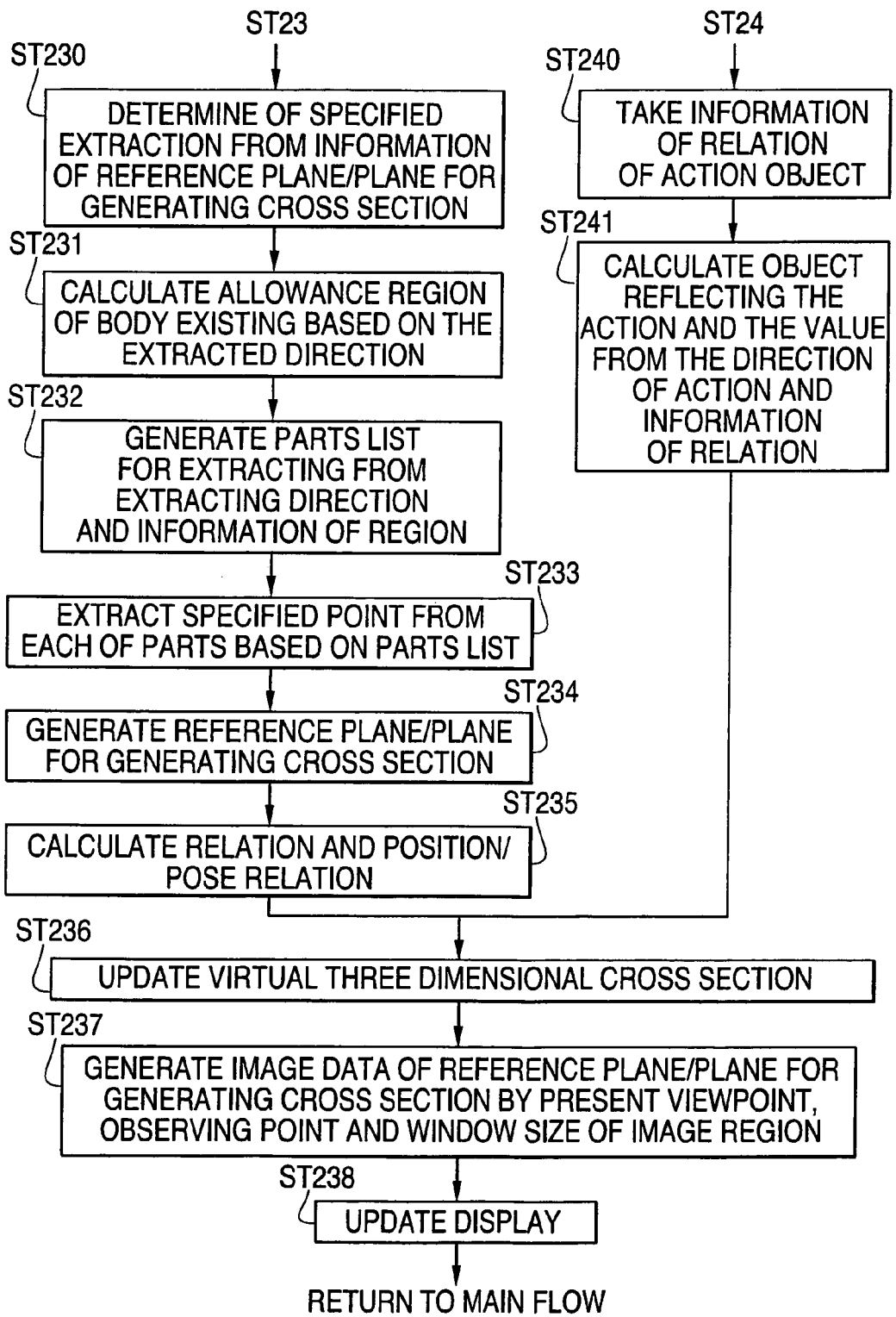
FIG. 50 shows the process flow implemented by the present invention.

When user designates the process (step ST 21) for adding the reference plane and the plane for generating the section, at step ST 200, adding object 732,733 (parts or reference plane or plane for generating the section) is obtained as shown in process flow in FIG. 48. Next at step ST 201, it is determined whether the adding object is parts or the reference plane, the plane for generating the section. When the adding object 732 is the reference plane and the plane for generating the section, going to step ST 202, the information of the reference plane, the plane for generating the section of the origin of the addition is gained.

Next, at step ST 203, the information of relation between the adding object and the original of the addition (parent and child information) is generated, and at step ST 204, the position and the pose relation between them are calculated. Next at step ST 205, corresponding to them, the contents in the virtual three-dimensional space is updated. Next at step ST 206, the data of the reference plane/the plane for generating the section is generated from a present view point, an observing point 330-2 and the window size (340-1,312) of the imaging area, and next at step ST 207, the display is updated corresponding to them, and the process returns to the main flow.

As mentioned above, the designation for adding the reference plane/the plane for generating the section is issued, the program 32 for displaying the body section adds the reference plane and the plane for generating the section.

Further the process (step ST 21) for coping the reference plane/the plane for generating the section is directed, as shown in the process flow in FIG. 48, at step ST 210, the reference plane/the plane for generating the section which are original of the copy is get.

Next, at step ST 203, the relation information between the copy object and copy original (parent child relation information) is generated, at step ST 204, their position and pose are calculated. Next, at step ST 205, the contents of the three-dimensional space are updated correspondingly to them. Next, at step ST 206, the data for making image of the reference plane, the plane for generating the section are made from the present view point 330-2, an observing point and the window size of the imaging area, and they are displayed at step ST 207, and returns to the main flow.

Like this, when the designation for coping the reference plane, the plane for generating the section is issued, the program 32 for displaying the body section copies the reference plane, the plane for generating the section according to it.

Also, when designation for directing the allowable region for the existence of the reference plane, the plane for generating the section is issued from the user, at first, at step ST 220, the information is obtained by the interfacing with user. Next, at step ST 222, it is determined whether the present position is in the region or out of the region is determined. When it is out of the region, going to step ST 223, a position nearest from the present position is calculated, and the present position is updated accordingly to the point. When it is in the position, it in the position, it is remained at the present position.

Next, at step ST 224, correspondingly to the present position updated, the information of relation (in formation of relation of the parent child see, FIG. 39, 116, 117) is generated, and at step ST 225, their positions and the relation of the position are calculated. Next, at step ST 226, the contents of the three-dimensional section is updated. Next, at step ST 227, the data for making the image of the reference plane/the plane for generating the section are generated, and at next step ST 228, the display is updated and the process returns to the main flow.

As mentioned above, when a direction for directing the possibility region of the existence for the reference plane/the plane for generating the section is issued from the user, the program 32 for displaying the body section designates the allowable region of the existence (see FIG. 23) of the reference plane/the plane for generating the section.

Next when the extraction of the specified point based on the specified reference plane, the plane for generating the section/the automatic creation/a half-process creation of the reference plane, the plane for generating the section are designated from the user (step ST 23), at first, at step ST 230, the direction of the extraction of the specified point is decided from the information of the reference plane/the plane for generating the section. Next at step ST 231, the allowable region of existence (see FIG. 44) of the body (821,822) is calculated based on the decision of the extracted direction.

Next, at step ST 232, the list of the parts which should be extracted is generated from the extracted direction and the possibility region of the existence of the body calculated, and at step ST 233, the specified point is extracted from the parts based on the generated list. Next at step ST 234, the reference plane, the plane for generating the section containing the specified points is generated, and at net step ST 235, the information of the relation (the parent child relation see, FIG. 39, 116, 117) is generated, and the relation of the position and the pose with the parent are calculated.

Next, at step ST 236, the contents of the virtual three-dimensional space are updated, and at next step ST237, the data for making the image of the reference, the plane for generating the section is generated from the present view points, an observing point and the window size of the imaging area, and they are displayed at step ST 238, and returns to the main flow.

Like this, when the extraction of the specified point based on the specified reference plane, the plane for generating the section, and the automatic creation/semiautomatic creation of the reference plane, the program 32 for displaying the body section extracts the specified point (for example, hole 628, different level 639 in figure in FIG. 41), and creates the reference plane/the plane for generating the section. Further it displays the section obtained from them.

Also, the transfer and rotation of the specified reference plane and the plane for generating the section and the parts are directed from the user (step ST 24), at first at step ST 240, obtains the information of the relation of the object are obtained, next at step ST 241, the object for acting (the reference plane, the plane for generating the section, and the value are calculated.

Next, at step ST 236, the contents of the virtual three-dimensional space are updated, and at next step ST237, the data for making the image of the reference, the plane for generating the section is generated from the present view points, an observing point and the window size of the imaging area, and they are displayed at step ST 238, and returns to the main flow.

Like this, when the rotation of the specified reference plane 126/plane 127.128 for generating the section/parts 125 are designated the program 32 for displaying the body section transfers and rotates the specified reference plane/the plane for generating the section/the parts by transferring and rotating the child thereof (the plane 127 for the pane 126, the plane 128 for the plane 127, the reference plane 126, the plane 127, 128 for the parts 125).

Figure 51:
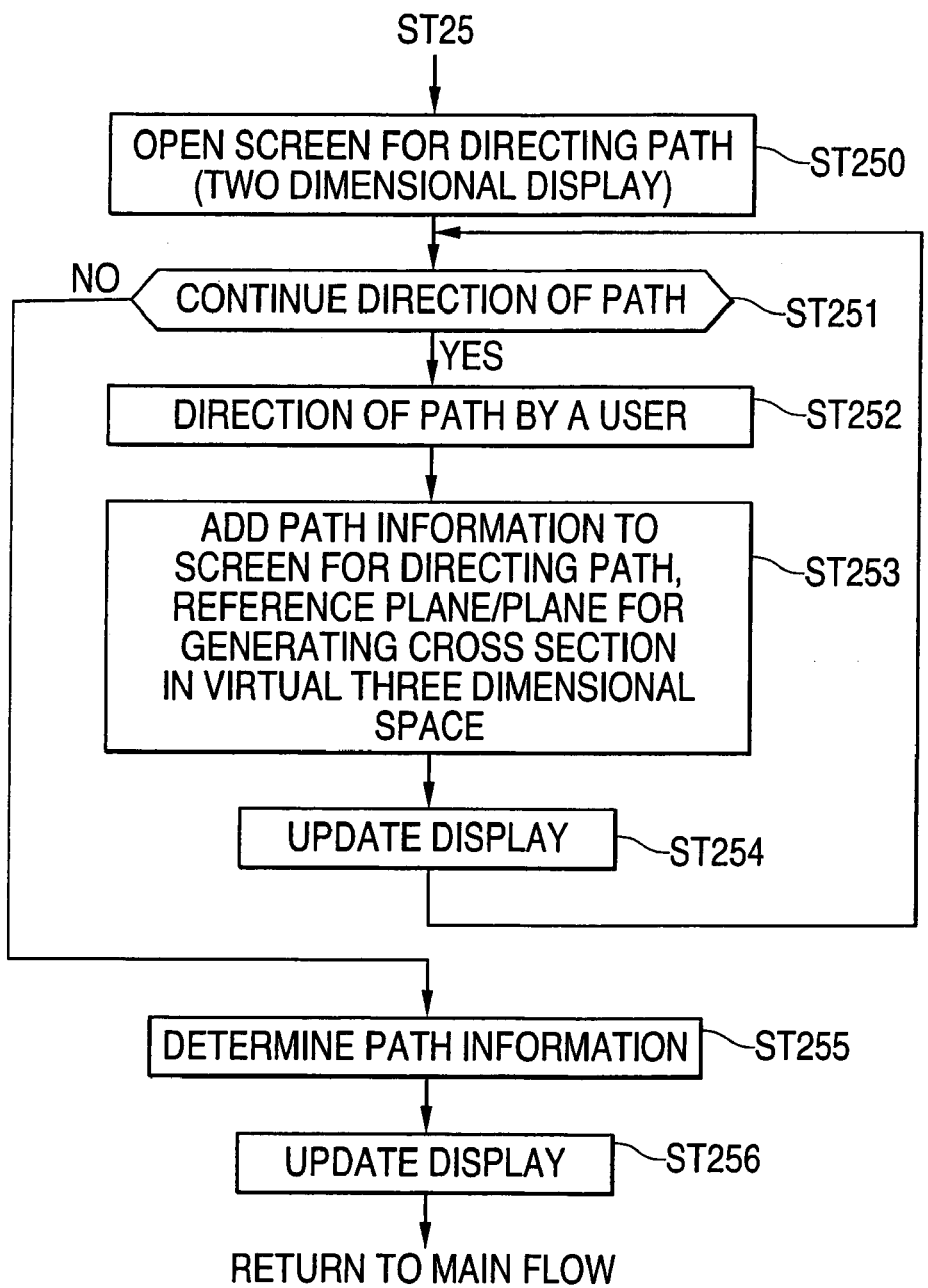
FIG. 51 shows the process flow implemented by the present invention.

Further, when he process (step ST 25) for directing the path for generating the reference plane, the plane for generating the section is requested, as shown in the flow in FIG. 51, at first, at step ST 250, a screen (two-dimensional display FIG. 42, 112) for designating the path is opened. Next at step ST 251, it is determined whether the designation from the user is continued or not. When it is determined that the designation of the path is continued, going to step ST 252, the direction for the path from the user is input.

Next at step ST 253, adding the path information the screen (FIG. 42, 112-1) for directing the path and the reference plane/the plane for generating the section in the virtual three-dimensional. Next at step ST 254, after updating the screen (FIG. 42, 112-1) for directing path and the display of the three-dimensional space, the process returns to the step ST 251.

Further, at step ST 251, when it is determined that the path direction from the user is ended, going to step ST 255, the path information is decided, and the display is updated, and the process returns to the main flow.

Like this, a process which designates the specified reference plane/the plane for generating the section is requested from the user, the program 32 for displaying the body section designates the path on the specified reference plane (FIG. 42, 626)/the plane for generating the section corresponding to the direction.

Figure 52:
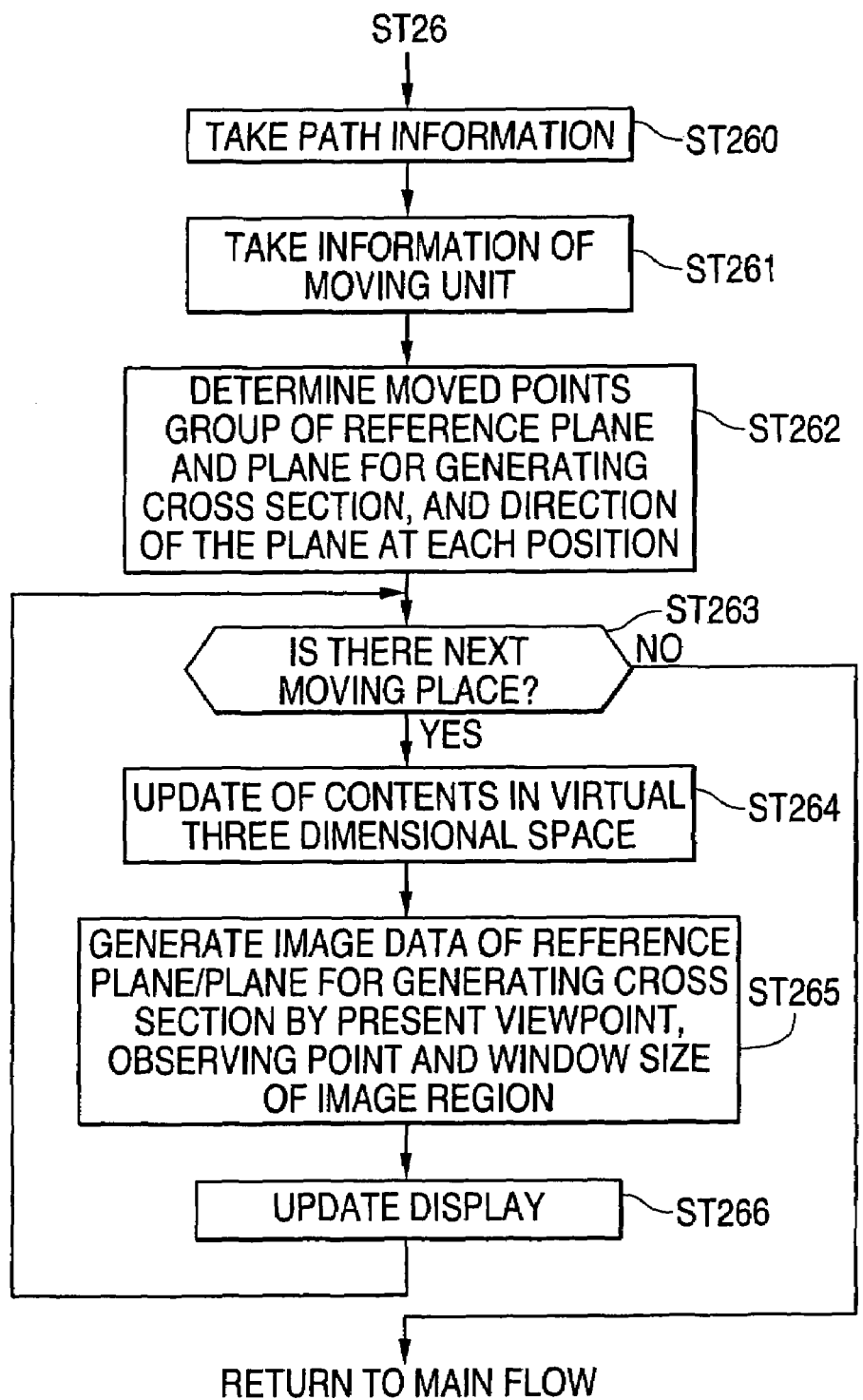
FIG. 52 shows the process flow implemented by the present invention.

Further, when a process (step ST 26) moving along the path (FIG. 42, 6309 defined for the reference plane/the plane for generating the section is directed from the user, at first, at step ST 260, as shown in FIG. 52, the path information is obtained and at next step ST 261, a transferring unit information is obtained by interfacing with the user. Next at step ST 262, the moving group of the reference plane/plane for generating the section (see FIG. 42, 620, 627, 632) which are obtained by transferring the moving unit obtained along the path and the plane direction (normal line vector) of each plane thereof is obtained and the next, at step ST 262, the reference plane/the plane for generating the section are decided.

Like this, at step ST 263, it is determined whether the next moving point is there or not. When it is determined that the next moving point is determined, at the next step ST 264, the virtual three-dimensional space is updated according to the reference plane/plane foe generating section. Next at step ST 265, the data for imaging the reference plane/plane for generating section based on the present view point/observing point and the window size of imaging area. Next at step ST 263, when the next moving point is not determined, the process returns to the main flow.

Like this, when the process moving along the path (FIG. 42, 630) defined on the specified reference plane/the plane for generating the section is directed from the user, the program 32 for displaying the body section makes the reference plane/the plane for generating the section by moving along the defined path, and displays the body section generated according to the movement on the screen, for example, continuously.

Figure 53:
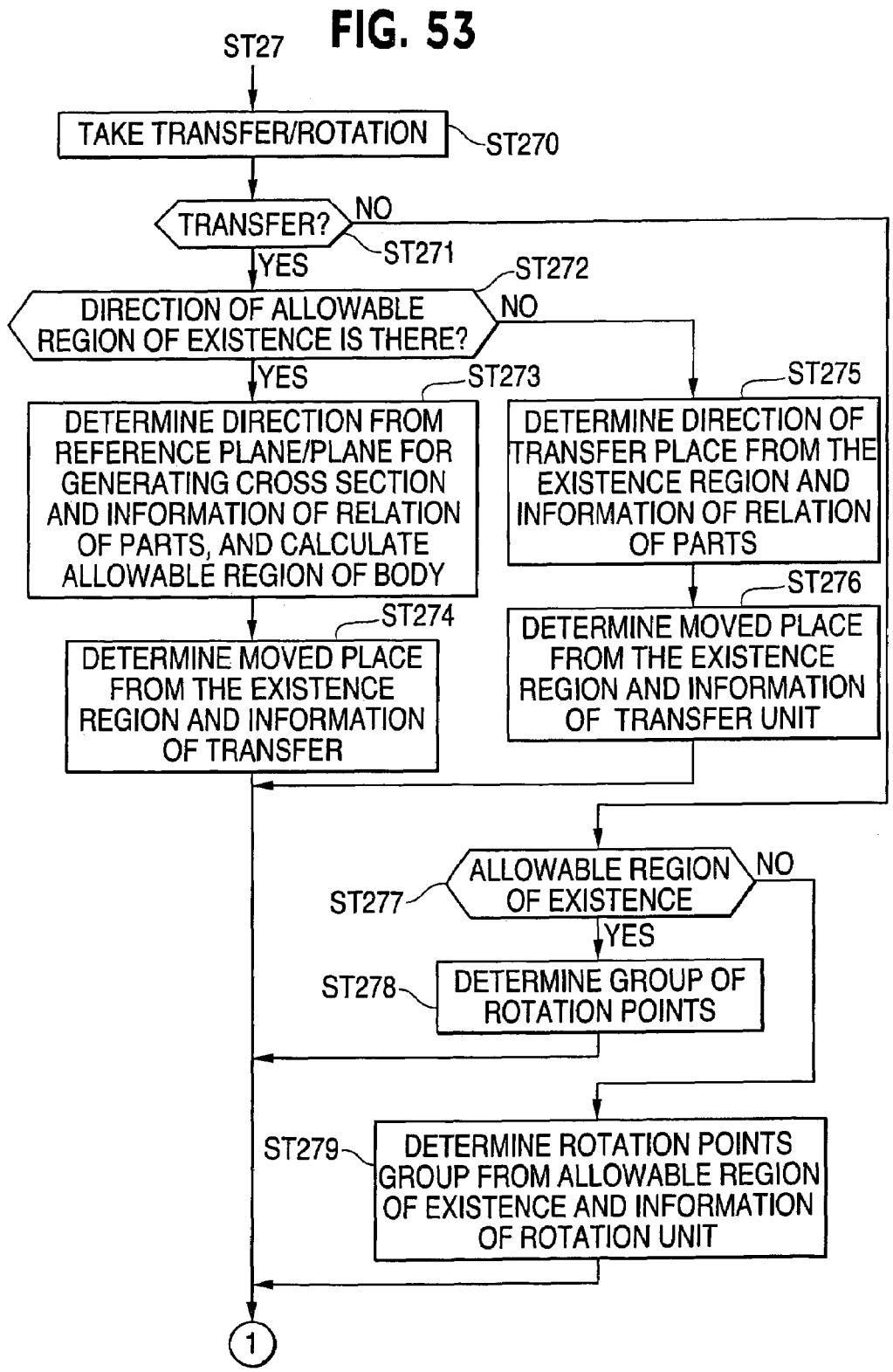
FIG. 53 shows the process flow implemented by the present invention.
Figure 54:
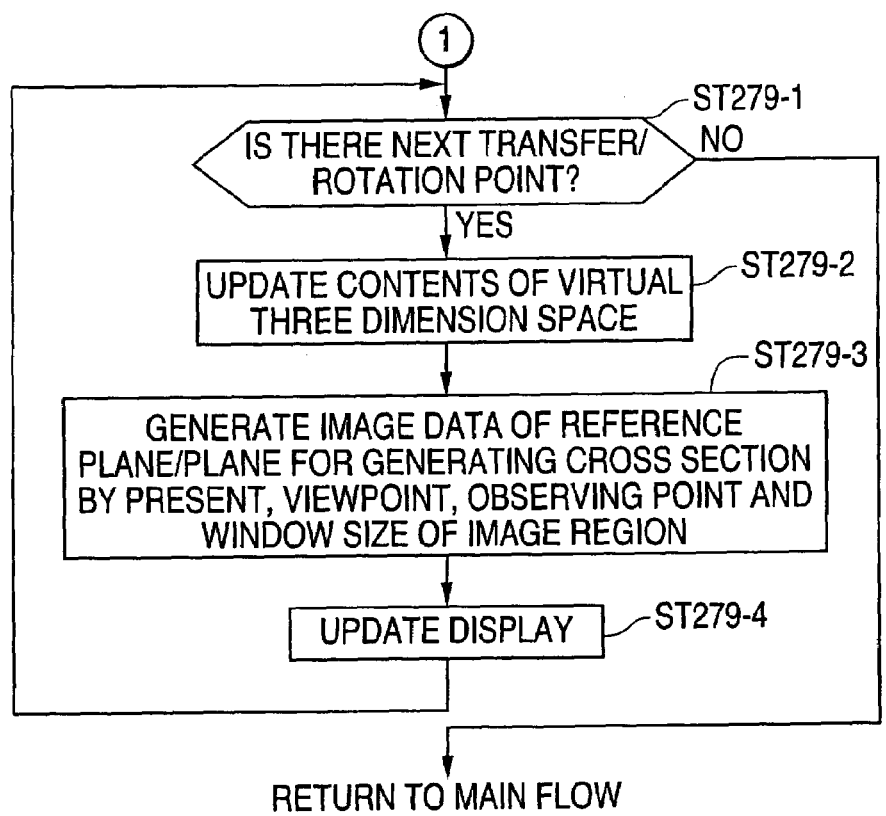
FIG. 54 shows the process flow implemented by the present invention.

Further, a process (step ST 27) which transfers and rotates the specified plane/the plane for generating the section (126, 127, 626) continuously is designated, as shown by the process flow in FIG. 53 and FIG. 54, at first at step ST 270, the transferring and moving unit information is defined with interfacing with the user. Next at step ST 271, it is defined which of the transferring process or the rotating process is directed. When the transferring process is designated, going to step ST 272, it is determined whether the possible region (see, FIG. 44) of existence is directed or not.

According to the determining process, when the allowable region of the existence is not defined, going to step ST 273, deciding the moving direction by the relation information between the reference plane/the plane for generating the section and the parts (the direction of the normal line vector is decided as the moving direction). Further allowable region for existence (the existence region of the body (see FIG. 44)) in the moving direction is calculated, and at next step ST 274, the moving group is determined by the movement in the moving direction within the existence region according to the moving unit.

On the other hand, according to the determining program, when it is determined that the possibility region of the existence is designated, going to step ST 275, the moving direction is decided by the reference information (FIG. 39, 116, 117) between the reference plane/the plane for generating the section, at next step ST 276, the moving group is determined by moving in the moving direction within the existence region according to the moving unit.

Further at step ST 271, when the rotation process is designated, going to step ST 277, it is determined whether the possibility region of the existence is designated or not. When, the possibility region of the existence is not designated, going to step ST 278, the rotaing group is determined by the rotation in the existence region according to the rotation unit.

On the other hand, according to the determination process, whe the possibility region of the existence, going to step ST 279, the rotaing group is determined by the rotation in the existence region according to the rotation unit.

When the process of step ST 274/step ST 276/step ST278/ step ST 279 are ended, next, at step ST 279-1, it is determined whether the next transferring or moving point is there or not. When it is determined that the next transferring and rotating point is there, at the next step ST 279-2, the contents in the virtual three-dimensional space is updated according to the transferring ad rotating place in the reference plane/ the plane (126,127,128,626) for generating the section.

Next at step ST 279-3, the reference plane/the plane for generating the section is generated based on the view point at the time, the observing point and the window size of the imaging area, and at next step ST 2794, the display is updated according to it, and returns to step ST 279-1. Further, at step ST 279-1, when it is determined that there is not the point for the transfer and rotation, the process returns to the main flow.

Like this, the progress (step ST 27) for transferring and rotating continuously and automatically the specified reference plane/the plane for generating the section is designated from the user, the program 32 transfers and rotates the reference plane/the plane for generating the section (126, 127,128,626) continuously and automatically, and generates the reference planes/the plane for generating the section. Further the section generated by the process is displayed, for example, continuously.

Figure 55:
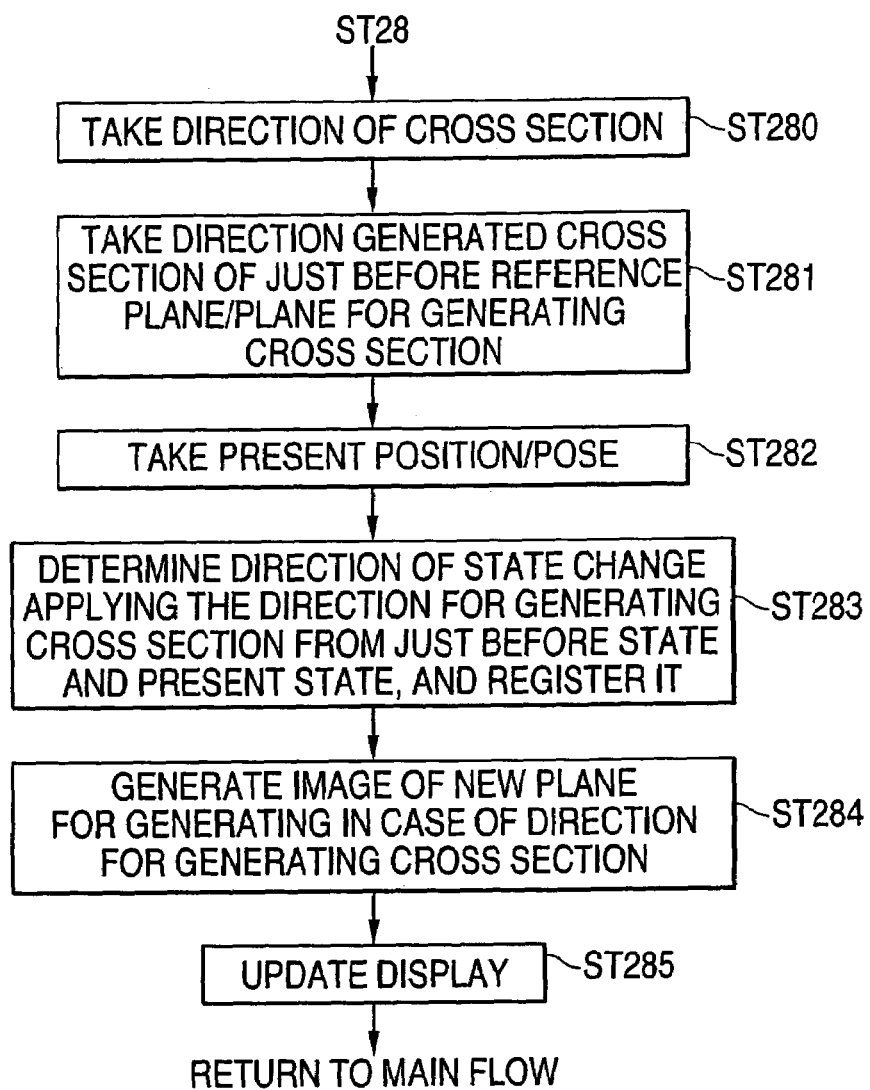
FIG. 55 shows the process flow implemented by the present invention.

When the process (step ST 28) which directs the specified reference plane/the plane for generating the section is designated by the user, as shown in the flow in FIG. 55, at first at step ST 280, a section designated from user is obtained. Next, at step ST 281, the direction of plane of the reference plane/the plane for generating the section just before is generated, and the position at the time and pose is gained at step ST 282.

Next at step ST 283, the direction of state change for applying the generation of the directed plane direction is determined and registers it. Next, at step ST 285, the display is updated from it, and the process returns to the main flow.

Like this, a process (step ST 28) which designates the direction of the reference plane (FIG. 32, plane 1,2,3)/plane for generating the section is requested, the program 32 for displaying the section updates the direction of the generating section, and displays the new section.

Figure 56:
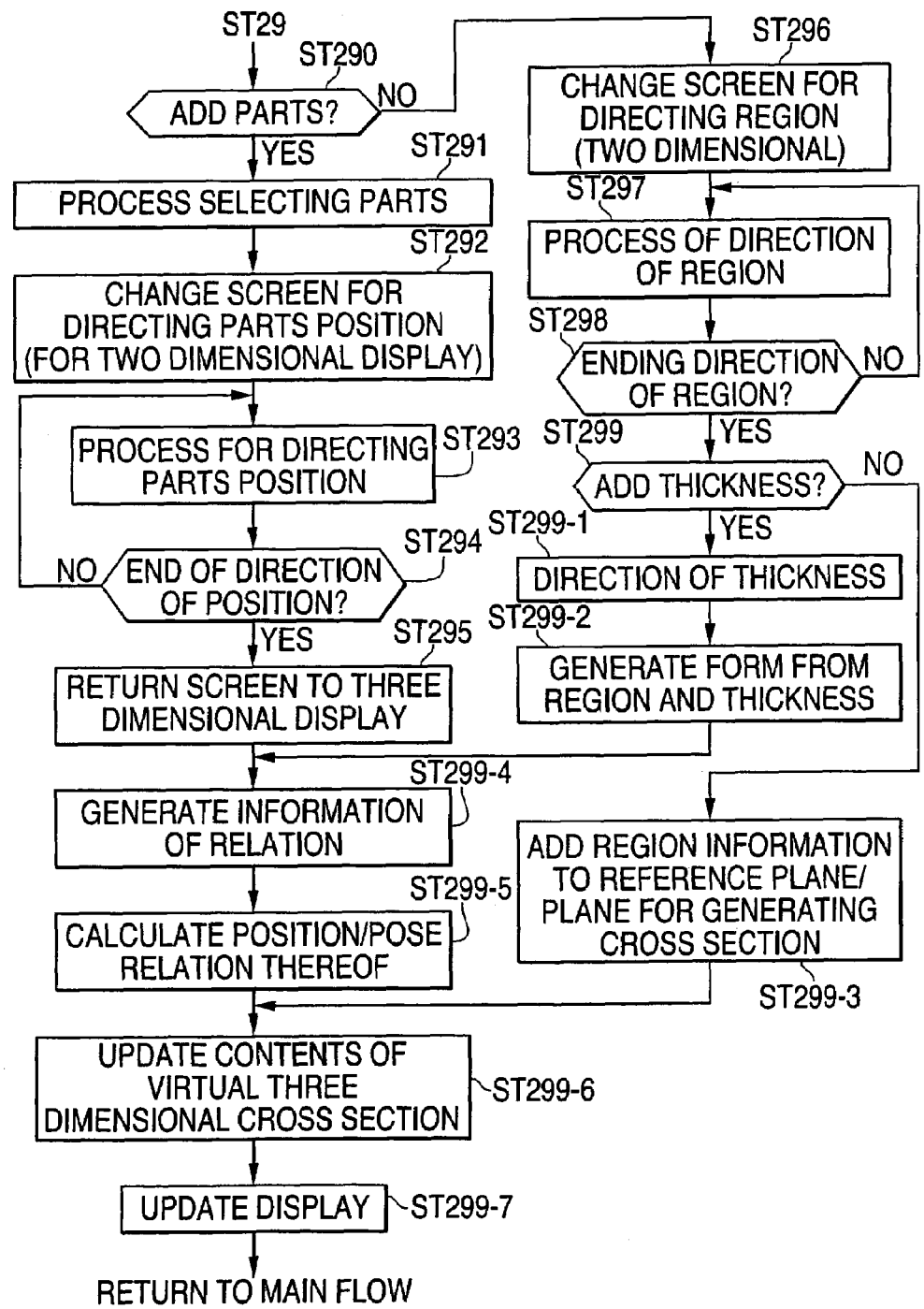
FIG. 56 shows the process flow implemented by the present invention.

Further a process (step ST 29) which adds parts (FIG. 43, 732) and the region on the specified reference/the plane for generating the section, as shown in the flow in FIG. 56, at first, at step ST 290, it is determined whether the designation is the addition of the parts (FIG. 43, 732) or region (FIG. 43, 733). When it is the addition of the parts, going to step ST 291, the selecting process of the addition of parts is implemented by interfacing with the user.

Next at step ST 292, the display image is changed to the screen (two dimensional display (FIG. 731-1)) for designating the parts position. Next, at step ST 293, the position of the addition of parts 732 is designated by using the screen for designating the position of the parts, and at 294, determining the end of the designation of the parts position, at step ST 295, the display image is returned to the three-dimensional display.

On the other hand, at step ST 290, when the addition of the region (FIG. 43, 733) is decided, going to step ST 296, the screen displaying the image is changed to the screen (two dimensional display (731-2)) for designating the region. Next, at step ST 297, the addition of region is determined by designating the region 733 by interfacing with the user on the screen. Next, at step ST 298, it is determined that the designation of the region position is ended, going to step ST 299, it is determined whether the designation defining the depth is or not.

According to the determining process, when the direction of defining the depth (see FIG. 43, 732) is designated from the user, going to the step ST 299-1, the depth is defined by interfacing with the user, and next at step ST 299-2, the form is generated from the region and the depth. On the other hand, when it is determined that the definition of the depth is not designated from the user, going to the step ST 299-3, the region information is added to the reference plane, the plane for generating the section.

When, the processes at step ST 295/299-2 are ended, next, at step ST 299-4, the relation information (information of the relation between the parent and child information) is generated, and at step ST 299-5, the relation of position and pose between them is calculated. Next, at step ST 299-6, the contents of the virtual three-dimensional space is updated, and at next step ST 299-7, the display is updated corresponding to the up-date, and the process returns to the main flow.

Ending the process of step ST 299-3, at next step ST 299-6, the virtual three-dimensional space is updated, at next step ST 299-7, the display is updated according to the up-date, and the process returns to the main flow.

As mentioned above, a process (step ST 29) adding the parts 732 or the region 733 to the specified reference plane 731/the plane for generating the section is directed from the user, the program 32 for displaying the section adds the parts and the region to the reference plane/the plane for generating the section corresponding to it.

Figure 57:
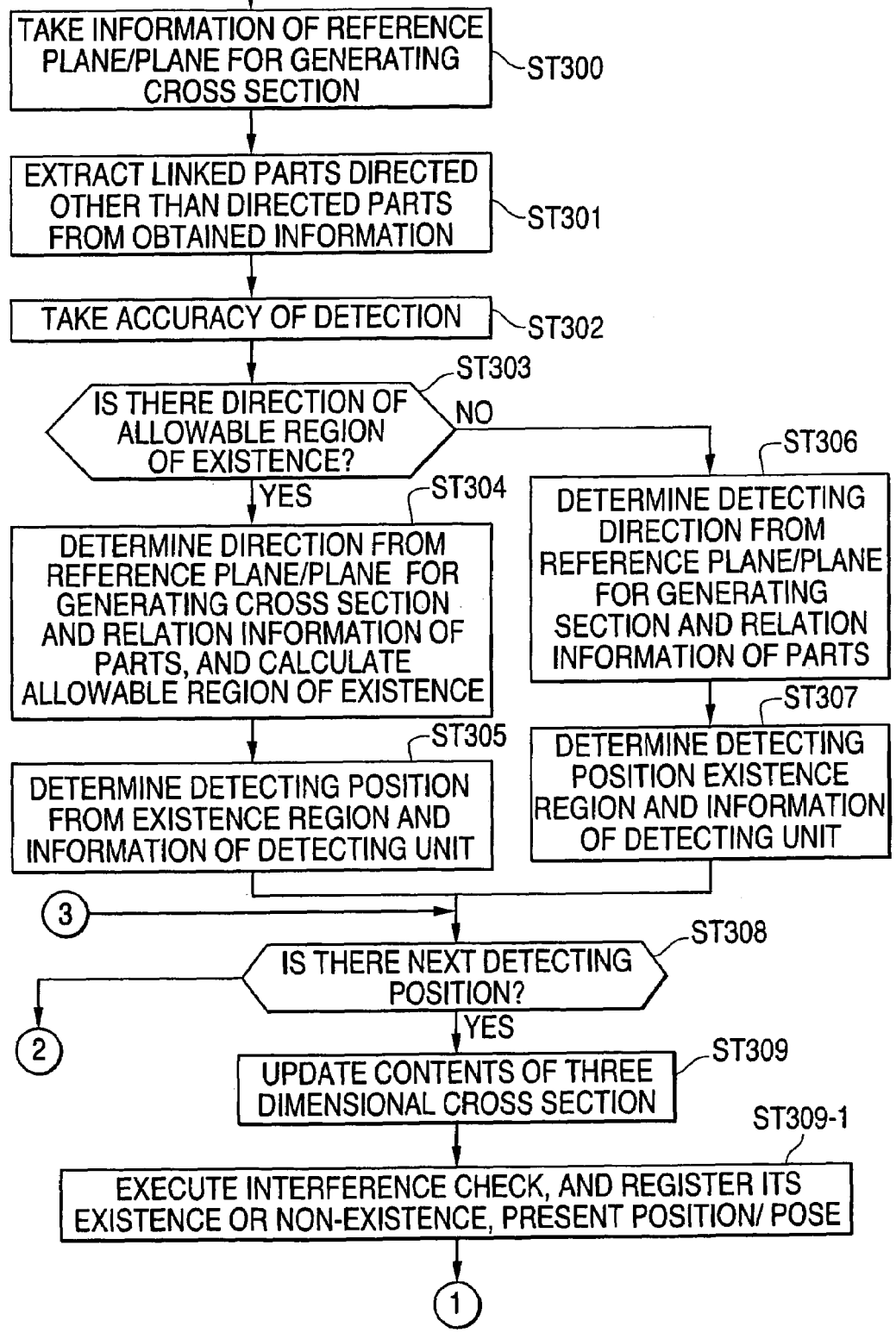
FIG. 57 shows the process flow implemented by the present invention.
Figure 58:
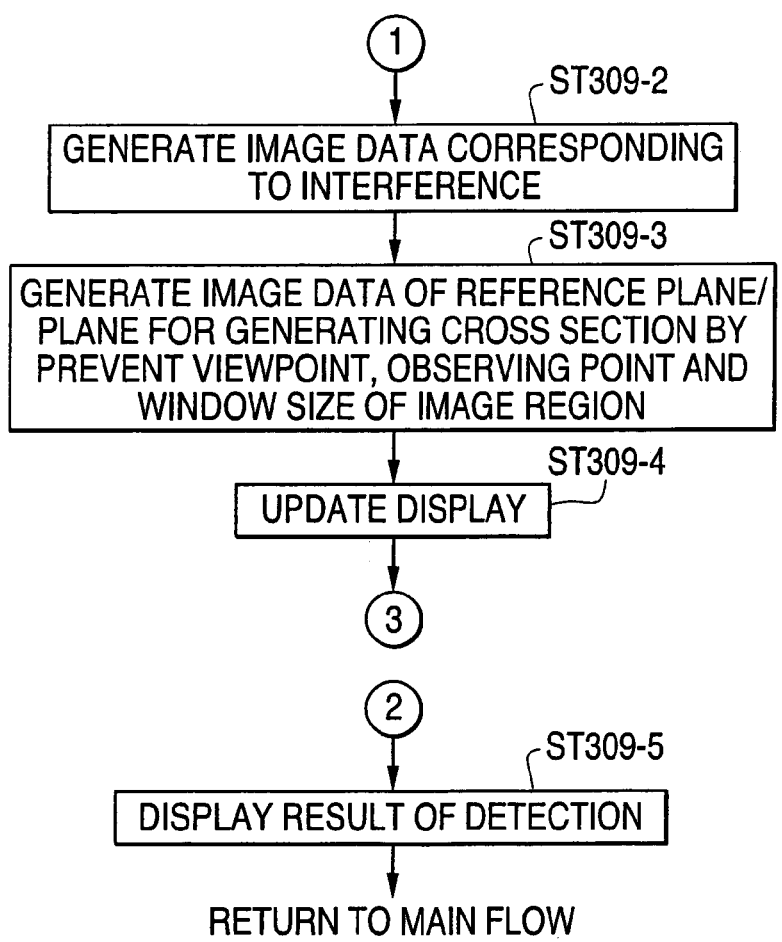
FIG. 58 shows the process flow implemented by the present invention.

On the other hand, the process (step ST 30) which detects the allowable region for the parts existing (see FIG. 22, FIG. 44) is designated, as shown in process flow chart in FIG. 57 and in FIG. 58, at first at step ST 300, the information of the referenced plane/the plane for generating the section corresponded to the parts group for detecting object is gained.

Next at step ST 301, the parts linked except the directed parts from the obtained information. Next, at step ST 302, the precision for the detection is obtained by interfacing with the user, at next step ST 303, it is determined whether the direction of the allowable region of existence (FIG. 22) is directed or not.

In this determining process, when the allowable region of the existence is not defined, going to step ST 304, the detecting direction (FIG. 32) is decided by the reference plane/plane for generating the section and information of parts (deciding the normal vector direction of the parent plane as the detecting direction), the existence region of the body in the direction (the allowable region of the existence) is calculated. Further at next step ST 305, the group of the detected point is gained by detection by a detecting unit along the detecting direction within the existence region of the body.

On the other hand, according to the determination process, when the possibility region of the existence is determined, going to step ST 306, the detecting direction is determined by the information concerning to the relation of the reference plane/the plane for generating the section and the parts. Further at next step ST 307, the group of the detecting point is gained by detection by a detecting unit along the detecting direction within the allowable region (see FIG. 44).

Next, at step ST 308, it is determined whether the next detecting point is or not. Next, it is determined that there is the next determining point at next step ST 309, the virtual three-dimensional space is updated according to the up-date of the reference plane/the plane for generating the section. Next at step ST 309-1, the interference check (see FIG. 44) at the determination place is executed, and the existence or not-existence of the interference, the position and pose at the time is registered.

Next at step ST 309-2, the data for making image is generated according to the existence or no-existence of the interference, and next step ST 309-3, the data for making the image of the reference plane/the plane for generating the section are made from the view point at the time, the observing point (FIG. 37, 330-2) and the window size of the image area is generated. Next at step ST 309-4, the display is updated according to the data, and returns to step ST 308. Further at step ST 308, when there is not the detecting point, at step ST 309-5, the detected result is displayed, and returns to the main flow.

Like this, when the process (step ST 30) which detects the allowable region of existence of the parts (see FIG. 44) is designated, the program 32 for displaying the section moves the reference plane/the plane for generating the section on which the check object is arranged for check of the interference (see FIG. 24) and tests the interference. Further the check result is displayed.

Figure 59:
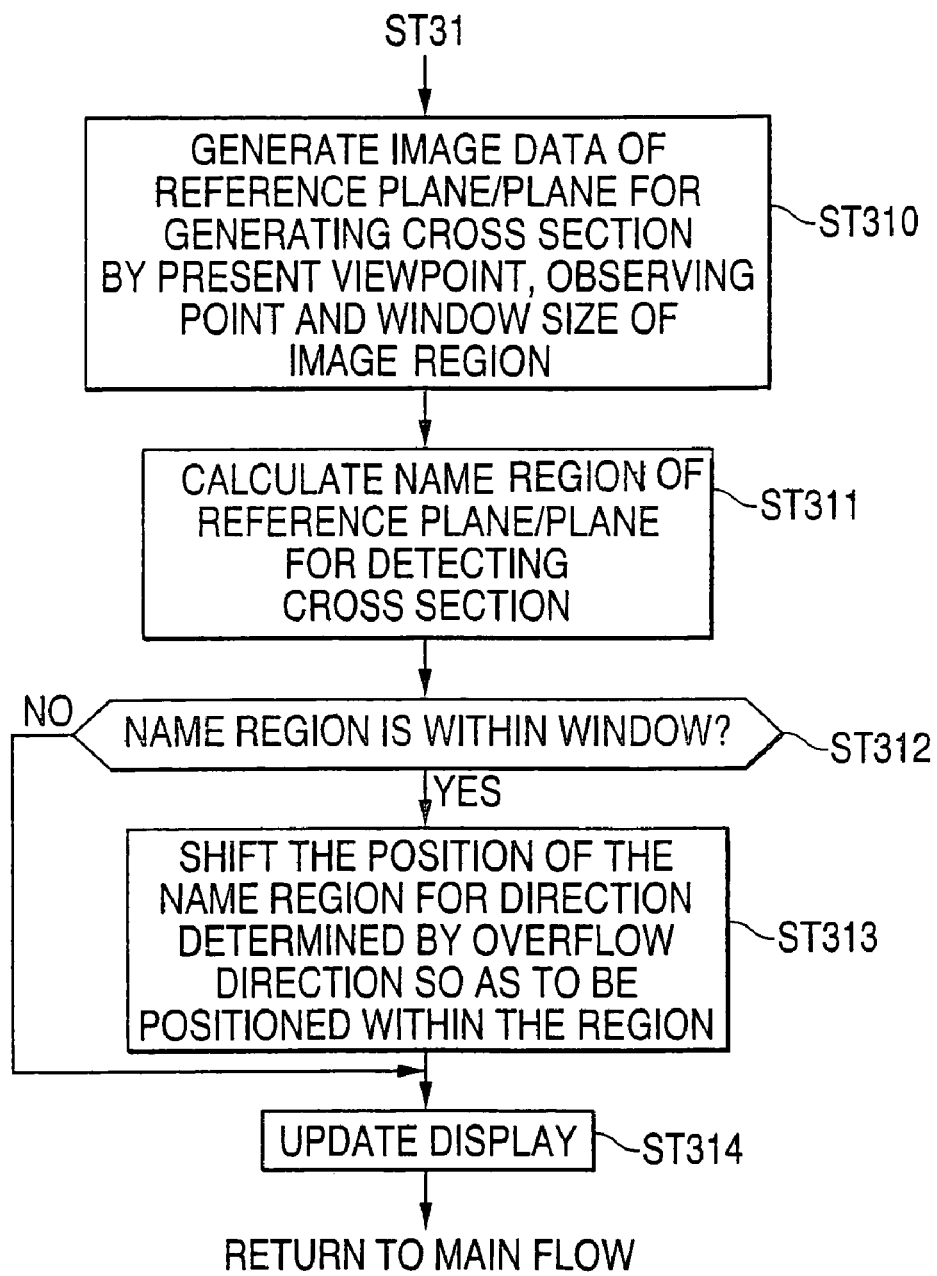
FIG. 59 shows the process flow implemented by the present invention.

Further when the process (step ST 31) which updates the contents of display screen is requested, as shown in the process flow in FIG. 59, the image data for the present view point, the observing point and the window size of the image region. Next, at step ST 311, the name region (a sign 141,142, 145) of the reference plane/the plane for generating the section is calculated.

Next, at step ST 312, it is determined whether the name region 141,142,145 is displayed within the screen or not. When it is determined that it is not within the screen, it is shifted so as to be in the window according to the over flow direction. Further at next step ST 314, the display is updated, and the process returns to the main flow.

Like this, when the process for the reference plane/the plane for generating the section is implemented, according to the operation of the user, the program 32 for displaying the body section calculates again the size of the reference plane/the plane for generating the section so as to be in the screen, and arranges the name region 141,142,145 at the appropriate position corresponding to the reference plane/the plane for generating the section.

Figure 60:
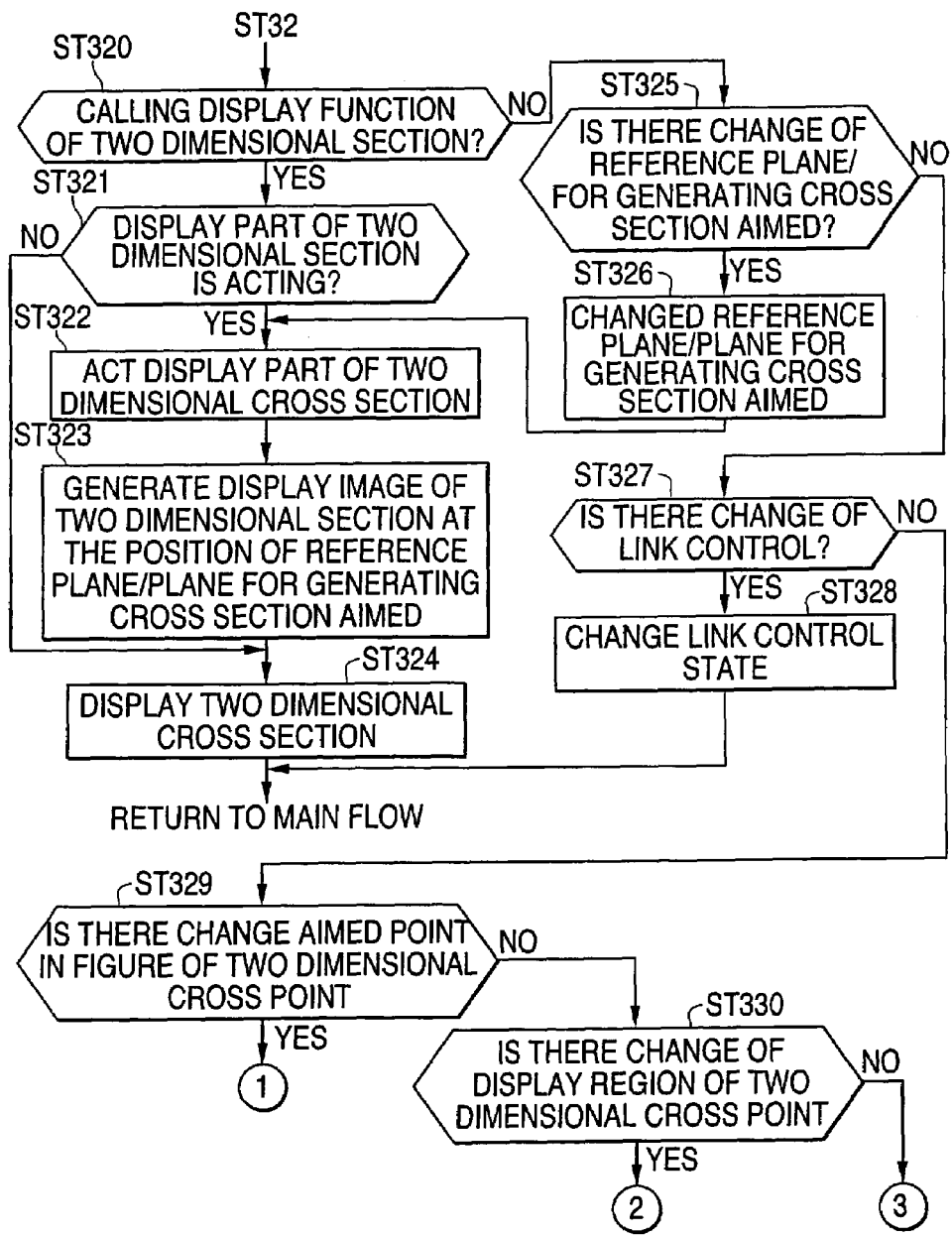
FIG. 60 shows the process flow implemented by the present invention.
Figure 61:
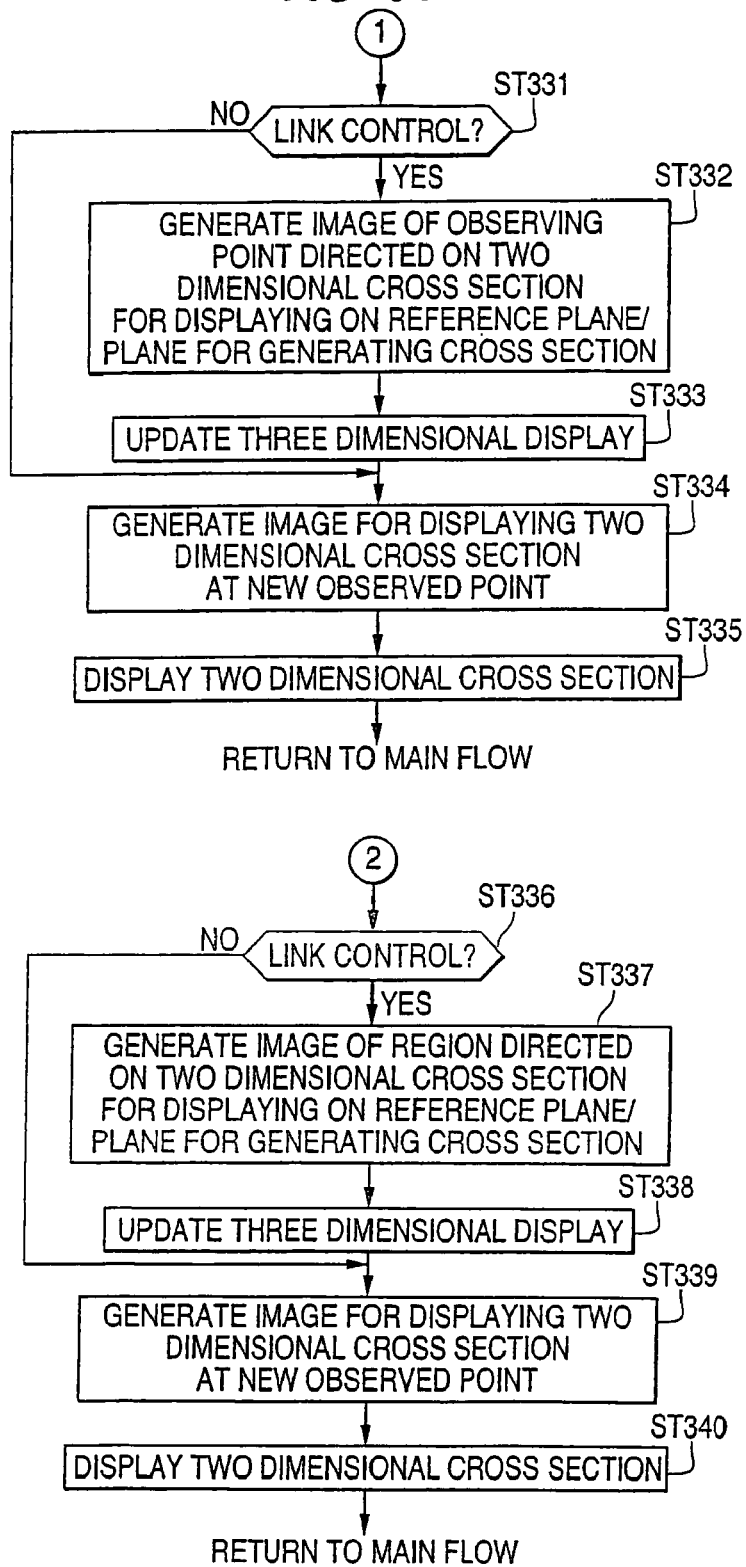
FIG. 61 shows the process flow implemented by the present invention.

Further, a process for imaging simultaneously the reference plane/the plane for generating the section 126,127 and the two-dimensional section (FIG. 34, 345) is requested, as shown in process flow from FIG. 60 to FIG. 62, it is determined whether the designation calls the function displaying the two dimensional section or not at step ST 320. When the process is that calls the two dimensional section display, going to at step ST 321, it is determined that te two dimensional section acts or not.

At the process, the two dimensional section display does not act, going to step ST 322, the two-dimensional section display is acted at step ST 322. Next at step ST 323, the two-dimensional section display image 345 is generated the reference plane/plane for generating the section at the time (FIG. 34, 126,127), and the two dimensional section display is displayed at step ST 324, and the process returns to the main flow. On the other hand, when, at step ST 324, it is found that the two-dimensional section displaying part is acted, going to step ST 324, the two-dimensional section is displayed and return to the main flow.

On the other hand, at step ST 320, when it is determined that the designation does not call the two-dimensional section display, going to step ST 325, it is determined whether the designation is the change of the reference plane/the plane for generating the section or not. When the designation is that designates the change of the process is the change, going to step ST 326 the reference plane/plane for generating the section is changed. Further the going to step ST 322, the two dimensional section display part is acted. Further at step ST 323, two dimensional section display image is generated at the reference plane/plane for generating section. Further, at step ST 324, the two dimensional section is displayed, and the process returns to step ST 324.

On the other hand, at step ST 325, when the designation is that does not call the change of the reference plane/the plane for generating the section, going to step ST 327, it is determined whether the designation is that designates changing the link control or not. When the change of the link control is determined, going to step ST 328, the link control is changed, and the process returns to the main flow chart.

On the other hand, when, at step ST 327, it is determined that the designation is not the change of the link control, going to at step ST 329, it is determined whether the designation is the change of the observing point (FIG. 37, 330-2) in the two-dimensional section or not. When the designation is not the change of the two-dimensional section, going to step ST 330, it is determined whether the designation is the change of display region of the two-dimensional section or not.

On the other hand, when, at step ST 329, it is determined that the designation is a change of the observing point in the two-dimensional section, going to step ST 331, it is determined whether the link control is set or not. According to the process, when it is determined that the link control is set, going to step ST 332, the observing point is imaged on the two-dimensional section, and the three-dimensional section is updated at the next step ST 333.

Further, when it is determined that the process is ended at step ST 333 or the link control is set at step ST 331, next at step ST 334, the two-dimensional section display image at a new observing point is generated, and at step ST 335, the two dimensional section is displayed, and returns to the main flow.

On the other hand, at step ST 330, when it is determined that the designation is a change of the region of the two-dimensional section, going to step ST 336, it is determined that the link control is set or not. When according to the determination process, going to step ST 337, the image of the region designation in the two-dimensional section is generated, and the three-dimensional section display is updated at step ST 338.

Further, when it is determined that the process is ended at step ST 338 or the link control is not set at step ST 336, next at step ST 339, the two-dimensional section display image in a new region is generated, at step ST 340, the two-dimensional section display image is displayed, and the process returns to the main flow at step ST 340.

On the other hand, when, at step ST 330, it is determined that the designation is not the change of the displaying region of the two dimensional section, going to step ST 341, it is determined whether the designation is the change of the space for generating section or not. In the step ST 330, when it is determined that the designation is not the change of the display region of the two-dimensional section, In the determining process, when it is determined that the designation is the change of the space for generating the section, going to the step ST 342, it is determined whether the link control is set or not. When it is determined that the link control is set, going to step ST 343, the three-dimensional display is updated.

Further when it is determined that the process is ended at step ST 343 or the link control is set at step ST 342, next at step ST 344, the two-dimensional section display image at a new observing point is generated, and at step ST 345, the two dimensional section is displayed, and returns to the main flow. Moreover, when, at step ST 341, it is determined that the direction is not the change of the space for generating the section, going to step ST 346, the process of the direction is implemented, and the process returns to the main flow.

Like this, when the progress (step ST 32) for imaging simultaneously the specified reference plane/the plane for generating the section is designated from the user, the program 32 for displaying the body section responds to it and generates the two dimensional section of the body according the designation, and displays it.

According to the example shown in figures of the present invention the present invention is not limited to the example. The example is that of the parent and child relation, the present invention is applied to the components concerning to other than the parent and child relation.

As explained above, this invention composes displaying the body in the three-dimensional space. The section of the body 125 is generated by cut of the set displaying plane (the reference plane, the plane for generating the section) defined based on the plane of parts composing the body, and displayed on a screen. Further, as the set displaying plane is transferred and rotated corresponding to the user's operation, the user can observes the necessary three-dimensional section 125 interactively with the image.

Further, when the components are composed as mentioned above, the parent and child relation is defined, and according to the relation, the set displaying plane (FIG. 33, 127,128) is transferred and rotated according, so the user observes the body section.

Further, in components of the present invention, the parts of the body and the set displaying planes are treated as one body, so, for example, the user can set the plane for displaying corresponding to the movable parts, and can observe the body section in following to the movement of the body. Therefore, the user can observe the body section which cannot observed by the prior technique.

Further, in component of the present invention, the operation plane and a sign board (141,142) arranged characters corresponding to the set displaying plane displaying are composed, so users operate the set displaying plane easily and can transfer and rotate the set displaying plane easily. In case that there are relations between the set displaying planes, as the character strings are arranged so as to show the relation, users can distinguish easily the plate having the relation.

Further, in components of the present invention, the set displaying plane (127, 128) is displayed by a frame, or displayed by the half transparent color. So the user observes the body without the obstruction by the set displaying plane. At the time, when there are relations between the set displaying planes are displayed by the same color, so the user can distinguish easily the set displaying planes having the relation.

Further, in components of the present invention, users edit the set relation easily, so the users can change the relation easily without resetting all the set displaying plane.

Further, in components of the present invention, the set displaying plane containing the specified point of the body (for example, FIG. 41, 528,629) is generated automatically, the set displaying planes which are followed to the path (FIG. 42, 630) designated by the user, and the new set display plane is set according to the transferred or rotated process automatically, so users can observe the body section 125 without troublesome operations for setting the set displaying.

Further in components of the present invention, the allowable region of existence for the set displaying plane is set, so the users, for example, observe the body section within the limit for the body movement, and further the exact body section can be observed therefore.

Further, in components of the present invention, any cut direction of the set displaying plane can be set, so that users can observe from any direction voluntarily. At this time, the cutting direction of the body which is dependent to the place of the set plane for displaying is set, so that the user can observe the body dross section from the direction considering the body position.

Further, in components of the present invention, adding parts 732 are arranged, and the adding region 733 is set on the set displaying plane, so the user can investigate easily the parts relation in case of the addition of parts.

Further, in components of the present invention, the interference checks of one of parts, which moves by linking with the set displaying plane based on the relation, with another parts are possible, so that, when new parts are added, user investigate easily the interference.

Further, in components of the present invention, the two-dimensional section (FIG. 34, 345) cut by the three-dimensional section is generated, the two-dimensional section of the body cut by the set displaying plane selected from the set displaying plane is generated, and the two dimensional section and the three dimensional section are displayed simultaneously. So users observe the body section easily and exactly.

At this time, users may select voluntarily which of the two-dimension section displays, so that the user may observe the necessary two dimensional section. Further, users may choose the displaying two-dimensional section, showing the part corresponding to the three-dimensional section. Or users observe the two-dimensional section and the three-dimensional section, showing the designated observing point, so that the user knows easily the correspondence of the two-dimensional section and the three-dimensional section.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A device for displaying a body section in a virtual three-dimensional space by a computer comprising:

management means for managing attribute information of a parent part and a child part and arranging information of a set displaying plane for making a body section defined based on a plane of at least one of the parts;

implementing means for generating a three-dimensional section of the body cut by the set displaying plane according to the management data of the management means, and for displaying the three dimension section with the set displaying plane on the display screen; and update means for updating the arranged information managed by the management means by corresponding to the transfer or rotation of the set displaying plane, wherein a position of a set displaying plane of a child part is updated both upon an update of the attribute information of the parent part and upon an update of a set displaying plane of the parent part.

2. A device for displaying a body section in a virtual three-dimensional space by a computer comprising:

management means for managing attribute information of a parent part and a child part and one or plural kinds of attribute information of a set displaying plane for making a body section with a relation between the parts and the attribute information;

implementing means for generating a three-dimensional section of the body cut by the set displaying plane according to the management data of the management means, and for displaying the three-dimensional section with the set displaying plane on the display screen; and update means for updating the arranged information managed by the management means by corresponding to the transfer or rotation of the set displaying plane, wherein a position of a set displaying plane of a child part is updated both upon an update of the attribute information of the parent part and upon an update of a set displaying plane of the parent part.

3. A device for displaying a body section in a virtual three-dimensional space by a computer in claim 2, where the implementing means displays an operating plane for operating the set displaying plane corresponding.

4. A device for displaying a body section in a virtual three dimension space by a computer in claim 2, where the implementing means comprises a sign board corresponding to the set displaying plane and containing character strings for distinguishing the set displaying plane and containing a relation between the set displaying plane, if there is the relation.

5. A device for displaying a body section in a virtual three-dimensional space by a computer in claim 2, where the implementing means displays the set displaying plane with the frame of the set displaying plane.

6. A device for displaying a body section in a virtual three-dimension space by a computer in claim 2, where, the update means updates the child information with the parent information according to the change of the parent information, when the relation between the parent and child is defined; and the implementing means transfers or rotates the child plane corresponding to the transfer or rotation of the parent plane.

7. A device for displaying a body section in a virtual three-dimensional space by a computer in claim 2 comprising:

edit means for editing the relation information displayed on the screen by user interfacing with the screen.

8. A device for displaying a body section in a virtual three-dimensional space by a computer in claim 2 comprising:

generating means for generating a new set displaying plane according to a request for generating a set displaying plane issued with a designation of a plane of one of the parts by making the relation with the parts, or for generating a new set displaying plane according to a request for generating a set displaying plane issued with a designation of a registered plane by making the relation with the registered plane.

9. A device for displaying a body section in a virtual three-dimensional space by a computer in claim 8 comprising:

second generating means for generating a new setting displaying plane containing a specific point by linking with the set displaying plane or an other set displaying plane that was generated immediately preceding the set displaying plane, from a specific point contained in the designated set displaying plane and parts.

10. A device for displaying a body section in a virtual three-dimension space by a computer in claim 9 comprising:

third generating means generating a new set displaying by tracing path information set on a designated set displaying plane from the path information, while making a relation information with the set displaying plane.

11. A device for displaying a body section in a virtual three-dimensional space by a computer in claim 10 comprising:

fourth generating means for generating a new set displaying plane by moving continuously the designated set displaying plane, by linking with the set displaying plane or an other set displaying plane that was generated immediately preceding the set displaying plane, from a specific point contained in the designated set displaying plane and parts.

12. A device for displaying a body section in a virtual three-dimensional space by a computer in claim 2 comprising:

existing range setting means for setting a allowable range of existence of the set displaying plane for a set displaying plane.

13. A device for displaying a body section in a virtual three-dimensional space by a computer in claim 2 comprising:

section direction setting means for setting the section direction of a body to the set display plane.

14. A device for displaying a body section in a virtual three-dimensional space by a computer claim 13, where the section direction setting means sets the cutting direction of the body depending to the existing position of the set displaying plane.

15. A device for displaying a body section in a virtual three-dimension space by a computer in claim 2 comprising:

arranging means for arranging additional parts or arranging a region on the set displaying plane.

16. A device for displaying a body section in a virtual three-dimensional space by a computer in claim 2 comprising:

check means for checking an interference between one or plural of parts, which move with the set displaying plane, and another parts.

17. A device for displaying a body section in a virtual three-dimensional space by a computer in claim 2 further comprising:

deciding means for deciding whether the two-dimensional section and the three-dimensional section are controlled with linkage or no-linkage, when the deciding means decides the linkage control, the implementing means generates the two-dimensional section of the body cut by the set displaying plane for generating the three-dimensional section, when the deciding means decides no-linkage control, the implementing means generates the two-dimensional section cut by a set display plane selected from the set displaying planes, and displays the two-dimensional section on the same screen displaying the three-dimensional section.

18. A device for displaying a body section in a virtual three-dimensional space by a computer in claim 17, where the implementing means displays the two-dimensions, showing the corresponding a part of the three-dimensional section.

19. A device for displaying a body section in a virtual three-dimensional space by a computer in claim 17, where the implementing means displays the two-dimensional section and the three-dimensional section, showing a position of a designated view point.

20. A device for displaying a body section in a virtual three-dimensional space or a set displaying plane by a computer comprising:

management means for managing attribute information of a parent part and a child part and one or plural kinds of attribute information of the set displaying plane for making a body section with the relation between the parts and the attribute information;

implementing means for generating a three-dimensional section of the body cut by the set displaying plane according to the management data of the management means and for displaying the three-dimensional section with the set displaying plane on the display screen or displaying the set displaying plane with a transparent color, when the three-dimensional section is not displayed, wherein a position of a set displaying plane of a child part is updated both upon an update of the attribute information of the parent part and upon an update of a set displaying plane of the parent part.

21. A device for displaying a body section in a virtual three-dimensional space by a computer in claim 20, where the implementing means displays the set displaying planes with the same transparent color, when the relation information is defined between the set planes.

22. A method for displaying a body section in a virtual three-dimensional space by a computer comprising:

managing management data of one or plural set displaying planes for cutting the body to make the section and of the attribute information of a child part and a parent part and of set displaying planes with the relation information with the child part and the parent part and set displaying plane, which are made by the same data structure;

registering the management data;

displaying the section and set displaying plane with the relation information; and updating the managing of the management data by arranging the relation among the child part and the parent part and the set displaying plane managed management data by corresponding to the designation of transfer or rotation of the set displaying plane and transfer or rotation of the parts.

23. A computer-readable storage for storing the program for controlling a computer to perform displaying a body section in a virtual three-dimensional space, by:

accessing to access a managing unit managing the management data of attribute information of a child part and a parent part and the attribute information of set displaying planes with the relation information between the parts and set displaying plane, which are the same data structure, wherein the attribute information of parts comprises location and posture information and the attribute information of set displaying planes comprises a direction of the plane;

displaying the parts related by the managing data, the set displaying plane and the three dimensional section of the parts cut by the set displaying plane; and updating the managing data by arranging the relation among the child part and the parent part and the set displaying plane managed data by corresponding to the transfer or rotation of the set displaying plane and transfer or rotation of the parts.

24. A device for displaying a body section in a virtual three-dimensional space by a computer comprising:

a management unit managing attribute information of a child part and a parent part and one or plural kinds of attribute information of set displaying plane for making a body section by definition of the relation between the child part and the parent part and the attribute information with the same data structure for the parts; wherein the attribute information comprises location information and posture information, and the attribute information of the set displaying plane comprises direction of the set displaying plane; and an implementing unit generating a three-dimensional section of the body cut by the set displaying plane according to the management data of the management unit, and for displaying the three-dimensional of a parts sectional cut by the set displaying plane, the set displaying plane and the parts related to each other on the display screen; and an update unit updating the managing data by arranging the relation among the child part and the parent part and the set displaying plane managed data by corresponding to the transfer or rotation of the set displaying plane of and transfer or rotation of the parts.

25. A device for displaying a body section in a virtual three-dimensional space by a computer in claim 24, where the implementing unit displays an operating plane for operating the set displaying plane corresponding.

26. A device for displaying a body section in a virtual three dimension space by a computer in claim 24, where the implementing unit comprises a sign board corresponding to the set displaying plane and containing character strings for distinguishing the set displaying plane and containing a relation between the set displaying plane, if there is the relation.

27. A device for displaying a body section in a virtual three-dimensional space by a computer in claim 24, where the implementing unit displays the set displaying plane with the frame of the set displaying plane.

28. A device for displaying a body section in a virtual three-dimensional space by a computer in claim 24, where, the update unit updates the child information with the parent information according to the change of the parent information, when the relation between the parent and child is defined; and the implementing unit transfers or rotates the child plane corresponding to the transfer or rotation of the parent plane.

29. A device for displaying a body section in a virtual three-dimensional space by a computer in claim 24 comprising:

an edit unit editing the relation information displayed on the screen by user interfacing with the screen.

30. A device for displaying a body section in a virtual three-dimensional space by a computer in claim 24 comprising:

a generating unit generating a new set displaying plane according to a request for generating a set displaying plane issued with a designation of a plane of one of the parts by making the relation with the parts, or for generating a new set displaying plane according to a request for generating a set displaying plane issued with a designation of a registered plane by making the relation with the registered plane.

31. A device for displaying a body section in a virtual three-dimensional space by a computer in claim 30 comprising:
- a second generating unit generating a new setting displaying plane containing a specific point by linking with the set displaying plane or an other set displaying plane that was generated immediately preceding the set displaying plane, from a specific point contained in the designated set displaying plane and parts.

32. A device for displaying a body section in a virtual three-dimension space by a computer in claim 31 comprising:
- a third generating unit generating a new set displaying by tracing path information set on a designated set displaying plane from the path information, while making a relation information with the set displaying plane.

33. A device for displaying a body section in a virtual three-dimensional space by a computer in claim 32 comprising:
- a fourth generating unit for generating a new set displaying plane by moving continuously the designated set displaying plane, by linking with the set displaying plane or an other set displaying plane that was generated immediately preceding the set displaying plane, or the set displaying plane generated just before from a specific point contained in the designated set displaying plane and parts.

34. A device for displaying a body section in a virtual three-dimensional space by a computer in claim 24 comprising:
- an existing range setting unit setting an allowable range of existence of the set displaying plane for a set displaying plane.

35. A device for displaying a body section in a virtual three-dimensional space by a computer in claim 24 comprising:
- a section direction setting unit for setting the section direction of a body to the set display plane.

36. A device for displaying a body section in a virtual three-dimensional space by a computer in claim 35, where the setting direction setting unit sets the cutting direction of the body depending to the existing position of the set displaying plane.

37. A device for displaying a body section in a virtual three-dimensional space by a computer to claim 36, wherein
- a set displaying plane, having the same plane direction with the plane direction of a reference plane, has a cross-section cut with the set displaying plane display parts existing far from the set displaying plane in a direction of the reference plane, and
- a set displaying plane, having the reverse plane direction with the plane direction of a reference plane, has a cross-section cut with the set displaying plane display parts existing within the distance from the reference plane to the set displaying plane in the direction of the reference plane.

38. A device for displaying a body section in a virtual three-dimensional space by a computer to claim 37; wherein upon plural set displaying planes having all have the same plane directions, a cut section cut with the farthest set displaying plane from the referred plane in direction of the reference plane is displayed, upon plural set displaying planes having inverse plane directions, a cut section cut with the nearest set displaying plane from the referred plane in direction of the reference plane is displayed, and upon one or more than one set displaying planes having the same plane direction with the reference plane and one or more than one set displaying planes having the inverse plane direction with the reference plane exist, the cross section displays parts existing between the farthest set displaying plane of the same plane direction from the reference plane and the nearest set displaying plane of the inverse plane direction from the reference plane.

39. A device for displaying a body section in a virtual three-dimension space by a computer in claim 24 comprising:
- an arranging unit arranging additional parts or arranging a region on the set displaying plane.

40. A device for displaying a body section in a virtual three-dimensional space by a computer in claim 24 comprising:
- a check unit checking an interference between one or plural of parts, which move with the set displaying plane, and another parts.

41. A device for displaying a body section in a virtual three-dimensional space by a computer in claim 24 further comprising:
- a deciding unit deciding whether the two-dimensional section and the three-dimensional section are controlled with linkage or no-linkage,
- when the deciding unit decides the linkage control, the implementing unit generates the two-dimensional section of the body cut by the set displaying plane for generating the three-dimensional section, when the deciding unit decides no-linkage control, the implementing unit generates the two-dimensional section cut by a set display plane selected from the set displaying planes, and displays the two-dimensional section on the same screen displaying the three-dimensional section.

42. A device for displaying a body section in a virtual three-dimensional space by a computer in claim 41, where the implementing unit displays the two-dimensions, showing the corresponding a part of the three-dimensional section.

43. A device for displaying a body section in a virtual three-dimensional space by a computer in claim 41, where the implementing unit displays the two-dimensional section and the three-dimensional section, showing a position of a designated view point.

44. A device for displaying a body section in a virtual three-dimensional space by a computer in claim 24, wherein the managing data comprises ID of the data record, name, kinds of parts, the reference plane and the set displaying plane, pointers to parents of the parts, a reference plane, fundamental positions, fundamental postures, positions relative to parents, postures relative to parents, allowable regions of existence, directs of set displaying plane.

45. A device for displaying a body section in a virtual three-dimensional space or a set displaying plane by a computer comprising,
- a management unit managing attribute information of a child part and a parent part and one or plural kinds of attribute information of the set displaying plane making a body section by definition of the relation between the parts and the attribute information with the same data structure for the parts; wherein the attribute information comprises location information and posture information, and the attribute information of the set displaying plane comprises direction of the set displaying plane; and an implementing unit generating a three-dimensional section of the body cut by the set displaying plane according to the management data of the management unit, and displaying the three-dimensional of a parts sectional cut by the set displaying plane, the set displaying plane and the parts related to each other on the display screen or displays the set displaying plane with a transparent color, when the three-dimensional section is not displayed; and an update unit updating the managed data of the management unit by arranging the relation among the parts and the set displaying plane managed data by corresponding to the transfer or rotation of the set displaying plane or parts.

46. A device for displaying a body section in a virtual three-dimensional space by a computer in claim 45, where the implementing unit displays the set displaying planes with the same transparent color, when the relation information is defined between the set planes.

* * * * *

UNITED STATES PATENT AND TRADEMARK OFFICE
CERTIFICATE OF CORRECTION

PATENT NO. : 7,062,416 B1
APPLICATION NO. : 09/513855
DATED : June 13, 2006
INVENTOR(S) : Yuichi Arita et al.

It is certified that error appears in the above-identified patent and that said Letters Patent is hereby corrected as shown below:

Column 35, Line 32, change "three dimension" to --three-dimensional--.

Column 36, Line 38, after "computer" insert --in--.

Column 38, Line 2, change "three dimensional" to --three-dimensional--.

Column 38, Line 32, delete "of" before "and".

Column 38, Line 38, change "three dimension" to --three-dimensional--.

Column 39, Line 49, after "computer" change "to" to --in--.

Column 39, Line 62, after "computer" change "to" to --in--.

Column 40, Line 9, change "cross section" to --cross-section--.

Signed and Sealed this

Twenty-eighth Day of November, 2006

JON W. DUDAS
*Director of the United States Patent and Trademark Office*